United States Patent
Baba et al.

(10) Patent No.: US 10,244,558 B2
(45) Date of Patent: Mar. 26, 2019

(54) TRANSMISSION CONTROL OF A WIRELESS COMMUNICATION TERMINAL WITH TRANSMISSION LOSS AND COLLISION DETECTION

(71) Applicant: NEC Communication Systems, Ltd, Tokyo (JP)

(72) Inventors: Yuki Baba, Tokyo (JP); Akira Matsumoto, Tokyo (JP); Peng Shao, Tokyo (JP)

(73) Assignee: NEC Communication Systems, Ltd., Tokyo (JP)

( * ) Notice: Subject to any disclaimer, the term of this patent is extended or adjusted under 35 U.S.C. 154(b) by 122 days.

(21) Appl. No.: 15/119,020

(22) PCT Filed: Aug. 14, 2014

(86) PCT No.: PCT/JP2014/004188
§ 371 (c)(1),
(2) Date: Aug. 15, 2016

(87) PCT Pub. No.: WO2015/121902
PCT Pub. Date: Aug. 20, 2015

(65) Prior Publication Data
US 2016/0366702 A1    Dec. 15, 2016

(30) Foreign Application Priority Data
Feb. 14, 2014   (JP) .................................. 2014-026463

(51) Int. Cl.
*H04W 74/08*   (2009.01)
*H04L 12/413*   (2006.01)

(52) U.S. Cl.
CPC ....... *H04W 74/0825* (2013.01); *H04L 12/413* (2013.01)

(58) Field of Classification Search
None
See application file for complete search history.

(56) References Cited

U.S. PATENT DOCUMENTS

| 5,909,564 A * | 6/1999 | Alexander | ............ | H04L 49/351 710/316 |
| 2001/0033579 A1* | 10/2001 | Nelson, Jr. | ............ | H04L 1/1607 370/447 |

(Continued)

FOREIGN PATENT DOCUMENTS

| JP | 3634806 B2 | 3/2005 |
| JP | 2005-094529 A | 4/2005 |

(Continued)

OTHER PUBLICATIONS

International Search Report corresponding to PCT/JP2014/004188, dated Nov. 4, 2014 (5 pages).

(Continued)

*Primary Examiner* — Ayanah S George
(74) *Attorney, Agent, or Firm* — Wilmer Cutler Pickering Hale and Dorr LLP

(57) ABSTRACT

A wireless communication terminal has: a wireless module part which transmits a radio frame signal; a transmission loss information detection part which detects transmission loss information representing whether or not the radio frame signal transmitted by the wireless module part has reached a transmission destination; a collision information detection part which detects collision information representing an aspect of collision between the radio frame signal transmitted by the wireless module part and another radio frame signal; and a transmission control part which controls a transmission process executed by the wireless module part, on a basis of the transmission loss information and the collision information.

18 Claims, 38 Drawing Sheets

(56) References Cited

U.S. PATENT DOCUMENTS

| | | | | |
|---|---|---|---|---|
| 2007/0133459 | A1* | 6/2007 | Kim | H04L 1/0002 370/329 |
| 2009/0225682 | A1* | 9/2009 | Grote-Lopez | H04L 41/083 370/255 |
| 2013/0077497 | A1* | 3/2013 | Bae | H04W 74/0858 370/241 |
| 2013/0343190 | A1* | 12/2013 | Wang | H04W 24/02 370/235 |

FOREIGN PATENT DOCUMENTS

| | | |
|---|---|---|
| JP | 3970563 B2 | 6/2007 |
| JP | 2008-072563 A | 3/2008 |
| JP | 2010-233187 A | 10/2010 |
| JP | 2013-005097 A | 1/2013 |
| JP | 2013-098787 A | 5/2013 |
| WO | WO-2011/030466 A1 | 3/2011 |

OTHER PUBLICATIONS

Impress R&D, 802.11 High-Speed Wireless LAN Textbook, Third Revised Version Apr. 11, 2008 (7 pages).

Peng Shao et al., "Experimental Performance Evaluation of a Collision Detection Algorithm for Wireless LAN," IEICE Technical Report, Jan. 24, 2013, vol. 112, No. 424, pp. 259-264.

Ad Kamerman et al., "WaveLan-II: A High-Performance Wireless LAN for the Unlicensed Band," Bell Labs Technical Journal, vol. 2, Issue 3, 1997, pp. 118-133.

Japanese Office Action issued by the Japan Patent Office for Japanese Application No. 2015-562570 dated Jul. 10, 2018 (7 pages).

* cited by examiner

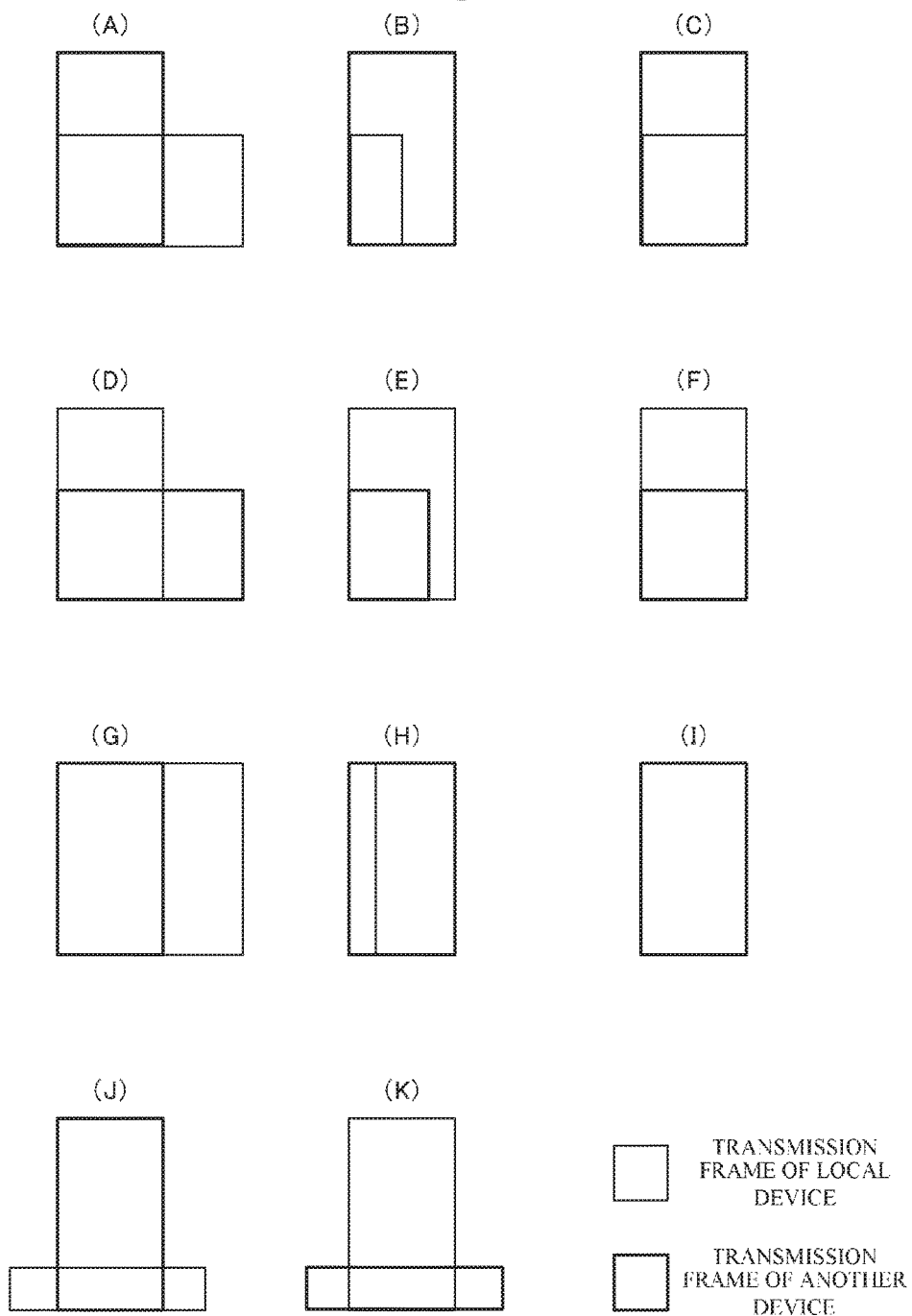

Fig.6

| TRANSMISSION LOSS RATE (Y) | COLLISION RATE (X) | OCCURRENCE DETAILS | NEED FOR PARAMETER ADJUSTMENT |
|---|---|---|---|
| $Y \leq Th$ | $X \leq Th$ | NORMAL TRANSMISSION | NOT NEEDED |
| $Y \leq Th$ | $X > Th$ | NORMAL TRANSMISSION | NOT NEEDED |
| $Y > Th$ | $X \leq Th$ | ATTENUATION | NEEDED |
| $Y > Th$ | $X > Th$ | COLLISION | NEEDED |

| MOST FREQUENTLY OCCURRING COLLISION PATTERN | COLLISION CAUSE |
|---|---|
| SUM OF COLLISION PATTERNS (A) TO (I) | COINCIDENCE OF BACKOFF TIMES |
| COLLISION PATTERN (J) (WHERE LIMITED TO COLLISION PATTERN (K) = 0) | HIDDEN TERMINAL PROBLEM1 |
| COLLISION PATTERN (K) (WHERE LIMITED TO COLLISION PATTERN (J) = 0) | HIDDEN TERMINAL PROBLEM2 |
| SUM OF COLLISION PATTERNS (J) AND (K) | HIDDEN TERMINAL PROBLEM3 |

23

Fig.8
- TRANSMISSION SIGNAL OF WIRELESS COMMUNICATION TERMINAL 1
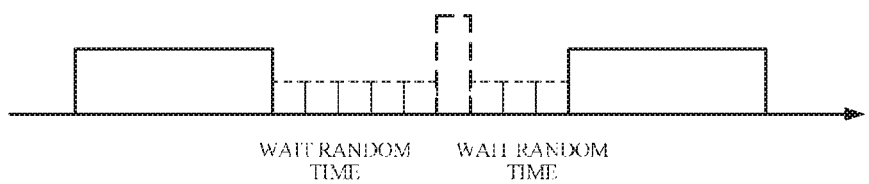
- TRANSMISSION SIGNAL OF OTHER WIRELESS TERMINAL DEVICE
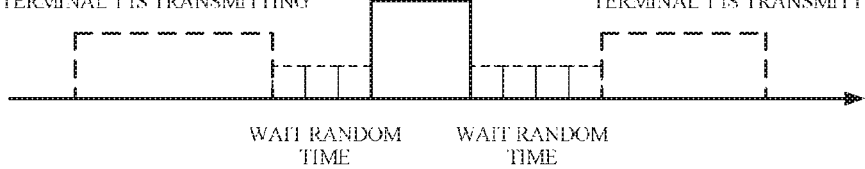
- SPATIAL WAVEFORM
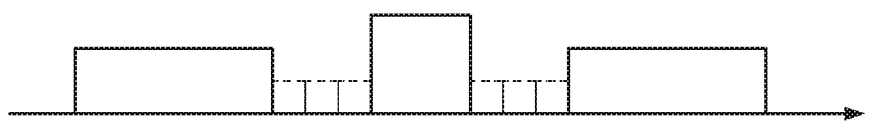

Fig.9
- TRANSMISSION SIGNAL OF WIRELESS COMMUNICATION TERMINAL 1
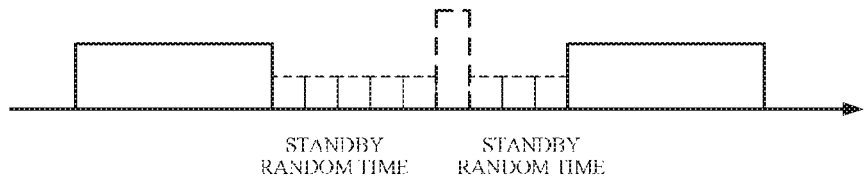
- TRANSMISSION SIGNAL OF OTHER WIRELESS TERMINAL DEVICE
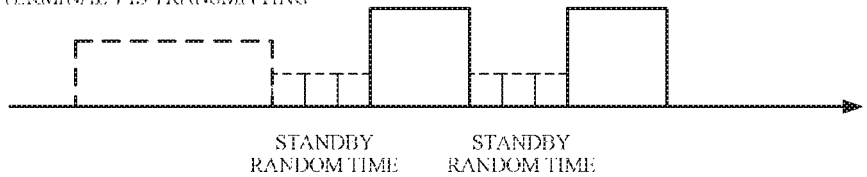
- SPATIAL WAVEFORM
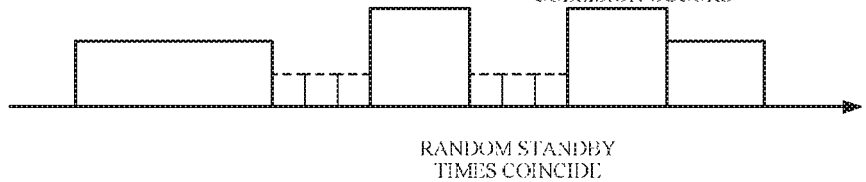

Fig.14
·PARAMETER ADJUSTMENT TABLE FOR ATTENUATION

| ADJUSTMENT PRIORITY DEGREE | ADJUSTMENT PARAMETER | ADJUSTMENT DETAILS |
|---|---|---|
| 1 | TRANSMISSION POWER | INCREASE |
| 2 | TRANSMISSION RATE | DECREASE |

Fig.15
·PARAMETER ADJUSTMENT TABLE FOR COINCIDENCE OF BACKOFF TIMES

| ADJUSTMENT PRIORITY DEGREE | ADJUSTMENT PARAMETER | ADJUSTMENT DETAILS |
|---|---|---|
| 1 | NONE | — |
| 2 | BACKOFF TIME | INCREASE |
| 3 | TRANSMISSION RATE | INCREASE |

Fig.16
·PARAMETER ADJUSTMENT TABLE FOR HIDDEN TERMINAL PROBLEM I

| ADJUSTMENT PRIORITY DEGREE | ADJUSTMENT PARAMETER | ADJUSTMENT DETAILS |
|---|---|---|
| 1 | TRANSMISSION POWER | INCREASE |
| 2 | TRANSMISSION RATE | DECREASE |
| 3 | RTS/CTS | EXECUTE |

Fig.17

・PARAMETER ADJUSTMENT TABLE FOR HIDDEN TERMINAL PROBLEM 2

| ADJUSTMENT PRIORITY DEGREE | ADJUSTMENT PARAMETER | ADJUSTMENT DETAILS |
|---|---|---|
| 1 | CARRIER SENSE THRESHOLD | DECREASE |
| 2 | TRANSMISSION RATE | DECREASE |
| 3 | RTS/CTS | EXECUTE |

Fig.18

・PARAMETER ADJUSTMENT TABLE FOR HIDDEN TERMINAL PROBLEM 3

| ADJUSTMENT PRIORITY DEGREE | ADJUSTMENT PARAMETER | ADJUSTMENT DETAILS |
|---|---|---|
| 1 | TRANSMISSION POWER | INCREASE |
| | CARRIER SENSE THRESHOLD | DECREASE |
| 2 | TRANSMISSION RATE | DECREASE |
| 3 | RTS/CTS | EXECUTE |

Fig.25
| ADJUSTMENT PRIORITY DEGREE | ADJUSTMENT PARAMETER | ADJUSTMENT DETAILS |
|---|---|---|
| 1 | TRANSMISSION POWER | DECREASE |
| 2 | NONE | — |
Fig.26
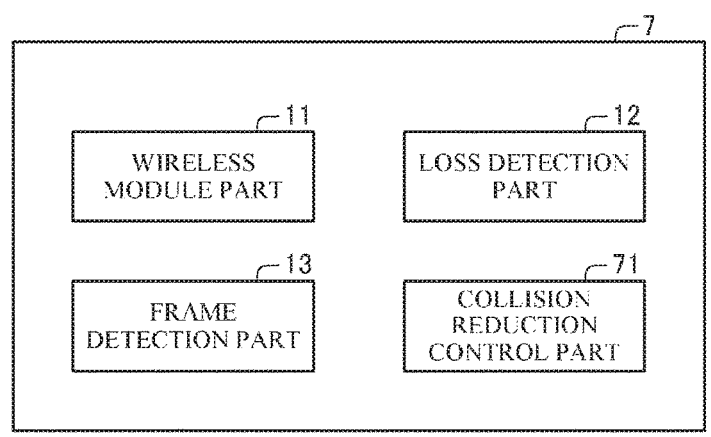
Fig.27
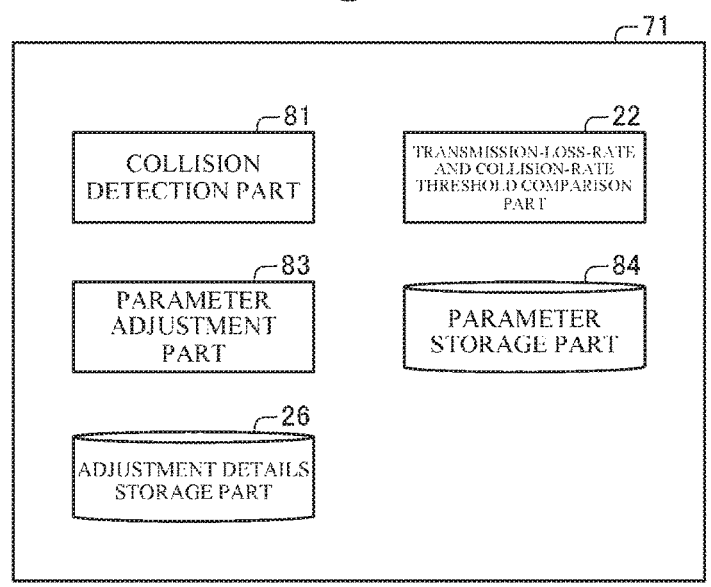

Fig.28

- PARAMETER ADJUSTMENT TABLE

| ADJUSTMENT PRIORITY DEGREE | ADJUSTMENT PARAMETER | ADJUSTMENT DETAILS |
|---|---|---|
| 1 | NONE | — |
| 2 | BACKOFF TIME | INCREASE |
| 3 | TRANSMISSION POWER | INCREASE |
| 4 | CARRIER SENSE THRESHOLD | DECREASE |
| 5 | TRANSMISSION POWER | INCREASE |
| 5 | CARRIER SENSE THRESHOLD | DECREASE |
| 6 | TRANSMISSION RATE | DECREASE |
| 7 | RTS/CTS | EXECUTE |

Fig.30
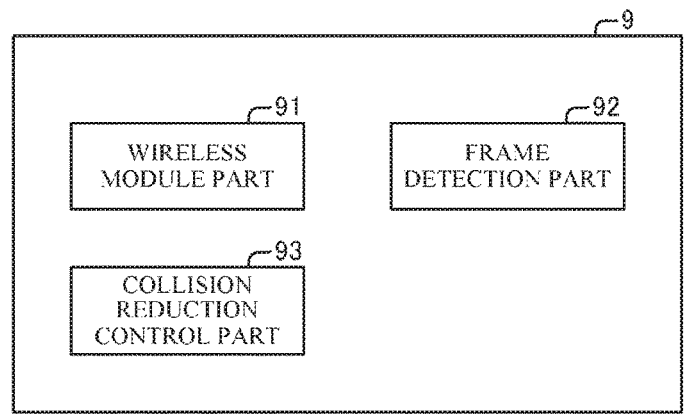
Fig.31
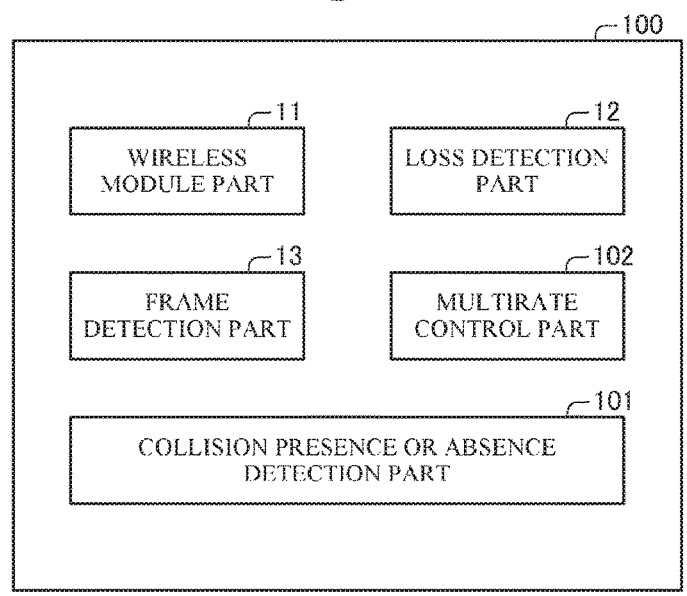
Fig.32
| TRANSMISSION RATE (Mbps) | | | | | | | | | | | |
|---|---|---|---|---|---|---|---|---|---|---|---|
| 54 | 48 | 36 | 24 | 18 | 12 | 11 | 9 | 6 | 5.5 | 2 | 1 |

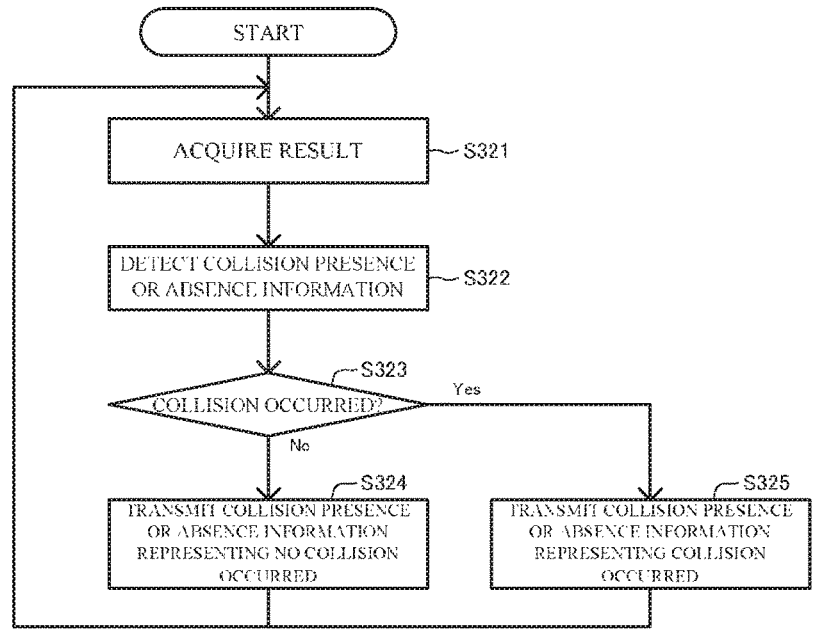
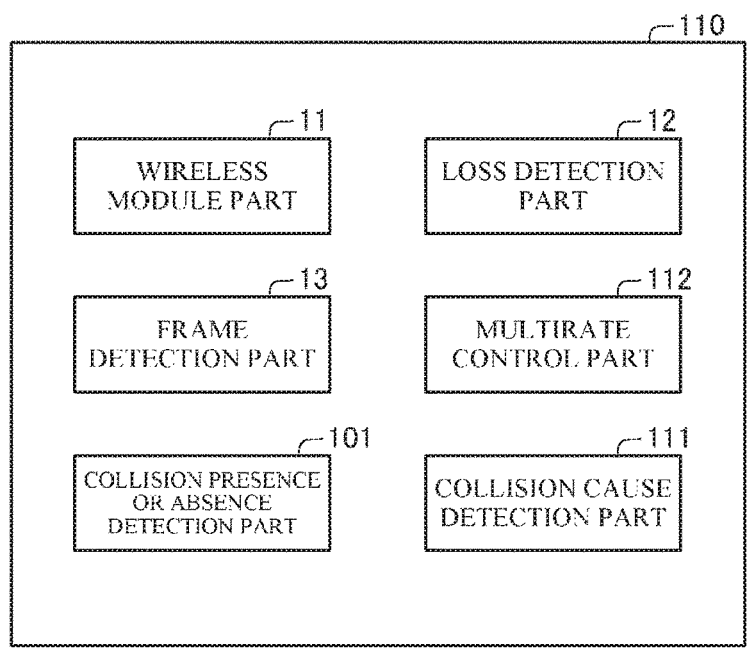

| SETTING NUMBER | R₁ | R₂ | R₃ | R₄ | ... | Rᵦ |
|---|---|---|---|---|---|---|
| Rate | 54 | 48 | 36 | 24 | ... | 1 |
| MAXIMUM NUMBER OF TRIALS OF TRANSMISSION | 4 | 3 | 3 | 2 | ... | 5 |

Fig.47

| SETTING NUMBER | $R_1$ | $R_2$ | $R_3$ | $R_4$ | ... | $R_\beta$ |
|---|---|---|---|---|---|---|
| Rate | 54 | 48 | 36 | 24 | ... | 1 |
| MAXIMUM NUMBER OF TRIALS OF TRANSMISSION | 4 | 3 | 3 | 2 | ... | 5 |

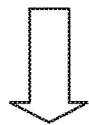

AFTER COMPLETION OF MULTIRATE RETRY

USED RATE AT TIME OF SUCCESS IN RETRANSMISSION

| SETTING NUMBER | $R_1$ | $R_2$ | $R_3$ | $R_4$ | ... | $R_\beta$ |
|---|---|---|---|---|---|---|
| Rate | 54 | 48 | 36 | 24 | ... | 1 |
| MAXIMUM NUMBER OF TRIALS OF TRANSMISSION | 4 | 3 | 3 | 2 | ... | 5 |

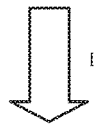

RATE TABLE SETTING AT TIME OF NEXT TRANSMISSION OF LOCAL DATA FRAME

| SETTING NUMBER | $R_1$ | $R_2$ | $R_3$ | $R_4$ | ... | $R_\beta$ |
|---|---|---|---|---|---|---|
| Rate | 54 | 48 | 36 | 24 | ... | 1 |
| MAXIMUM NUMBER OF TRIALS OF TRANSMISSION | 4 | 3 | 3 | 2 | ... | 5 |

SET RATE SETTING AT TIME OF PREVIOUS SUCCESS IN RETRANSMISSION TO INITIAL VALUE

TRANSMISSION CONTROL OF A WIRELESS COMMUNICATION TERMINAL WITH TRANSMISSION LOSS AND COLLISION DETECTION

CROSS-REFERENCE TO RELATED APPLICATIONS

This application is a national stage application of International Application No. PCT/JP2014/004188 entitled "Wireless Communication Terminal," filed on Aug. 14, 2014, which claims priority to Japanese Patent Application No. 2014-026463, filed on Feb. 14, 2014, the disclosures of each which are hereby incorporated by reference in their entirety.

TECHNICAL FIELD

The present invention relates to a wireless communication terminal, a wireless communication method, and a program. In particular, the present invention relates to a wireless communication terminal detecting the aspect of collision of transmitted radio frames and executing given control, a wireless communication method, and a program.

BACKGROUND ART

In recent years, communication terminals including smartphones, tablets and wireless access points have increased. As communication terminals performing wireless communication become popular, frequency resources are shared by many users. Therefore, as communication terminals increase, a problem such as communication interference occurs, and decrease of a communication quality such as failure of data transmission may be caused. Thus, various techniques for relieving the problem such as communication interference and securing a communication quality have been devised.

For example, according to Non-Patent Document 1, a communication device performing wireless communication supports a plurality of transmission rates. In general, a higher transmission rate allows more data to be transmitted, but easily causes disconnection. On the other hand, a lower transmission rate needs more time for data transmission, but allows easy connection. Therefore, by selecting a transmission rate used for communication depending on the status of a communication device, it becomes possible to secure a higher communication quality.

Further, as an algorithm for determining the transmission rate, for example, ARF (Auto Rate Fallback) shown in Non-Patent Document 2 is known. In ARF, when transmission succeeds consecutively a given number of times, the transmission rate is increased to perform communication at higher speeds. On the other hand, in ARF, when transmission fails consecutively a given number of times, the transmission rate is decreased to increase the possibility of success in transmission. Such control allows easier connection in a case where transmission fails a given number of times and, on the other hand, allows control so as to perform more efficient transmission in a case where transmission succeeds a given number of times.

Further, for example, Patent Document 1 discloses a wireless communication device which has a collision detection part calculating a packet collision rate from the number of times of packet collision and the number of times of packet transmission and a control part adjusting a parameter at the time of performing data transmission on the basis of the result of calculation by the collision detection part. According to Patent Document 1, adjustment of a parameter on the basis of a packet collision rate with such a configuration makes it possible to reduce interference with other communication and increase the efficiency of data transmission.

Further, for example, Patent Documents 2 and 3 disclose techniques in which one master terminal have peripheral wireless communication terminals under control in advance and thereby reduces collision of the terminals under control.

Patent Document 1: Japanese Unexamined Patent Application Publication No. JP-A 2013-005097
Patent Document 2: Japanese Patent No. 3970563
Patent Document 3: Japanese Patent No. 3634806
Non-Patent Document 1: Impress R&D, "802.11 High-Speed Wireless LAN Text, Third Revised Version"
Non-Patent Document 2: Bell Labs Technical Journal, Vol. 2, Issue 3, pp. 118-133, 1997 "WaveLAN®-II: A High-Performance Wireless LAN for the Unlicensed Band"

However, the techniques described above do not execute control necessarily in accordance with a cause resulting in decrease of communication quality. Therefore, there arises a problem that even if the techniques described above are used, a sufficient communication quality cannot be secured in some cases depending on the cause of decrease of a communication quality. Moreover, the techniques described above have a problem that a redundant process, which is not a process appropriate for the cause of decrease of communication quality, may be performed.

Further, for example, in the technique disclosed in Patent Document 1, a process appropriate for the calculated collision rate is executed. Therefore, according to the technique disclosed in Patent Document 1, there is a problem that immediacy decreases.

In performing wireless communication, it is impossible to exclusively use a frequency. Therefore, when it is attempted to apply the techniques disclosed in Patent Documents 2 and 3, it is supposed that a possibility of presence of a communication system other than the local system in the same environment is not small. In such an environment, a wireless communication terminal beyond control of the master terminal is present, so that the techniques disclosed in Patent Document 2 and 3 may be unable to reduce collision. Thus, the techniques disclosed in Patent Documents 2 and 3 have a problem that it is not always possible to reduce collision. Moreover, the techniques disclosed in Patent Documents 2 and 3 have a problem that occurrence of a fault in the master terminal causes a failure in reduction control of all the terminals under control.

Thus, there is a problem that when performing wireless communication, it is difficult to secure a communication quality and it is difficult to perform appropriate control for securing a communication quality.

SUMMARY

Accordingly, an object of the present invention is to provide a wireless communication terminal which can solve a problem that in performing wireless communication, it is difficult to secure a communication quality and it is difficult to perform appropriate control for securing a communication quality.

In order to achieve the object, a wireless communication terminal as an aspect of the present invention includes:
  a wireless module part configured to transmit a radio frame signal;

a transmission loss information detection part configured to detect transmission loss information, the transmission loss information representing whether or not the radio frame signal transmitted by the wireless module part has reached a transmission destination;

a collision information detection part configured to detect collision information, the collision information representing an aspect of collision between the radio frame signal transmitted by the wireless module part and another radio frame signal; and a transmission control part configured to control a transmission process executed by the wireless module part, on a basis of the transmission loss information and the collision information.

Further, a wireless communication method as another aspect of the present invention includes:

detecting transmission loss information and collision information, the transmission loss information representing whether or not a transmitted radio frame signal has reached a transmission destination, the collision information representing an aspect of collision between the radio frame signal and another radio frame signal; and controlling a transmission process on a basis of the detected transmission loss information and the detected collision information.

Further, a program as another aspect of the present invention is a program including instructions for causing a wireless communication terminal to realize:

a wireless module part configured to transmit a radio frame signal;

a transmission loss information detection part configured to detect transmission loss information, the transmission loss information representing whether or not the radio frame signal transmitted by the wireless module part has reached a transmission destination;

a collision information detection part configured to detect collision information, the collision information representing an aspect of collision between the radio frame signal transmitted by the wireless module part and another radio frame signal; and a transmission control part configured to control a transmission process executed by the wireless module part, on a basis of the transmission loss information and the collision information.

Configured in the abovementioned manner, the present invention can provide a wireless communication terminal which can secure a communication quality when performing wireless communication and perform appropriate control for securing a communication quality.

BRIEF DESCRIPTION OF DRAWINGS

FIG. 5 is a diagram showing an example of a collision pattern of collision frames detected by the frame detection part shown in FIG. 2;

FIG. 6 is a table showing an example of comparison by a transmission-loss-rate and collision-rate threshold comparison part shown in FIG. 5;

FIG. 7 is a table showing an example of analysis of the cause of collision by a collision cause analysis part shown in FIG. 5;

FIG. 8 is a diagram for describing coincidence of backoff time as one of the causes of collision;

FIG. 9 is a diagram for describing coincidence of backoff time as one of the causes of collision;

FIG. 14 shows an example of a parameter adjustment table stored by a parameter storage part shown in FIG. 5;

FIG. 15 shows an example of a parameter adjustment table stored by the parameter storage part shown in FIG. 5;

FIG. 16 shows an example of a parameter adjustment table stored by the parameter storage part shown in FIG. 5;

FIG. 17 shows an example of a parameter adjustment table stored by the parameter storage part shown in FIG. 5;

FIG. 18 shows an example of a parameter adjustment table stored by the parameter storage part shown in FIG. 5;

FIG. 25 shows an example of a parameter adjustment table stored by a parameter storage part of the wireless communication terminal according to the fifth exemplary embodiment of the present invention;

FIG. 26 is a block diagram showing the configuration of a wireless communication terminal according to a sixth exemplary embodiment of the present invention;

FIG. 27 is a function block diagram showing an example of a function of a collision reduction control part shown in FIG. 26;

FIG. 28 is a diagram showing an example of a parameter adjustment table stored by a parameter storage part shown in FIG. 27;

FIG. 30 is a schematic block diagram for describing the overview of the configuration of a wireless communication terminal according to a seventh exemplary embodiment of the present invention;

FIG. 31 is a block diagram showing an example of the configuration of a wireless communication terminal according to an eighth exemplary embodiment of the present invention;

FIG. 32 is a table showing an example of an algorithm for a transmission rate used by a wireless module part shown in FIG. 31;

FIG. 34 is a flowchart for describing the operation of a collision presence or absence detection part according to the eighth exemplary embodiment of the present invention;

FIG. 35 is a block diagram showing an example of the configuration of a wireless communication terminal according to a ninth exemplary embodiment of the present invention;

FIG. 47 is a diagram showing an example of an algorithm for a transmission rate used by a wireless module part according to the fourteenth exemplary embodiment of the present invention;

EXEMPLARY EMBODIMENTS

Figure 1:
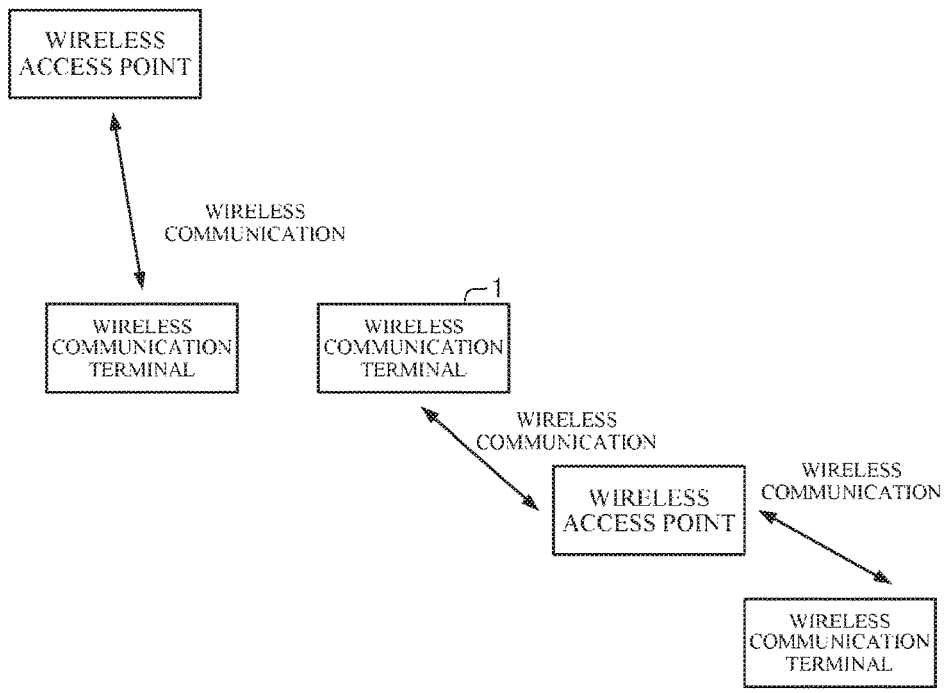
FIG. 1 is a diagram for schematically describing the whole of a first exemplary embodiment of the present invention.

Next, exemplary embodiments of the present invention will be described in detail referring to the drawings.

First Exemplary Embodiment

Referring to FIG. 1, a wireless communication terminal 1 in a first exemplary embodiment of the present invention is a terminal which performs wireless communication with another wireless communication terminal, a wireless access point, and the like. As described later, the wireless communication terminal 1 in this exemplary embodiment is configured to be able to detect collision between a radio frame signal transmitted by the wireless communication terminal 1 and a radio frame signal transmitted by another device. Moreover, the wireless communication terminal 1 in this exemplary embodiment is configured to detect the status of collision (a collision status) of wireless frame signals. Furthermore, the wireless communication terminal 1 in this exemplary embodiment is configured to change a parameter depending on a detected collision status.

Figure 2:
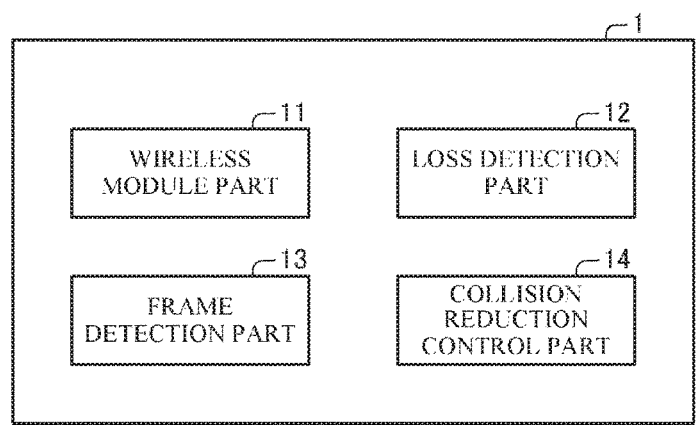
FIG. 2 is a block diagram showing the configuration of a wireless communication terminal according to the first exemplary embodiment of the present invention.

Referring to FIG. 2, the wireless communication terminal 1 in this exemplary embodiment has a wireless module part 11, a loss detection part 12 (a transmission loss information detection part), a frame detection part 13 (a portion of a collision information detection part), and a collision reduction control part 14 (a portion of the collision information detection part, a transmission control part).

The wireless module part 11 has a function of performing wireless communication. Specifically, the wireless module part 11 in this exemplary embodiment performs transmission and reception of radio signals conforming to the IEEE802.11 standard. The wireless module part 11 performs transmission and reception of radio signals with another wireless communication terminal and a wireless access point, for example, via an antenna part, which is not shown in the drawings.

In this exemplary embodiment, the IEEE802.11 standard is given as an example of a standard for wireless communication performed by the wireless module part 11. However, the present invention can be implemented without being limited to the case of performing wireless communication in conformity with the IEEE802.11 standard. The wireless module part 11 only needs to employ CSMA/CA, and there is no need to limit a standard used for wireless communication particularly.

The loss detection part 12 has a function of detecting a fact that a signal transmitted by the wireless module part 11 has failed to reach a transmission destination due to a certain cause (transmission loss). In other words, the loss detection part 12 detects transmission loss information showing transmission loss. For example, according to the IEEE802.11 standard, a transmission destination terminal transmits an Ack (Acknowledgement: a response signal (a confirmation response)) frame in response to a signal transmitted by the wireless module part 11. Therefore, the loss detection part 12 can detect transmission loss by monitoring the wireless module part 11. That is, in a case where the wireless module part 11 does not receive an Ack frame until a given time passes after a radio frame signal is transmitted, the loss detection part 12 determines that the signal transmitted by the wireless module part 11 has failed to reach a transmission destination terminal, and detects transmission loss. The loss detection part 12 detects transmission loss by such a method, for example. Detection of transmission loss by the loss detection part 12 is not limited to use of the abovementioned method. The loss detection part 12 can be configured to detect transmission loss by using various methods which allow detection of transmission loss.

Further, the loss detection part 12 can have a function of calculating a transmission loss rate. A transmission loss rate by the loss detection part 12 can be found by, for example, dividing the number of transmission losses detected by the loss detection part 12 by the number of transmissions of radio frame signals by the wireless module part 11. The loss detection part 12 calculates a transmission loss rate by the abovementioned method, for example, every time the wireless module part 11 transmits a radio frame signal. Moreover, the loss detection part 12 can store a transmission loss rate calculated thereby into, for example, a transmission loss rate storage part, which is not shown in the drawings.

Thus, the loss detection part 12 detects transmission loss. Moreover, the loss detection part 12 can calculate a transmission loss rate. Then, the loss detection part 12 transmits a fact that it has detected transmission loss to the collision reduction control part 14. Further, when transmitting the fact that it has detected transmission loss to the collision reduction control part 14, the loss detection part 12 transmits the transmission loss rate calculated thereby to the collision reduction control part 14.

In this exemplary embodiment, calculation of a transmission loss rate is performed by the loss detection part 12. However, the present invention can be implemented without being limited to the case where the loss detection part 12 performs calculation of a transmission loss rate. For example, calculation of a transmission loss rate may be performed by the collision reduction control part 14 to be described later. Further, the loss detection part 12 has a CPU (Central Processing Unit) and a storage device, which are not shown in the drawings, and execution of a program stored in the storage device by the CPU realizes the abovementioned function.

Figure 3:
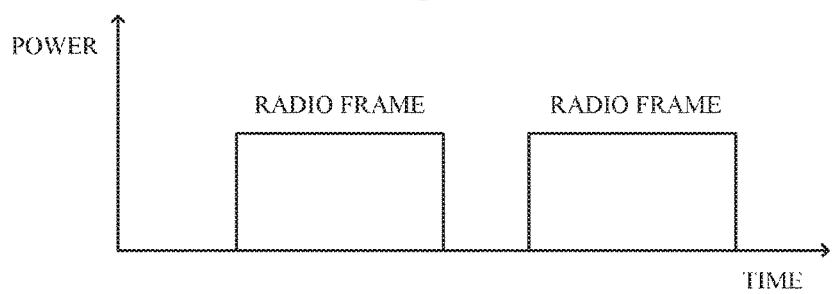
FIG. 3 is a diagram showing an example of a radio frame signal detected by a frame detection part shown in FIG. 2.

The frame detection part 13 has a function of detecting the power of a spatial radio signal on the same channel as a radio frame signal transmitted by the wireless module part 11. For example, the frame detection part 13 detects a radio frame signal transmitted by the wireless module part 11. A radio frame signal detected by the frame detection part 13 is as shown in FIG. 3, for example. Referring to FIG. 3, the frame detection part 13 extracts a radio frame as a signal composed of transmission power and transmission time. The transmission power and transmission time of a radio frame detected by the frame detection part 13 vary depending on the amount of data to transmit and a communication method.

Thus, the frame detection part 13 detects the power of a spatial radio signal. In other words, the frame detection part 13 detects, as a pattern, a temporal change of the power of a radio frame signal transmitted by the wireless module part 11. Then, the frame detection part 13 transmits a detection result detected thereby to the collision reduction control part 14.

The collision reduction control part 14 has a function of analyzing a detection result (a pattern) detected by the frame detection part 13 and detecting the presence or absence of occurrence of collision (collision presence or absence information) and a given collision status (collision status information). In other words, the collision reduction control part 14 analyzes a detection result detected by the frame detection part 13 and thereby detects collision information (collision presence or absence information and collision status information) showing the aspect of collision between a radio frame signal transmitted by the wireless module part 11 and a radio frame signal transmitted by another wireless communication terminal. Moreover, the collision reduction control part 14 has a function of identifying the cause of collision from the detected given collision status and changing a parameter in accordance with the identified cause of the collision (the collision reduction control part 14 controls a transmission process executed by the wireless module part 11). In other words, the collision reduction control part 14 has a function of detecting a given collision status of a radio frame signal transmitted by the wireless module part 11 and a radio frame signal transmitted by another wireless communication terminal and changing a parameter in accordance with the detected given collision status.

Figure 4:
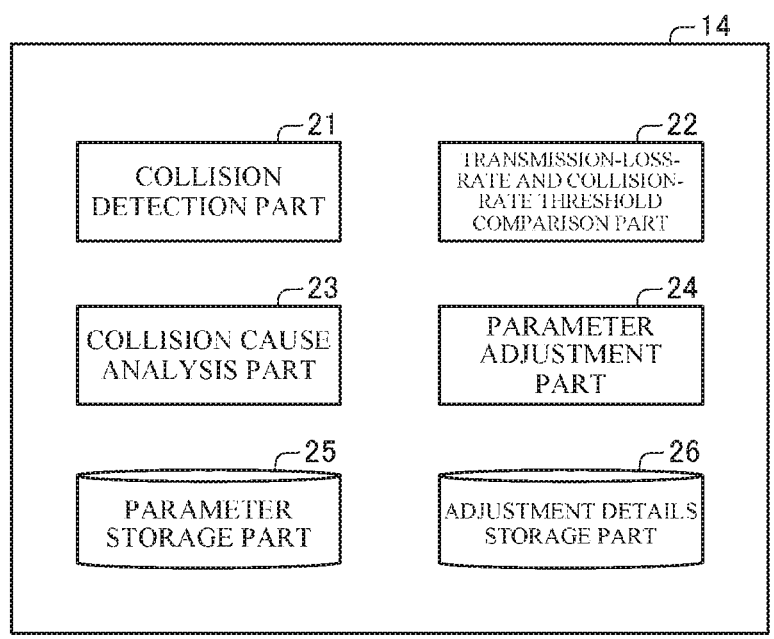
FIG. 4 is a function block diagram showing an example of a function of a collision reduction control part shown in FIG. 2.

Referring to FIG. 4, the collision reduction control part 14 has functions as, for example, a collision detection part 21, a transmission-loss-rate and collision-rate threshold comparison part 22, a collision cause analysis part 23, a parameter adjustment part 24, a parameter storage part 25, and an adjustment details storage part 26. The respective functions mentioned above are implemented by execution of a program installed in the collision reduction control part 14 by a CPU (Central Processing Unit) of the collision reduction control part 14.

The collision detection part 21 has a function of analyzing a detection result detected by the frame detection part 13 and detecting the presence or absence of occurrence of collision and a given collision status. In other words, the collision detection part 21 analyzes a detection result detected by the frame detection part 13 and thereby detects collision presence or absence information representing the presence or absence of collision and collision status information representing a collision pattern, namely, a collision status. First, the collision detection part 21 receives a detection result (the pattern of power) from the frame detection part 13. Then, the collision detection part 21 analyzes the detection result and thereby detects the presence or absence of occurrence of collision and a collision status.

When occurrence of collision is absent, the pattern of power detected by the frame detection part 13 is as shown in FIG. 3, for example. In such a case that there is a time between transmission packets and the transmission packets do not overlap (do not interfere) with each other, the collision detection part 21 determines that occurrence of collision is absent.

On the other hand, when occurrence of collision is present, the frame detection part 13 detects a collision pattern (a collision status) shown in FIG. 5, for example. Referring to FIG. 5, collision patterns (collision statuses) at the time of collision between radio frame signals can be classified into eleven kinds from (A) to (K) in FIG. 5. When detecting such a pattern determined as a pattern in which a plurality of packets overlap, the frame detection part 13 determines that occurrence of collision is present. Then, the collision detection part 21 determines which collision pattern the detection result corresponds to. By performing this determination, the collision detection part 21 can detect a collision status. The differences of collision patterns result from, for example, differences of the arrangement of wireless communication terminals, the power used for transmission, a transmission data amount, a transmission rate, and the like.

Thus, the collision detection part 21 analyzes a power pattern detected by the frame detection part 13, and thereby determines which one of the eleven kinds of collision patterns the pattern detected by the frame detection part 13 corresponds to and detects a collision status. Subsequently, the collision detection part 21 counts the number of times of occurrence of a collision pattern (a collision status). For example, every time detecting a collision status, the collision detection part 21 increment by one the number of times of occurrence of a collision pattern corresponding to the collision status, thereby counting the number of times of occurrence of the collision pattern. Then, the collision detection part 21 compares the counted result with the number of transmissions of a radio frame signal by the wireless module part 11, and calculates a collision rate in all the collision patterns and an occurrence rate for each collision pattern. Moreover, the collision detection part 21 can store the calculation result into, for example, a collision rate storage part, which is not shown in the drawings.

The eleven kinds of collision patterns (collision statuses) can be classified into three major kinds of collision statuses as described below.

The nine kinds of collision patterns (A) to (I) in FIG. 5 are different in size of colliding and collided transmission frames for each pattern, but all of them are patterns in which collision occurs at the heads of the transmission frames. In other words, the collision patterns (A) to (I) in FIG. 5 show the patterns of collision caused by simultaneous transmission of a radio frame signal from the wireless module part 11 and another radio frame signal (a status of simultaneous transmission collision occurrence).

The collision pattern (J) in FIG. 5 is a pattern in which a transmission frame from another device collides with a middle part of a transmission frame from the local device. In other words, the collision pattern (J) in FIG. 5 shows the pattern of collision caused by transmission of another radio frame signal during transmission of a radio frame signal by the wireless module part 11 (one of statuses of transmission collision occurrence during transmission).

The collision pattern (K) in FIG. 5 is a pattern in which a transmission frame from the local device collides with a middle part of a transmission frame from another device. In other words, the collision pattern (K) in FIG. 5 shows the pattern of collision caused by transmission of a radio frame signal by the wireless module part 11 during transmission of another radio frame signal (one of statuses of transmission collision occurrence during transmission).

Thus, the major collision patterns detected by the collision detection part 21 can be classified into three major kinds of collision statuses. In other words, the following three kinds are major collision patterns detected by the collision detection part 21: collision occurs because the local device and another device simultaneously transmit radio frame signals; collision occurs because another device transmits a radio frame signal while the local device is transmitting a radio frame signal; and collision occurs because the local device transmits a radio frame signal while another device is transmitting a radio frame signal. Therefore, the collision detection part 21 may be configured to detect the three kinds of collision statuses as collision statuses, count the number of times of occurrence of each of the detected collision status, and calculate a collision rate and an occurrence rate for each collision status.

The transmission-loss-rate and collision-rate threshold comparison part 22 has a function of comparing a transmission loss rate and a collision rate with a predetermined threshold Th (a transmission loss rate threshold, a collision rate threshold). The transmission-loss-rate and collision-rate threshold comparison part 22 performs comparison between a transmission loss rate and the threshold Th and comparison between a collision rate and the threshold Th. Then, on the basis of the comparison results, the transmission-loss-rate and collision-rate threshold comparison part 22 performs determination of the need for parameter adjustment, and the like.

First, the transmission-loss-rate and collision-rate threshold comparison part 22 receives a transmission loss rate transmitted by the loss detection part 21. Moreover, the transmission-loss-rate and collision-rate threshold comparison part 22 acquires a collision rate calculated by the collision detection part 21. Then, the transmission-loss-rate and collision-rate threshold comparison part 22 performs comparison between the received transmission loss rate and the threshold Th and comparison between the acquired collision rate and the threshold Th. The comparison by the transmission-loss-rate and collision-rate threshold comparison part 22 is performed, for example, on the basis of a table shown in FIG. 6.

Referring to FIG. 6, in a case where a transmission loss rate is equal to or less than the threshold Th and a collision rate is equal to or less than the threshold Th, the transmission-loss-rate and collision-rate threshold comparison part 22 determines that a radio frame signal from the wireless module part 11 is normally transmitted and there is no need to perform parameter adjustment. In this case, the transmission-loss-rate and collision-rate threshold comparison part 22 can stop execution of the subsequent process.

Further, in a case where a transmission loss rate is equal to or less than the threshold Th and a collision rate is larger than the threshold Th, the transmission-loss-rate and collision-rate threshold comparison part 22 determines that a radio frame signal is normally transmitted but collision is present. The transmission-loss-rate and collision-rate threshold comparison part 22 also determines that there is no need to perform parameter adjustment. In this case, the transmission-loss-rate and collision-rate threshold comparison part 22 can stop execution of the subsequent process. Otherwise, the transmission-loss-rate and collision-rate threshold comparison part 22 can instruct the collision cause analysis part 23 to analyze the cause of the collision.

Further, in a case where a transmission loss rate is more than the threshold Th and a collision rate is equal to or less than the threshold Th, the transmission-loss-rate and collision-rate threshold comparison part 22 determines that occurrence of attenuation is present and there is a need to perform parameter adjustment. In this case, the transmission-loss-rate and collision-rate threshold comparison part 22 transmits the result of determination that attenuation is present to the parameter adjustment part 24. Otherwise, the result of determination may be transmitted to the parameter adjustment part 24 via the collision cause analysis part 23.

Further, in a case where a transmission loss rate is more than the threshold Th and a collision rate is more than the threshold Th, the transmission-loss-rate and collision-rate threshold comparison part 22 determines that occurrence of collision is present and there is a need to perform parameter adjustment. In this case, the transmission-loss-rate and collision-rate threshold comparison part 22 instructs the collision cause analysis part 23 to analyze the cause of the collision.

Thus, the transmission-loss-rate and collision-rate threshold comparison part 22 performs comparison between a transmission loss rate and the threshold Th and comparison between a collision rate and the threshold Th. Then, the transmission-loss-rate and collision-rate threshold comparison part 22 determines the details of occurrence (whether a radio frame signal is normally transmitted, occurrence of attenuation is present, or occurrence of collision is present) and the need for parameter adjustment on the basis of the comparison results.

The user can determine any threshold as the threshold Th (the transmission loss rate threshold, the collision rate threshold) used by the transmission-loss-rate and collision-rate threshold comparison part 22. As the threshold Th, the same threshold may be used at the time of comparison with a transmission loss rate and comparison with a collision rate, or different thresholds may be used in the respective comparisons.

The collision cause analysis part 23 has a function of identifying a collision cause on the basis of the result of detection by the collision detection part 21. Identification of a collision cause by the collision cause analysis part 23 in this exemplary embodiment is performed, for example, in a case where the transmission-loss-rate and collision-rate threshold comparison part 22 determines that there is the need for parameter adjustment and determines that the cause of transmission loss is collision.

Identification of a collision cause by the collision cause analysis part 23 is performed, for example, by using a table shown in FIG. 7. Referring to FIG. 7, the collision cause analysis part 23 identifies a collision cause by performing comparison with the sum of the collision patterns (A) to (I), the number of the collision patterns (J), the number of the collision patterns (K) or the sum of the collision patterns (J) and (K) shown in FIG. 5.

As shown in FIG. 7, in a case where the sum of the collision patterns (A) to (I) is the most, the collision cause analysis part 23 determines that the cause of the collision largely depends on coincidence of backoff times. In other words, in the case of determining that collision frequently occurs due to simultaneous transmission of radio frame signals by the local device (the wireless communication terminal 1) and another device (another wireless communication terminal), the collision cause analysis part 23 identifies a major cause of a collision as coincidence of backoff times. Coincidence of backoff times will be described in detail later.

Further, in a case where the collision pattern (J) is the most and the collision pattern (K) is zero (or extremely small; for example, equal to or less than a predetermined threshold), the collision cause analysis part 23 determines that the cause of the collision largely depends on a hidden terminal problem 1. In other words, in the case of determining that collision often occurs due to transmission of another radio frame signal during transmission of a radio frame signal by the wireless module part 11, the collision cause analysis part 23 identifies a major cause of a collision as the hidden terminal problem 1. The hidden terminal problem 1 will be described in detail later.

Further, in a case where the collision pattern (K) is the most and the collision pattern (J) is 0 (or extremely small; for example, equal to or less than a predetermined threshold), the collision cause analysis part 23 determines that the cause of the collision largely depends on a hidden terminal problem 2. In other words, in the case of determining that collision often occurs due to transmission of a radio frame signal by the wireless module part 11 during transmission of another radio frame signal, the collision cause analysis part 23 identifies a major cause of a collision as the hidden terminal problem 2. The hidden terminal problem 2 will be described in detail later.

Further, in a case where the sum of the collision patterns (J) and (K) is the most, the collision cause analysis part 23 determines that the cause of the collision largely depends on a hidden terminal problem 3. In other words, in the case of determining that collision occurs due to transmission of another radio frame signal during transmission of a radio frame signal by the wireless module part 11 and also collision occurs due to transmission of a radio frame signal by the wireless module part 11 during transmission of another radio frame signal, the collision cause analysis part 23 identifies a major cause of a collision as the hidden terminal problem 3. The hidden terminal problem 3 will be described in detail later.

Thus, the collision cause analysis part 23 identifies a collision cause by comparing occurrence of a collision pattern (a collision status). In other words, the collision cause analysis part 23 identifies a major cause of collision on the basis of a collision pattern and the number of the collision patterns (the frequency of occurrence, or the like). Then, the collision cause analysis part 23 transmits the identified cause to the parameter adjustment part 24.

Now, the cause of occurrence of collision will be described in detail. First, coincidence of backoff times will be described.

Coincidence of backoff times represents that a transmission standby time randomly selected by the wireless module part 11 coincides with and a transmission standby time randomly selected by another wireless communication terminal. In general, under CSMA/CA, each wireless communication terminal performs carrier sensing (monitoring) of the status of its surroundings and, in a case where another terminal performing wireless communication is present therearound, performs communication so as to prevent collision of communications. For example, referring to FIG. 8, the wireless communication terminal 1 is configured to avoid performing transmission during transmission by another wireless communication terminal. Moreover, the other wireless communication terminal is configured to avoid performing transmission during transmission by the wireless communication terminal 1 and still another wireless communication terminal. Therefore, collision does not occur in principle as shown by a spatial waveform in FIG. 8. However, as shown in FIG. 9, when the wireless communication terminals simultaneously finish waiting after random standby times, the wireless communication terminals start transmission. In other words, backoff times are determined at random and therefore the wireless communication terminals may finish waiting at the same time unintentionally. In this case, the wireless communication terminals start transmission simultaneously and collision of radio frame signals occurs. This is coincidence of backoff times. The probability of coincidence of backoff times increases as the number of terminals increases.

Figure 10:
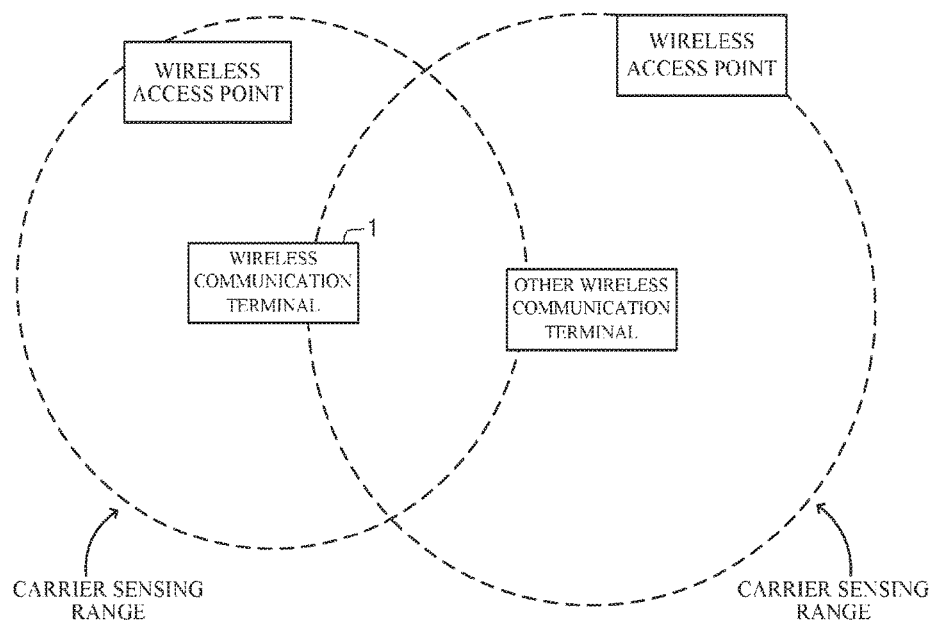
FIG. 10 is a diagram for describing a hidden wireless terminal as one of the causes of collision.
Figure 11:
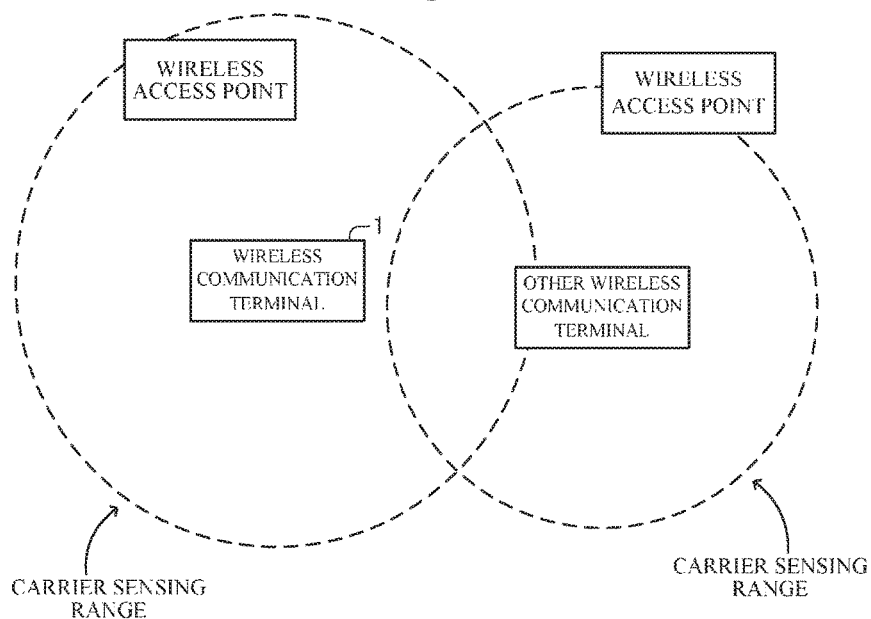
FIG. 11 is a diagram for describing a hidden wireless terminal as one of the causes of collision.
Figure 12:
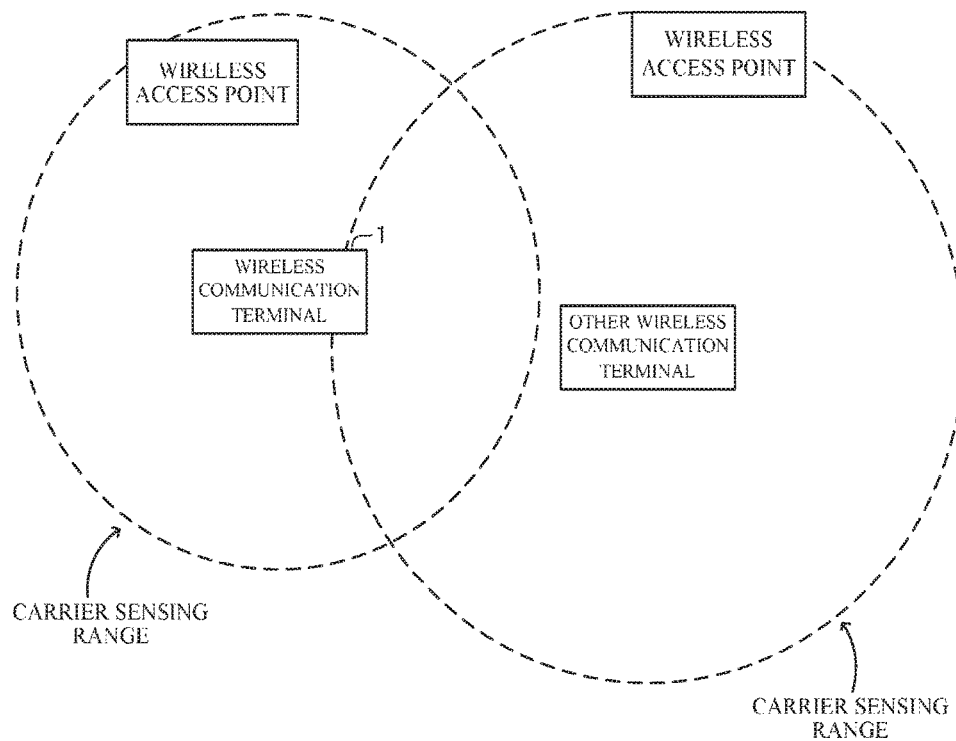
FIG. 12 is a diagram for describing a hidden wireless terminal as one of the causes of collision.
Figure 13:
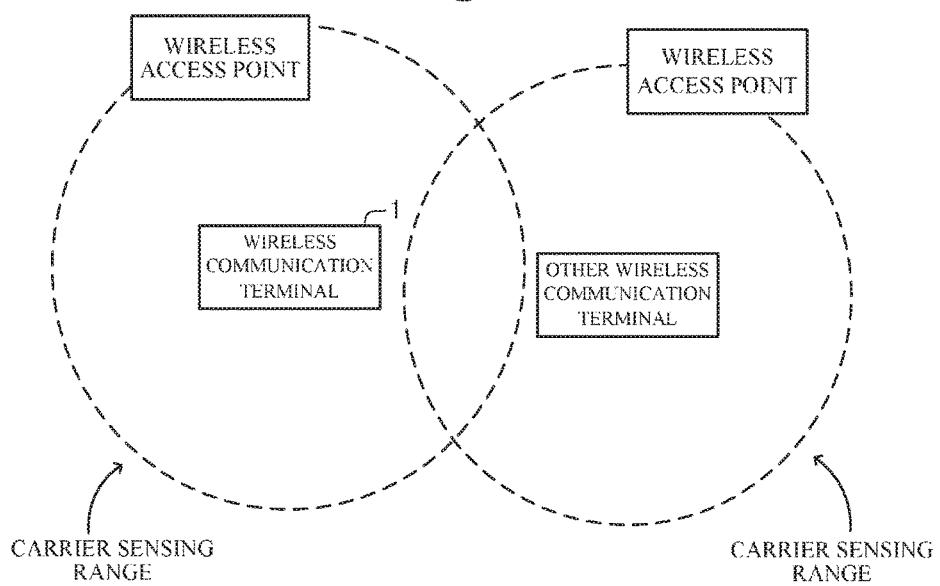
FIG. 13 is a diagram for describing a hidden wireless terminal as one of the causes of collision.

Next, the hidden terminal problem will be described. As described before, under CSMA/CA, each wireless communication terminal performs carrier sensing (monitoring) of the status of its surroundings and, in a case where another terminal performing wireless communication is present therearound, performs communication so as to prevent communications from colliding with each other. Therefore, for example, as shown in FIG. 10, in a case where the wireless communication terminal 1 and the other wireless communication terminal successfully perform carrier sensing each other, there is no problem (but there is a problem of coincidence of backoff times). However, for example, as shown in FIG. 11, in a case where the other wireless communication terminal fails to perform carrier sensing while the wireless communication terminal 1 (the local device) successfully performs carrier sensing, the other wireless communication terminal cannot sense the wireless communication terminal 1. Therefore, in this case, another radio frame signal may be transmitted during transmission of a radio frame signal by the wireless module part 11 of the wireless communication terminal 1. As a result, collision occurs. In other words, in a case where the other wireless communication terminal fails to perform carrier sensing while the wireless communication terminal 1 (the local device) successfully perform carrier sensing, collision may occur. This case will be referred to as the hidden terminal problem 1. Likewise, as shown in FIG. 12, in a case where the wireless communication terminal 1 (the local device) fails to perform carrier sensing while the other wireless communication terminal successfully perform carrier sensing, collision may occur due to transmission of a radio frame signal by the wireless module part 11 during transmission of another radio frame signal. This case will be referred to as the hidden terminal problem 2. Moreover, as shown in FIG. 13, in a case where either the wireless communication terminal 1 (the local device) or the other communication terminal fail to perform carrier sensing, collision based on both the hidden terminal problems 1 and 2 occur. This case will be referred to as the hidden terminal problem 3.

Thus, even under CSMA/CA, collision may be caused by coincidence of backoff times and the hidden terminal problems (1, 2 and 3). Then, the collision cause analysis part 23 specifies coincidence of backoff times or the hidden terminal problems as the cause of collision.

When collision has occurred due to coincidence of backoff times, the status of the collision is collision occurring because the local device and the other device simultaneously transmit radio frame signals. That is, when collision has occurred due to coincidence of backoff times, the pattern of the collision is any of the patterns (A) to (I) shown in FIG. 5. On the other hand, when collision has occurred due to the hidden terminal problem, the status of the collision is collision occurring because the other wireless frame signal is transmitted during transmission of the radio frame signal by the wireless module part 11. Alternatively, the status of the collision is collision occurring because the radio frame signal is transmitted by the wireless module part 11 during transmission of the other radio frame signal. That is, when collision has occurred due to the hidden terminal problem, the pattern of the collision is either the pattern (J) or the pattern (K) shown in FIG. 5 or both of them.

Thus, a collision pattern (a collision status) varies depending on the cause of occurrence of collision. Therefore, by examining the way of occurrence of collision and the number thereof (the frequency of occurrence, or the like) (depending on a collision pattern or a collision status), the collision cause analysis part 23 can identify the cause of the collision.

In this exemplary embodiment, the collision cause analysis part 23 analyzes the cause of collision, for example, when the transmission-loss-rate and collision-rate threshold comparison part 22 determines there is a need for parameter adjustment and also determines the cause of transmission loss is collision. However, analysis of the cause of collision by the collision cause analysis part 23 can be implemented without limited to the abovementioned case. For example, the collision cause analysis part 23 can be configured to analyze the cause of collision when the transmission-loss-rate and collision-rate threshold comparison part 22 determines occurrence of attenuation is present but the number of occurring collisions is small, when the transmission-loss-rate and collision-rate threshold comparison part 22 determines transmission is normally performed but occurrence of collision is present, and or the like.

The parameter adjustment part 24 has a function of performing parameter adjustment based on a collision cause identified by the collision cause analysis part 23 or occurrence details (attenuation) determined by the transmission-loss-rate and collision-rate threshold comparison part 22. The parameter adjustment part 24 acquires information about a collision cause identified by the collision cause analysis part 23 from the collision cause analysis part 23. Alternatively, the parameter adjustment part 24 receives a determination result of attenuation from the transmission-loss-rate and collision-rate threshold comparison part 22. Then, the parameter adjustment part 24 acquires a parameter adjustment table corresponding to each collision cause or attenuation stored by the parameter storage part 25.

In a case where the result of determination by the transmission-loss-rate and collision-rate threshold comparison part 22 is attenuation, the parameter adjustment part 24 acquires a parameter adjustment table corresponding to attenuation (a transmission power parameter, and so on) from the parameter storage part 25. Referring to FIG. 14, for example, adjustment of increasing transmission power is written as a priority degree 1 on the parameter adjustment table corresponding to attenuation. Moreover, adjustment of decreasing a transmission rate is written as a priority degree 2 on the parameter adjustment table corresponding to attenuation. Therefore, the parameter adjustment part 24 performs parameter adjustment according to the priority degrees on the basis of the acquired parameter adjustment table corresponding to attenuation. The details of the priority degree will be described later.

Further, the parameter adjustment part 24 acquires a parameter adjustment table from the parameter storage part 25 depending on a collision cause identified by the collision cause analysis part 23. Then, the parameter adjustment part 24 performs parameter adjustment according to the priority degrees on the basis of the acquired parameter adjustment table.

For example, referring to FIG. 15, in a case where the cause of collision is coincidence of backoff times, the parameter adjustment part 24 acquires a parameter adjustment table (a backoff time parameter, and so on) on which adjustment such as perform no adjustment, increase a backoff time and increase a transmission rate is written. Moreover, referring to FIG. 16, in a case where the cause of collision is the hidden terminal problem 1, the parameter adjustment part 24 acquires a parameter adjustment table (a carrier sense parameter, and so on) on which adjustment such as increase transmission power, decrease a transmission rate and execute RTS/CTS (Request To Send/Clear To Send) is written. Moreover, referring to FIG. 17, in a case where the cause of collision is the hidden terminal problem 2, the parameter adjustment part 24 acquires a parameter adjustment table (a carrier sense parameter, and so on) on which adjustment such as decrease a carrier sense threshold, decrease a transmission rate and execute RTS/CTS is written. Moreover, referring to FIG. 18, in a case where the cause of collision is the hidden terminal problem 3, the parameter adjustment part 24 acquires a parameter adjustment table (a carrier sense parameter, and so on) on which adjustment such as perform both increase of transmission power and decrease of a carrier sense threshold, decrease a transmission rate and execute RTS/CTS is written. Herein, a carrier sense threshold represents a threshold for detecting power. By decreasing a carrier sense threshold, detection of power is facilitated, that is, carrier sensing of another wireless communication terminal is facilitated.

Thus, the parameter adjustment part 24 acquires the parameter adjustment table stored by the parameter storage part 25 depending on attenuation and collision causes, and performs parameter adjustment according to the priority degrees. Now, the priority degree will be described. On (or around the same time as) acquiring a parameter adjustment table from the parameter storage part 25, the parameter adjustment part 24 checks the details stored in the adjustment details storage part 26. As described later, the adjustment details storage part 26 stores a collision cause, a used parameter adjustment table and the detail of an adjusted parameter at the time of last parameter adjustment. Then, the parameter adjustment part 24 determines whether or not the detail of current parameter adjustment matches the detail of the parameter adjustment performed last time. In a case where the details do not match, the parameter adjustment part 24 selects a parameter with the priority degree 1 and performs adjustment of the parameter. On the other hand, in a case where the details match, the parameter adjustment part 24 selects a parameter with a next priority degree to the priority degree of the parameter adjusted last time and performs parameter adjustment. Thus, when performing different parameter adjustment from parameter adjustment performed last time, the parameter adjustment part 24 performs adjustment of the parameter with the priority degree 1. On the other hand, when performing the same parameter adjustment as parameter adjustment performed last time, the parameter adjustment part 24 performs adjustment of a parameter with a priority degree which is lower by one than the priority degree of the parameter adjusted last time.

In this manner, the parameter adjustment part 24 performs parameter adjustment. After that, the parameter adjustment part 24 transmits the collision cause, the used parameter adjustment table and the details of the adjusted parameter to the adjustment details storage part 26. Then, the adjustment details storage part 26 stores the details of the current adjustment. The amount of adjustment in parameter adjustment performed by the parameter adjustment part 24 can be determined at the discretion of the user, for example.

The parameter storage part 25 is configured by a storage device such as a hard disk, a ROM (Read Only Memory) and a RAM (Random Access Memory). The parameter storage part 25 stores parameter adjustment tables corresponding to attenuation and collision causes as described before. The parameter adjustment tables stored by the parameter storage part 25 are acquired by the parameter adjustment part 24. Meanwhile, the details of the parameter adjustment tables stored by the parameter storage part 25 described in this exemplary embodiment represent an example of the details which can be stored by the parameter storage part 25. The details stored by the parameter storage part 25 are not limited to the details described in this exemplary embodiment.

The adjustment details storage part 26 is configured with a storage device such as a hard disk and a RAM (Random Access Memory), for example. The adjustment details storage part 26 stores a collision cause, a used parameter adjustment table and the detail of an adjusted parameter at the time of last parameter adjustment. The stored details stored in the adjustment details storage part 26 are acquired by the parameter adjustment part 24.

That is the configuration of the wireless communication terminal 1 in this exemplary embodiment. Next, the operation of the wireless communication terminal 1 will be described.

Figure 19:
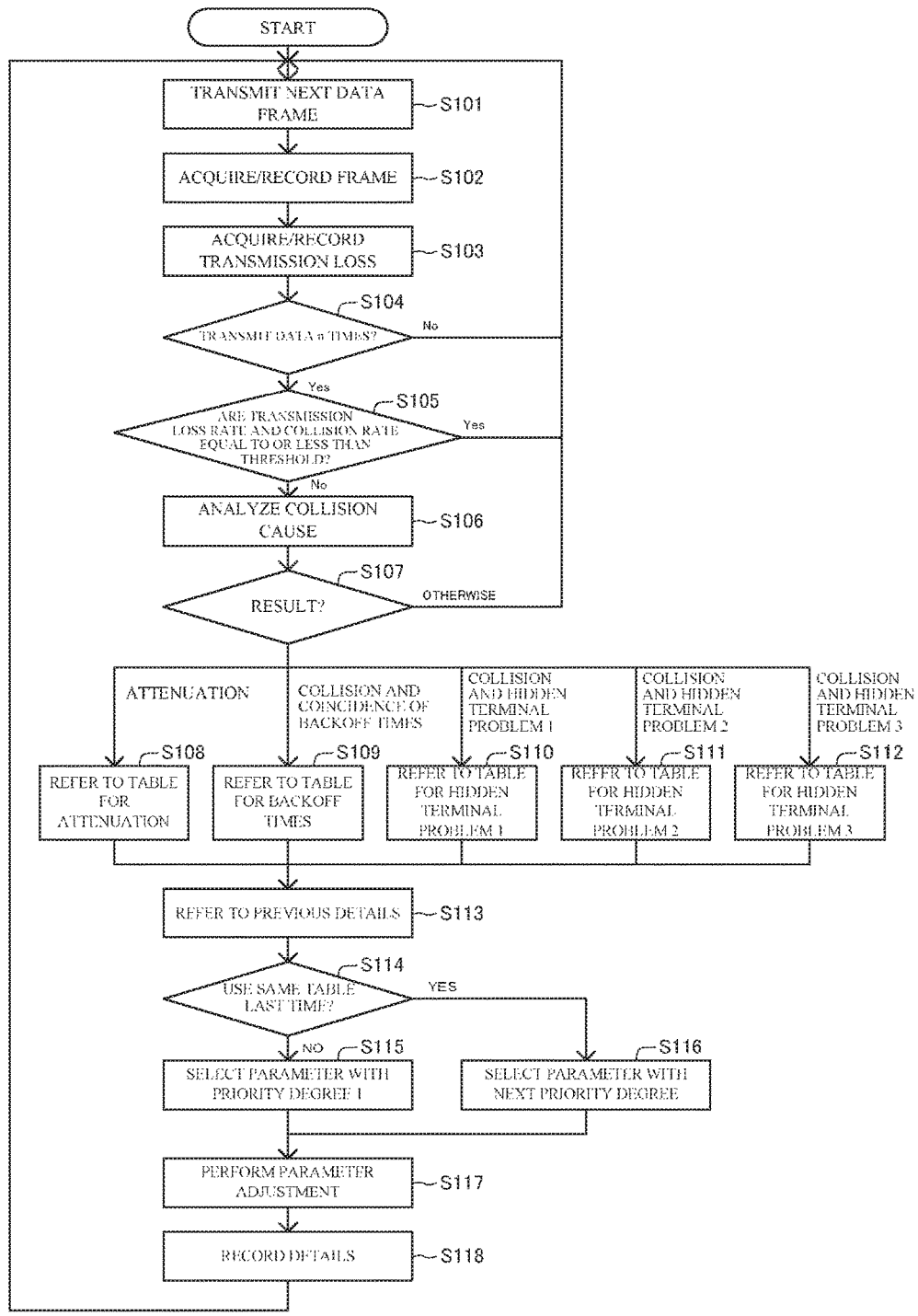
FIG. 19 is a flowchart for describing the operation of the wireless communication terminal according to the first exemplary embodiment of the present invention.

Referring to FIG. 19, first, the wireless module part 11 of the wireless communication terminal 1 transmits a radio frame signal (S101). Subsequently, the frame detection part 13 detects the radio frame signal transmitted by the wireless module part 11 (S102). Then, the frame detection part 13 transmits the detected result to the collision reduction control part 14.

Thus, the wireless communication terminal 1 monitors a radio frame signal transmitted by the wireless module part 11 by using the frame detection part 13 at all times.

Subsequently, the collision reduction control part 14 receives the result detected by the frame detection part 13. Then, the collision detection part 21 of the collision reduction control part 14 analyzes the detection result and thereby detects occurrence of collision and the status of the collision. Moreover, when finding a collision pattern is present (collision has occurred) as a result of analysis, the collision reduction control part 14 counts the number of times of occurrence of the detected collision pattern. Then, the collision reduction control part 14 compares the number of times of occurrence of collision with the number of radio frame signal transmissions by the wireless module part 11, and stores a collision rate regarding all the collision patterns and an occurrence rate per collision pattern.

Further, the loss detection part 12 monitors whether or not the transmitted radio frame signal has reached a transmission destination and transmission has succeeded (S103). In monitoring, the loss detection part 12 may calculate a transmission loss rate. When detecting transmission loss, the loss detection part 12 transmits a fact of detection of the transmission loss to the collision reduction control part 14. Moreover, the loss detection part 12 can transmit the transmission loss rate to the collision reduction control part 14. Transmission loss is detected by the loss detection part 12, for example, when the wireless module part 11 cannot receive an Ack frame.

Thus, every time the wireless module part 11 transmits a radio frame signal, a collision rate and a transmission loss rate are transmitted to the collision reduction control part 14. Then, the collision reduction control part 14 first determines whether or not radio frame signal transmission by the wireless module part 11 has been executed n times (S104). After radio frame signal transmission is executed n times by the wireless module part 11, the collision reduction control part 14 performs comparison between the transmission loss rate and a threshold and comparison between the collision rate and a threshold (S105). The number of transmissions n times, which is a trigger causing the collision reduction control part 14 to perform comparison with the thresholds, is not a particularly limited number. The number of transmissions n times may be determined at the discretion of the user.

Subsequently, the transmission-loss-rate and collision-rate threshold comparison part 22 of the collision reduction control part 14 compares the transmission loss rate and collision rate with a threshold Th, and determines whether a communication has been normally transmitted, or a communication has been normally transmitted but collision has occurred, or attenuation has occurred, or collision has occurred. This determination by the transmission-loss-rate and collision-rate threshold comparison part 22 is performed, for example, on the basis of the table shown in FIG. 6.

When determining that the cause of the transmission loss is attenuation, the transmission-loss-rate and collision-rate threshold comparison part 22 transmits the result of determination of attenuation to the parameter adjustment part 24 of the collision reduction control part 14. On the other hand, when determining that the cause of the transmission loss is collision, the transmission-loss-rate and collision-rate threshold comparison part 22 instructs the collision cause analysis part 23 of the collision reduction control part 14 to analyze the cause of the collision. Moreover, when determining that a communication has been normally transmitted, the transmission-loss-rate and collision-rate threshold comparison part 22 stops the subsequent processes. Moreover, when a communication has been normally transmitted but collision has occurred, the transmission-loss-rate and collision-rate threshold comparison part 22 stops the subsequent processes or instructs the collision cause analysis part 23 to analyze the cause of the collision.

The threshold Th used by the transmission-loss-rate and collision-rate threshold comparison part 22 can be determined at the discretion of the user. The threshold Th may be the same threshold for comparison with a transmission loss rate and comparison with a collision rate, or may be different thresholds for the respective comparisons.

Subsequently, when instructed to analyze the collision cause, the collision cause analysis part 23 of the collision reduction control part 14 analyzes the collision cause (S106). Analysis of a collision cause is performed on the basis of the table shown in FIG. 7, for example. Thus, the collision cause analysis part 23 identifies the major cause of the collision on the basis of the way of occurrence of collision and the number of collisions (the frequency of occurrence, or the like). Then, the collision cause analysis part 23 transmits the identified cause to the parameter adjustment part 24 of the collision reduction control part 4.

Thus, the result of determination by the transmission-loss-rate and collision-rate threshold comparison part 22 (occurrence of attenuation) and the result of analysis of the collision cause by the collision cause analysis part 23 are transmitted to the parameter adjustment part 24 (S107). On accepting the results, the parameter adjustment part 24 acquires a parameter adjustment table corresponding to the results (the determination result and the analysis result) stored by the parameter storage part 25. In other words, in the case of receiving a result of attenuation occurrence from the transmission-loss-rate and collision-rate threshold comparison part 22, the parameter adjustment part 24 acquires a parameter adjustment table corresponding to attenuation from the parameter storage part 25 (S108). Moreover, in the case of acquiring a result of analysis of coincidence of backoff times from the collision cause analysis part 23, the parameter adjustment part 24 acquires a parameter adjustment table corresponding to coincidence of backoff times from the parameter storage part 15 (S109). Likewise, in the case of acquiring a result of analysis of the hidden terminal problem 1, the parameter adjustment part 24 acquires a parameter adjustment table corresponding to the hidden terminal problem 1 (S110). Moreover, in the case of acquiring a result of analysis of the hidden terminal problem 2, the parameter adjustment part 24 acquires a parameter adjustment table corresponding to the hidden terminal problem 2 (S111). Moreover, in the case of acquiring a result of analysis of the hidden terminal problem 3, the parameter adjustment part 24 acquires a parameter adjustment table corresponding to the hidden terminal problem 3 (S112). On the other hand, in a case where the result of determination by the transmission-loss-rate and collision-rate threshold comparison part 22 and the result of analysis by the collision cause analysis part 24 are otherwise (for example, a communication has been normally transmitted but collision has occurred), the operation returns to data transmission n times and comparisons of a transmission loss rate and a collision rate with the thresholds Th are performed again.

Subsequently, on (or around the same time as) acquiring a parameter adjustment table from the parameter storage part 25, the parameter adjustment part 24 checks the details stored in the adjustment details storage part 26 (S113). Then, the parameter adjustment part 24 determines whether or not the detail of current parameter adjustment matches the detail of previous parameter adjustment (S114).

In the case of determining that the detail of the parameter adjustment does not match the detail of the previous parameter adjustment, the parameter adjustment part 24 selects a parameter with the priority degree 1 (S115). On the other hand, in the case of determining that the detail of the parameter adjustment matches the detail of the previous parameter adjustment, the parameter adjustment part 24 selects a parameter with a next priority degree to the priority degree of the previously adjusted parameter (S116). Then, the parameter adjustment part 24 executes adjustment of the selected parameter (S117). Moreover, the parameter adjustment part 24 transmits the collision cause, the used parameter adjustment table and the detail of the adjusted parameter to the adjustment details storage part 26 (S118). After that, the process returns to the top of the process and the process is executed again.

The wireless communication terminal 1 thus repeats the process. By repeating the process, the wireless communication terminal 1 feeds back the cause of collision and the detail of adjustment and also handles various kinds of causes during its operation. In a case where a plurality of collision causes are present in the mixed state, the wireless communication terminal 1 handles the collision causes in the decreasing order of the frequency of occurrence.

Accordingly, the wireless communication terminal 1 in this exemplary embodiment has the collision reduction control part 14. The collision reduction control part 14 in this exemplary embodiment has the collision detection part 21 and the collision cause analysis part 23. Such a configuration enables the wireless communication terminal 1 in this exemplary embodiment to cause the collision cause analysis part 23 to analyze the cause of collision depending on a collision status (a collision pattern) detected by the collision detection part 21. Moreover, the wireless communication terminal 1 is enabled to perform parameter adjustment corresponding to a collision status on the basis of the result of analysis of a collision cause. As a result, it becomes possible to perform appropriate parameter adjustment corresponding to the cause of collision (the status of collision), and it becomes possible to accurately prevent packets from colliding.

Second Exemplary Embodiment

Next, a second exemplary embodiment of the present invention will be described referring to the drawings. In the second exemplary embodiment, a wireless communication terminal 3 which can estimate the number of terminals around itself will be described as an application of the first exemplary embodiment. The wireless communication terminal 3 has the same components as the wireless communication terminal 1 described in the first exemplary embodiment. Therefore, in this exemplary embodiment, a component characteristic of the second exemplary embodiment will be described. In the drawings to be described below, the same component as the already described component will be denoted by the same reference numeral.

Figure 20:
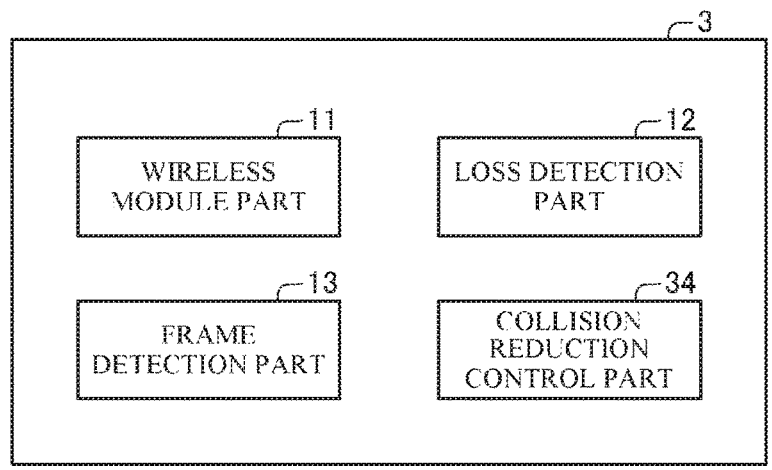
FIG. 20 is a block diagram showing the configuration of a wireless communication terminal according to a second exemplary embodiment of the present invention.
Figure 21:
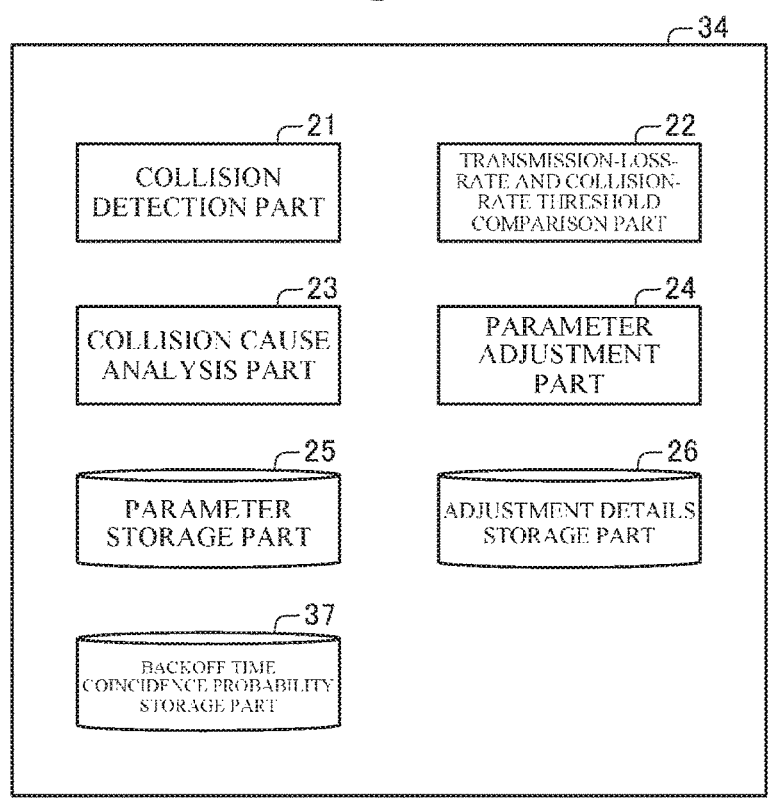
FIG. 21 is a function block diagram showing an example of a function of a collision reduction control part shown in FIG. 20.

Referring to FIG. 20, the wireless communication terminal 3 has the wireless module part 11, the loss detection part 12, the frame detection part 13, and a collision reduction control part 34. Moreover, referring to FIG. 21, the collision reduction control part 34 has functions as the collision detection part 21, the transmission-loss-rate and collision-rate threshold comparison part 22, the collision cause analysis part 23, the parameter adjustment part 24, the parameter storage part 25, the adjustment details storage part 26, and a backoff time coincidence probability storage part 37. The respective functions of the collision reduction control part 34 are implemented by execution of a program installed in the collision reduction control part 34

Thus, the wireless communication terminal 3 in this exemplary embodiment is characterized in that the collision reduction control part 34 has the backoff time coincidence probability storage part 37. The backoff time coincidence probability storage part 37 will be described below.

The backoff time coincidence probability storage part 37 is composed of a storage device such as a hard disk, a ROM (Read Only Memory) and a RAM (Random Access Memory), for example. The backoff time coincidence probability storage part 37 stores a table of probabilities of coincidence of random values for each CW (Contention Window). Because the backoff time coincidence probability storage part 37 stores such information, the wireless communication terminal 3 can estimate the number of terminals around itself.

More detailed description will be made below. First, a backoff time can be found on the basis of CW in the IEEE802.11 standard. Specifically, a backoff time can be found by using the following equation.

Backoff Time=Random Value×Slot Time

A random value is a random integer generated within the range from 0 to CW. A CW is a variable value and any value within the range from 15 to 1023. A slot time is a fixed value for each communication scheme to be used.

Assuming the wireless communication terminal 3 performs communication with CW=15, sixteen random values 0 to 15 are generated. Therefore, in a case where n units of wireless communication terminals with the same value of CW are present around the wireless communication terminal 3, a probability of coincidence of random values is, for example, as shown below.

When n=1: $1-(15/16)^1$=approximately 6%
When n=2: $1-(15/16)^2$=approximately 12%
When n=3: $1-(15/16)^3$=approximately 18%
When n=16: $1-(15/16)^{16}$=approximately 64%

In other words, a probability of coincidence of random values can be found from the following equation.

$1-((CW-1)/CW)^n$

From the abovementioned equation for obtaining a backoff time, backoff times coincide when random values coincide. In other words, collision caused by coincidence of backoff times occurs consequently. Therefore, a collision rate can be found by using the equation for finding a probability of coincidence of random values described above.

Collision rate=$1-((CW-1)/CW)^n$.

The table of probabilities of coincidence of random values for each CW, obtained in the abovementioned manner, is stored in the backoff time coincidence probability storage part 37. Therefore, the wireless communication terminal 3 can estimate the number of wireless communication terminals around itself by comparing a collision rate detected by the collision detection part 21 with a probability of coincidence of random values stored in the backoff time coincidence probability storage part 37. In other words, the wireless communication terminal 3 can identify the number n of wireless communication terminals around itself on the basis of a collision rate, namely, a probability of coincidence of random values.

Thus, the wireless communication terminal 3 in this exemplary embodiment has the backoff time coincidence probability storage part 37. Such a configuration enables the wireless communication terminal 3 in this exemplary embodiment to compare a calculated collision rate with a probability of coincidence of backoff times. As a result, the wireless communication terminal 3 can estimate the number of terminals around itself.

Identification of the number of terminals to collide with can also be performed by, for example, when transmission power is set to the maximum or the minimum, recording the collision patterns (A) to (I) shown in FIG. 5 and classifying for each transmission power of a collision destination. The wireless communication terminal 3 may also be configured to perform such classification.

Third Exemplary Embodiment

Next, a third exemplary embodiment of the present invention will be described referring to the drawings. In the third exemplary embodiment, a wireless communication terminal 4 configured to be able to also execute channel shift as one of the changes of parameters according to collision statuses will be described. The wireless communication terminal 4 in this exemplary embodiment is configured to estimate the number of terminals around itself. Moreover, the wireless communication terminal 4 in this exemplary embodiment is configured to execute channel shift when the estimated number of terminals exceeds a predetermined shift threshold.

Figure 22:
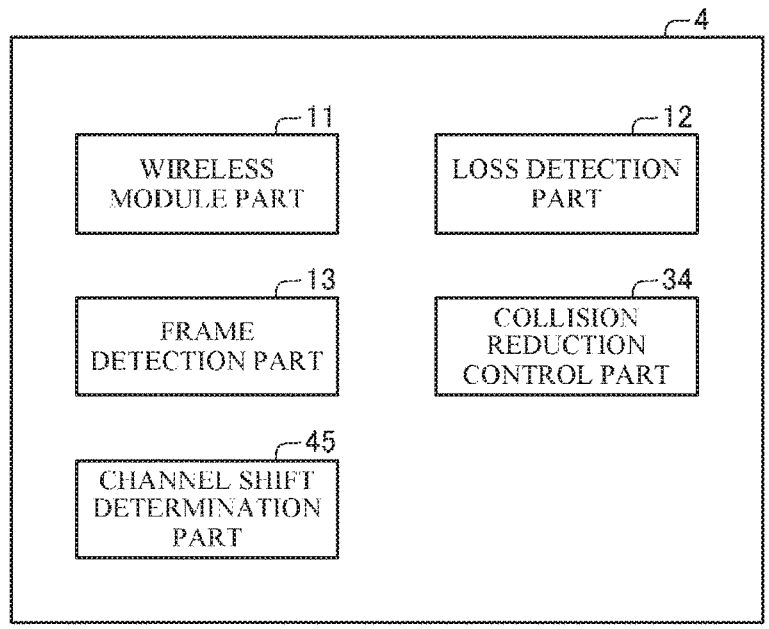
FIG. 22 is a block diagram showing the configuration of a wireless communication terminal according to a third exemplary embodiment of the present invention.

Referring to FIG. 22, the wireless communication terminal 4 in this exemplary embodiment has the wireless module part 11, the loss detection part 12, the frame detection part 13, the collision reduction control part 34, and a channel shift determination part 45.

As described before, the collision reduction control part 34 is configured to be able to estimate the number of other terminals around itself on the basis of a collision rate. Description of this configuration will be omitted because it has already been made.

The channel shift determination part 45 has a function of determining whether or not to execute channel shift on the basis of the number of other terminals estimated by the collision reduction control part 34. As described before, the more the number of wireless communication terminals becomes, the higher a probability of occurrence of collision due to coincidence of backoff times becomes. Moreover, even if the parameter adjustment part 24 performs adjustment regarding coincidence of backoff times, a collision reduction effect thereof has a limit because a backoff time has the upper limit. Therefore, the channel shift determination part 45 compares the number of other terminals present around estimated by the collision reduction control part 34 with a predetermined shift threshold. In a case where the number of other terminals present around estimated by the collision reduction control part 34 exceeds a predetermined shift threshold, the channel shift determination part 45 determines to perform channel shift. In other words, in a case where the number of other terminals present around estimated by the collision reduction control part 34 exceeds a predetermined shift threshold, the channel shift determination part 45 determines that an effect of channel shift is higher than that of adjustment of a backoff time, and determines to execute channel shift. Thus, by executing channel transition when the number of terminals present around increases, it is possible to more effectively reduce collision. When channel shift is performed, the present invention is implemented again on a destination channel of the shift.

Thus, the wireless communication terminal 4 in this exemplary embodiment has the collision reduction control part 34 and the channel shift determination part 45. Such a configuration enables the wireless communication terminal 4 to cause the collision reduction control part 34 to estimate the number of terminals present around and perform channel shift in accordance with the estimated number of terminals. As a result, it is possible to more effectively reduce collision.

Fourth Exemplary Embodiment

Next, a fourth exemplary embodiment of the present invention will be described referring to the drawings. In the fourth exemplary embodiment, a wireless communication terminal 5 which, upon detecting collision, stops transmission of a currently transmitted radio frame signal and again performs transmission of the radio frame signal on which the collision has been detected will be described.

Figure 23:
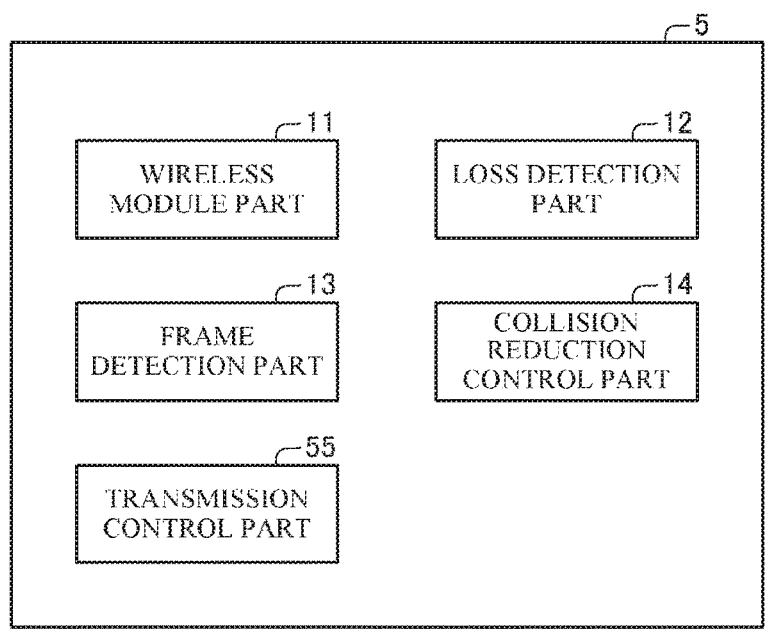
FIG. 23 is a block diagram showing the configuration of a wireless communication terminal according to a fourth exemplary embodiment of the present invention.
Figure 24:
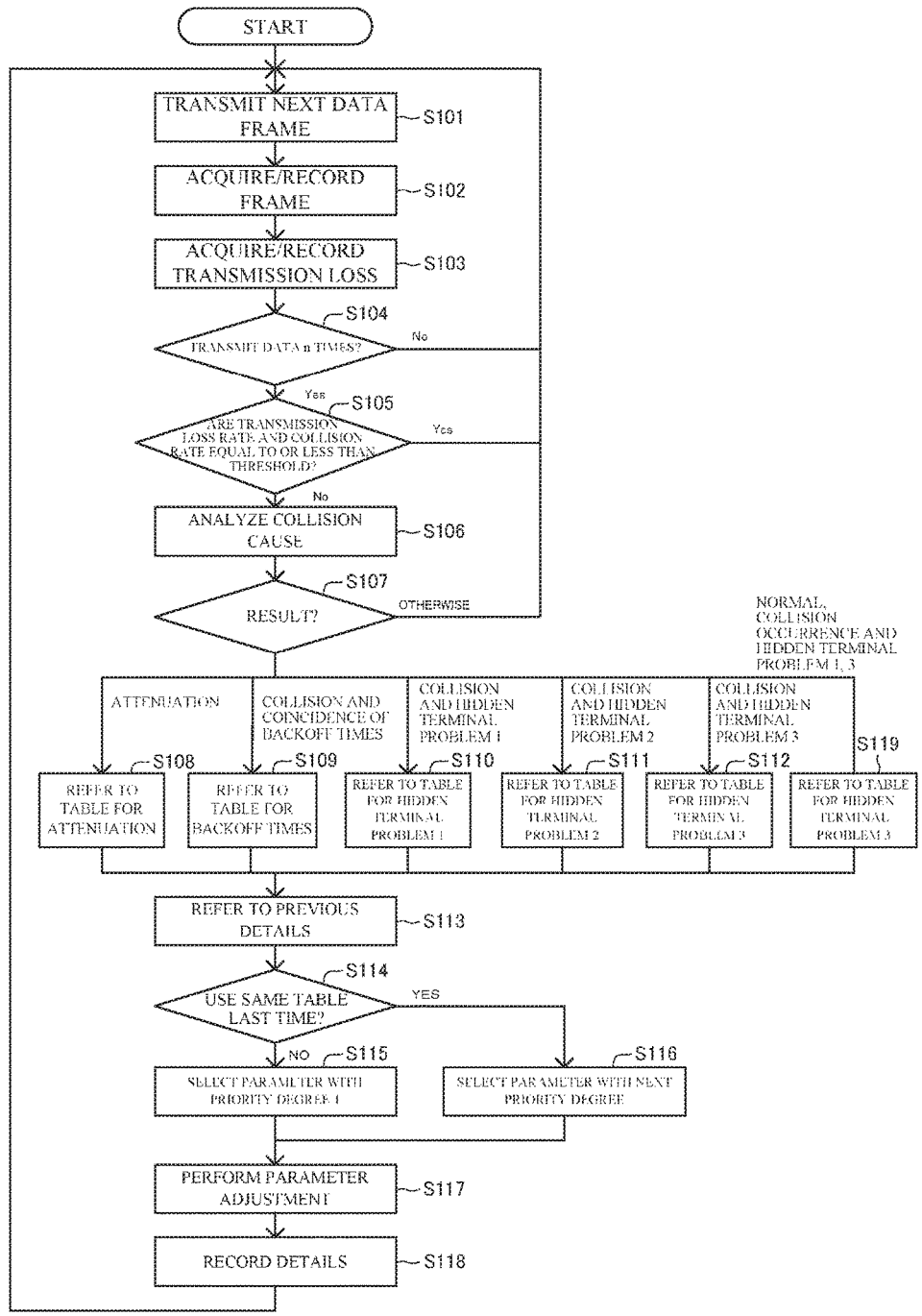
FIG. 24 is a flowchart for describing the operation of a wireless communication terminal according to a fifth exemplary embodiment of the present invention.

Referring to FIG. 23, the wireless communication terminal 5 in this exemplary embodiment has the wireless module part 11, the loss detection part 12, the frame detection part 13, the collision reduction control part 14, and a transmission control part 55.

The transmission control part 55 has a function of controlling radio frame signal transmission by the wireless module part 11. Specifically, when the collision detection part 21 detects collision, the collision detection part 21 transmits a fact of detection of the collision to the transmission control part 55. Then, in response to the communication from the collision detection part 21, the transmission control part 55 instructs the wireless module part 11 to stop radio frame signal transmission currently performed. Moreover, the transmission control part 55 instructs the wireless module part 11 to execute a retransmission process of the radio frame signal having collided.

Thus, the wireless communication terminal 5 in this exemplary embodiment has the transmission control part 55. Such a configuration enables the wireless communication terminal 5 to execute control of the wireless module part 11 at the time of detection of collision by the collision detection part 21. Specifically, the wireless communication terminal 5 is enabled to stop radio frame signal transmission currently performed and execute a process of retransmission of the wireless radio signal having collided. As a result, even if collision occurs, it is possible to more securely transmit a radio frame signal.

Herein, the wireless communication terminal 5 in this exemplary embodiment has the wireless module part 11, the loss detection part 12, the frame detection part 13, the collision reduction control part 14, and the transmission control part 55. However, the wireless communication terminal 5 may have the collision reduction control part 34 instead of the collision reduction control part 14. Moreover, the wireless communication terminal 5 may have the channel shift determination part 45.

Fifth Exemplary Embodiment

Next, a fifth exemplary embodiment of the present invention will be described referring to the drawings. In the fifth exemplary embodiment, a wireless communication terminal 6 which can adjust the parameter of the local device and reduce transmission loss of another device will be described. The wireless communication terminal 6 in this exemplary embodiment can have the same components as the wireless communication terminals described before. Therefore, a description of the components will be omitted.

As mentioned before, there is a case where it is determined that the local device (the wireless communication terminal 6) has normally performed transmission but collision has occurred as a result of comparison by the transmission-loss-rate and collision-rate threshold comparison part 22. In this case, there is a case where as a result of collision cause analysis by the collision cause analysis part 23, it is found that the collision results from the hidden terminal problem 1 or the hidden terminal problem 3.

In this case, the transmission power of a radio frame signal from another device (another wireless communication terminal) colliding with a radio frame signal from the local device is too small to affect transmission and reception of the frame transmitted by the local device, so that it is possible to presume that transmission by the local device has been normally performed. On the other hand, in this case, the transmission power of the frame transmitted by the local device is large for the other device, so that it is possible to presume that transmission loss has occurred due to the effect of the local device.

Accordingly, in this case, namely, in a case where transmission has been normally performed and the hidden terminal problem 1 or 3 has occurred, it can be considered to configure the parameter adjustment part 24 to perform parameter adjustment and reduce transmission loss of another device. In order to realize such control, for example, the parameter storage part 25 stores a parameter adjustment table shown in FIG. 25. With such a configuration, the parameter adjustment part 24 acquires the parameter adjustment table shown in FIG. 25 from the parameter storage part 25 in a case where the abovementioned collision status is detected (in a case where transmission has been normally performed and the hidden terminal problem 1 or 3 has occurred). Then, the parameter adjustment part 24 performs adjustment of decreasing transmission power by referring to the parameter adjustment table. Such adjustment makes it possible to prevent a frame transmitted by the local device from colliding with a frame transmitted by another device.

Thus, the parameter storage part 25 in this exemplary embodiment stores a parameter adjustment table corresponding to a case where transmission has been normally performed and the hidden terminal problem 1 or 3 has occurred. Moreover, the parameter adjustment part 24 is configured to consult the parameter storage part 25 and perform parameter adjustment when transmission has been normally performed and the hidden terminal problem 1 or 3 has occurred. Such a configuration enables the parameter adjustment part 24 to, in a case where transmission has been normally performed and the hidden terminal problem 1 or 3 has occurred, decrease the transmission power of the local device to a level such that the transmission power does not affect another device. As a result, it is possible to reduce a frame transmitted by the local device from colliding with a frame transmitted by another device.

Sixth Exemplary Embodiment

Next, a sixth exemplary embodiment of the present invention will be described referring to the drawings. In the sixth exemplary embodiment, a wireless communication terminal 7 which detects collision of frames and, upon detecting collision of frames, perform parameter adjustment without analyzing a collision cause will be described.

Referring to FIG. 26, the wireless communication terminal 7 in this exemplary embodiment has the wireless module part 11, the loss detection part 12, the frame detection part 13, and a collision reduction control part 71. Thus, the wireless communication terminal 7 in this exemplary embodiment is characterized by having the collision reduction control part 71. Therefore, the collision reduction control part 71 will be described in detail below. Meanwhile, the same components as those already described will be denoted by the same reference numerals.

Referring to FIG. 27, the collision reduction control part 71 has functions as a collision detection part 81, the transmission-loss-rate and collision-rate threshold comparison part 22, a parameter adjustment part 83, a parameter storage part 84, and the adjustment details storage part 26.

The collision detection part 81 has a function of analyzing a detection result detected by the frame detection part 13 and detecting the presence or absence of occurrence of collision. The collision detection part 81 first receives a detection result (a power pattern) from the frame detection part 13. Then, the collision detection part 81 analyzes the detection result and thereby detects the presence or absence of occurrence of collision. In the exemplary embodiments described before, the collision detection part 81 performs detection of the presence or absence of occurrence of collision and judgment of a collision pattern. However, the collision detection part 81 in this exemplary embodiment, upon detecting collision, transmits information that the collision has been detected (or a collision rate) to the transmission-loss-rate and collision-rate threshold comparison part 22 without performing judgment of a collision pattern.

The transmission-loss-rate and collision-rate threshold comparison part 22 has the same function as that of the already described component. That is, the transmission-loss-rate and collision-rate threshold comparison part 22 compares a transmission loss rate and a collision rate with a predetermined threshold Th (a transmission loss rate threshold, a collision rate threshold). Then, the transmission-loss-rate and collision-rate threshold comparison part 22 determines the need for parameter adjustment and the details such as collision and attenuation on the basis of the result of comparison. After that, the transmission-loss-rate and collision-rate threshold comparison part 22 transmits the determination result to the parameter adjustment part 83.

The parameter adjustment part 83 has a function of performing parameter adjustment. The parameter adjustment part 83 first receives the result of comparison with the threshold Th from the transmission-loss-rate and collision-rate threshold comparison part 22. Then, the parameter adjustment part 83 refers to a parameter adjustment table stored in the parameter storage part 84. Specifically, in a case where the result of comparison by the transmission-loss-rate and collision-rate threshold comparison part 22 is attenuation, the parameter adjustment part 83 refers to a parameter adjustment table for attenuation. Alternatively, in a case where the result of comparison by the transmission-loss-rate and collision-rate threshold comparison part 22 is collision, the parameter adjustment part 83 refers to a parameter adjustment table for collision. Further, the parameter adjustment part 83 consults the adjustment details storage part 26 to refer to the details of previous adjustment, and selects a priority degree for parameter adjustment. Then, the parameter adjustment part 83 performs adjustment of a parameter with the selected priority degree. After that, the parameter adjustment part 83 stores the details of the adjustment into the adjustment details storage part 26. The method for selection of a priority degree performed by the parameter adjustment part 83 is the same as the already described one. Therefore, a description of the priority selection method will be omitted.

The parameter storage part 84 is composed of, for example, a storage device such as a hard disk, a ROM (Read Only Memory), and a RAM (Random Access Memory). In the parameter storage part 84, parameter adjustment tables are stored. The parameter adjustment tables stored by the parameter storage part 84 are acquired by the parameter adjustment part 83.

Now an example the parameter adjustment table stored by the parameter storage part 84 in this exemplary embodiment will be described. Referring to FIG. 28, the parameter storage part 84 stores, for example, a table as described below.

Priority degree 1: do nothing
Priority degree 2: increase a backoff time
Priority degree 3: increase transmission power
Priority degree 4: decrease carrier sense threshold
Priority degree 5: increase transmission power and decrease carrier sense threshold
Priority degree 6: decrease transmission rate
Priority degree 7: execute RTS/CTS Thus, the parameter storage part 84 encyclopedically stores the content of the parameter adjustment table stored by the parameter storage part 24. In other words, the parameter storage part 84 exhaustively stores the details of parameter adjustment necessary for each collision cause.

The adjustment details storage part 26 is composed of, for example, a storage device such as a hard disk and a RAM (Random Access Memory). The adjustment details storage part 26 stores a collision cause, a used parameter adjustment table and the detail of an adjusted parameter at the time of performing parameter adjustment last time. Storage details stored by the adjustment details storage part 26 is acquired by the parameter adjustment part 83.

That is the configuration of the wireless communication terminal 7. Next, an example of the operation of the wireless communication terminal 7 will be described. Below, characteristic operation of this exemplary embodiment will be described.

Figure 29:
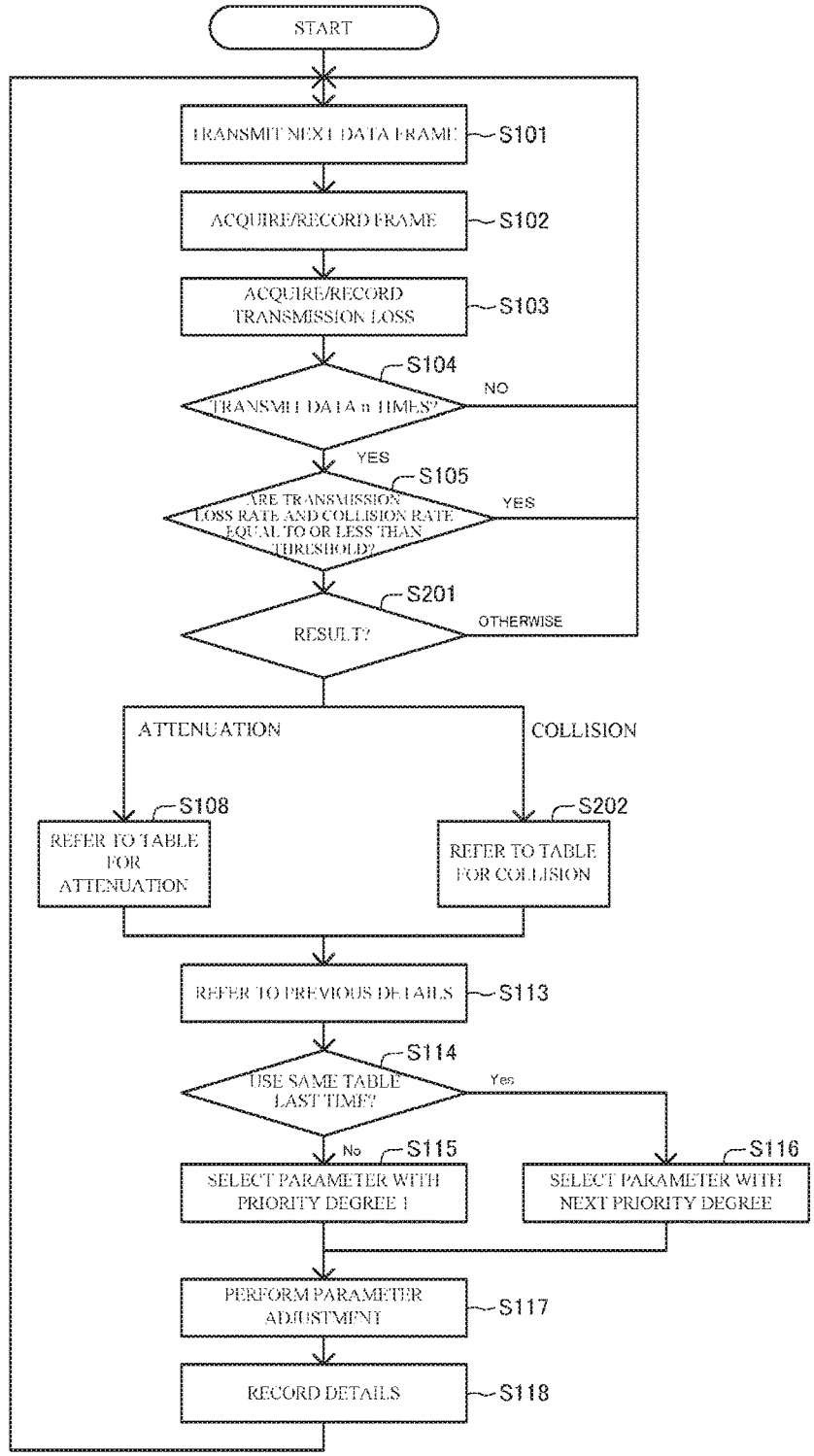
FIG. 29 is a flowchart for describing the operation of the wireless communication terminal according to the sixth exemplary embodiment of the present invention.

Referring to FIG. 29, the result of determination by the transmission-loss-rate and collision-rate threshold comparison part 22 (whether attenuation has occurred or collision has occurred) is transmitted to the parameter adjustment part 83 in this exemplary embodiment (S201). In response to the result, the parameter adjustment part 83 acquires a parameter adjustment table corresponding to the determination result stored by the parameter storage part 84. That is, in the case of receiving a result showing occurrence of attenuation from the transmission-loss-rate and collision-rate threshold comparison part 22, the parameter adjustment part 83 acquires the parameter adjustment table corresponding to attenuation from the parameter storage part 84 (S108). On the other hand, in the case of receiving a result showing occurrence of collision from the transmission-loss-rate and collision-rate threshold comparison part 22, the parameter adjustment part 83 acquires the parameter adjustment table corresponding to collision from the parameter storage part 84 (S202). After that, the parameter adjustment part 83 performs parameter adjustment corresponding to a priority degree by consulting the adjustment details storage part 26.

Thus, the wireless communication terminal 7 in this exemplary embodiment has the collision reduction control part 71 which has functions of the collision detection part 81, the parameter adjustment part 83 and the parameter storage part 84. With such a configuration, the collision detection part 81 detects collision. Moreover, the parameter adjustment part 83 performs parameter adjustment according to a priority degree by referring to the parameter adjustment tables stored in the parameter storage part 84. As described before, the parameter storage part 84 encyclopedically stores parameter adjustments necessary for every collision cause. Therefore, the wireless communication terminal 7 can reduce collision of packets by performing parameter adjustment in the order of priority degrees. Such a configuration of the wireless communication terminal 7 makes it possible to reduce collision of packets without performing analysis of a collision cause.

The details of the parameter adjustment tables stored by the parameter storage part 84 described in this exemplary embodiment represent an example of the details that can be stored by the parameter storage part 84. The details stored by the parameter storage part 84 are not limited to the details described in this exemplary embodiment.

Seventh Exemplary Embodiment

Next, a seventh exemplary embodiment of the present invention will be described referring to the drawings. In the seventh exemplary embodiment, a wireless communication terminal 9 which detects a collision status of radio frame signals and performs parameter change corresponding to the detected collision status will be described. In this exemplary embodiment, the outline of the configuration of the wireless communication terminal 9 will be described.

Referring to FIG. 30, the wireless communication terminal 9 has a wireless module part 91, a frame detection part 92, and a collision reduction control part 93.

The wireless module part 91 has a function of transmitting a radio frame signal. The frame detection part 92 has a function of detecting the power of a spatial radio signal on the same channel as a radio frame signal transmitted by the wireless module part 91. The collision reduction control part 93 has a function of, on the basis of a detection result detected by the frame detection part 92, detecting a given collision status of a radio frame signal transmitted by the wireless module part 91 and another radio frame signal, and performing parameter change corresponding to the detected given collision status.

Thus, the wireless communication terminal 9 has the wireless module part 91, the frame detection part 92, and the collision reduction control part 93. Such a configuration enables the wireless communication terminal 9 to cause the frame detection part 92 to detect a radio frame signal transmitted by the wireless module part 91 and check whether or not there is collision. Moreover, the wireless communication terminal 9 can, on the basis of a detection result detected by the frame detection part 92, detect collision between a radio frame signal transmitted by the wireless module part 91 and another radio frame signal and also detect a given collision status, and perform parameter change corresponding to the detected given collision status.

In other words, the wireless communication terminal 9 can perform appropriate parameter change corresponding to a collision status. As a result, the wireless communication terminal 9 can effectively reduce collision.

Further, the wireless communication terminal 9 described above can be realized by installation of a given program into the wireless communication terminal 9. Specifically, a program as another aspect of the present invention is a program including instructions for causing a wireless communication terminal to realize: a wireless module part which transmits a radio frame signal; a frame detection part which detects power of a spatial radio signal on the same channel as a radio frame signal transmitted by the wireless module part; and a collision reduction control part which, on the basis of a detection result detected by the frame detection part, detects collision between a radio frame signal transmitted by the wireless module part and another radio frame signal and also detects a given collision status, and performs parameter change corresponding to the detected given collision status.

Further, a wireless communication method executed by operation of the wireless communication terminal 9 is a method including: detecting the power of a spatial radio signal on the same channel as a transmitted radio frame signal; and, on the basis of a detection result, detecting collision between a radio frame signal and another radio frame signal and also detecting a given collision status, and performing parameter change corresponding to the detected given collision status.

The program and the wireless communication method having the configurations described above have the same action as the wireless communication terminal 9, and therefore, can achieve the object of the present invention.

Eighth Exemplary Embodiment

Next, an eighth exemplary embodiment of the present invention will be described referring to the drawings. In the eighth exemplary embodiment, a wireless communication terminal 100 which detects collision presence or absence information representing the presence or absence of collision and, on the basis of the detected collision presence or absence information, controls a transmission rate at the time of transmission of a radio frame signal by the wireless module part 11 will be described. That is, the wireless communication terminal 100 in this exemplary embodiment controls a transmission rate, which is one of the parameters described in the above exemplary embodiments, in accordance with the presence or absence of collision.

Referring to FIG. 31, the wireless communication terminal 100 in this exemplary embodiment has the wireless module part 11, the loss detection part 12 (the transmission loss information detection part), the frame detection part 13 (a portion of the collision information detection part), a collision presence or absence detection part 101 (a portion of the collision information detection part), and a multirate control part 102 (the transmission control part). The wireless module part 11, the loss detection part 12 and the frame detection part 13 have the same configurations as those described in the above exemplary embodiments. The collision presence or absence detection part 101 and the multirate control part 102 have a CPU and a storage device, which are not shown in the drawings, and realize functions to be described later by the CPU's execution of a program stored in the storage device.

The wireless module part 11 has an antenna part, which is not shown the drawings, and performs wireless communication through the antenna part. Moreover, the wireless module part 11 in this exemplary embodiment is configured to transmit a radio frame signal by using one of a plurality of transmission rates.

Further, the wireless module part 11 can have a function used at the time of performing wireless communication, such as execution of carrier sensing and increase or decrease of transmission power.

FIG. 32 shows an example of transmission rates used when the wireless module part 11 transmits a radio frame signal. The wireless module part 11 in this exemplary embodiment is configured to transmit a radio frame signal by using one of the transmission rates shown in FIG. 32 under control by the multirate control part 102 as described later. Specifically, the wireless module part 11 in this exemplary embodiment is controlled by the multirate control part 102 so as to, for example, increase by one a transmission rate used at the time of next transmission of a radio frame signal when the number of successes in transmission reaches a given number of times (for example, four times). For example, assuming the wireless module part 11 succeeds four times in transmission at a transmission rate of 24 Mbps shown in FIG. 32, the wireless module part 11 is controlled by the multirate control part 102 so as to transmit at a transmission rate of 36 Mbps, which is next higher to 24 Mbps, at the time of transmission of a radio frame signal next time. Moreover, the wireless module part 11 in this exemplary embodiment is controlled by the multirate control part 102 so as to, for example, decrease a transmission rate used at the time of transmission of a radio frame signal next time to a next lower transmission rate when transmission fails and the number of times that a given condition is satisfied reaches a given number of times (for example, four times). For example, assuming the wireless module part 11 fails in transmission at a transmission rate of 12 Mbps shown in FIG. 32 and the number of times that a given condition is satisfied reaches four times, the wireless module part 11 is controlled by the multirate control part 102 so as to use a transmission rate of 11 Mbps, which is next lower to 12 Mbps by one, at the time of transmission of a radio frame signal next time.

Thus, the wireless module part 11 in this exemplary embodiment is configured to transmit a radio frame signal at one of a plurality of transmission rates. An algorithm for determining a transmission rate used when the wireless module part 11 transmits a radio frame signal is not limited to the abovementioned one. As an algorithm used for determining a transmission rate used by the wireless module part 11 in wireless communication, various algorithms changing a rate by being triggered by success or failure in wireless communication can be employed.

The loss detection part 12 detects transmission loss information representing that a radio frame signal transmitted by the wireless module part 11 has not reached a transmission destination (transmission loss). Specifically, in a case where the wireless module part 11 has not received an Ack frame before a given time passes after transmission of a radio frame signal, the loss detection part 12 considers as occurrence of transmission loss, and detects information showing that (transmission loss information). Then, the loss detection part 12 transmits the detected transmission loss information to the multirate control part 102. On the other hand, in a case where the wireless module part 11 receives an Ack frame before a given time passes after transmission of a radio frame signal by the wireless module part 11, the loss detection part 12 transmits information showing, that to the multirate control part 102. Meanwhile, transmission of information to the multirate control part 102 in a case where a transmission loss is not caused (an Ack frame is received) may be performed by the wireless module part 11.

The frame detection part 13 detects the power of a spatial radio signal on the same channel as a radio frame signal transmitted by the wireless module part 11. That is, the frame detection part 13 detects a temporal change of the power of a radio frame signal transmitted by the wireless module part 11. Then, the frame detection part 13 transmits a detection result to the collision presence or absence detection part 101.

The collision presence or absence detection part 101 has a function of analyzing a detection result detected by the frame detection part 13 and thereby detecting collision presence or absence information showing the presence or absence of occurrence of collision, which is one of collision information showing the aspects of collision.

Specifically, first, the collision presence or absence detection part 101 receives a detection result from the frame detection part 13. Then, the collision presence or absence detection part 101 analyzes the received detection result and thereby detects collision presence or absence information showing the presence or absence of occurrence of collision. For example, in a case where it is determined that a plurality of transmission packets (radio frame signals) overlap on the basis of the detection result from the frame detection part 13, the collision presence or absence detection part 101 determines collision has occurred and detects collision presence or absence information showing occurrence of collision. Then, the collision presence or absence detection part 101 transmits collision presence or absence information showing occurrence of collision to the multirate control part 102. With this process, the collision presence or absence detection part 101 causes an interrupt to stop a process, which is executed by the multirate control part 102, of counting a transmission failure counter based on transmission loss information to be described later. On the other hand, for example, in a case where it is determined that transmission packets (radio frame signals) does not overlap on the basis of a detection result from the frame detection part 13, the collision presence or absence detection part 101 determines collision has not occurred and detects collision presence or absence information showing collision has not been caused. Then, the collision presence or absence detection part 101 transmits collision presence or absence information showing a collision is not occurring to the multirate control part 102. When transmitting collision presence or absence information showing a collision is not occurring, the collision presence or absence detection part 101 does not interrupt the multirate control part 102 so as to stop the counting process as mentioned above. Therefore, as described later, in the case of receiving collision presence or absence information showing a collision is not occurring, the multirate control part 102 counts the transmission failure counter on the basis of transmission loss information without stopping the process.

Thus, the collision presence or absence detection part 101 in this exemplary embodiment is configured to detect the presence or absence of occurrence of collision and transmit collision presence or absence information showing the presence or absence of collision to the multirate control part 102. In other words, the collision presence or absence detection part 101 in this exemplary embodiment is configured to detect collision information including collision presence or absence information and transmit the detected collision information including the collision presence or absence information to the multirate control part 102. Meanwhile, the collision presence or absence detection part 101 may be configured to detect collision information including collision status information showing a collision status.

The multirate control part 102 has a function of controlling a transmission rate used when the wireless module part 11 transmits a radio frame signal, in accordance with transmission loss information received from the loss detection part 12. Moreover, there is a case where the multirate control part 102 is caused to interrupt by the collision presence or absence detection part 101 so as to stop a process as described above. Therefore, the multirate control part 102 controls a transmission rate used when the wireless module part 11 transmits a radio frame signal, on the basis of transmission loss information received from the loss detection part 12 and collision presence or absence information received from the collision presence or absence detection part 101.

Further, the multirate control part 102 has a transmission success counting part and a transmission failure counting part, which are not shown in the drawings, and a storage device such as a memory storing a transmission success counter threshold (m) and a transmission failure counter threshold (n).

The transmission success counting part has a function of, when the multirate control part 102 receives information showing occurrence of no transmission loss, counting the number of successes in transmission of a radio frame signal under control by the multirate control part 102. In other words, when receiving information showing occurrence of no transmission loss (showing success in transmission), the multirate control part 102 executes a process of, for example, incrementing by one a transmission success counter of the transmission success counting part. On the other hand, the transmission failure counting part has a function of, when the multirate control part 102 receives transmission loss information, counting the number of failures in transmission of a radio frame signal under control by the multirate control part 102. In other words, when receiving transmission loss information, the multirate control part 102 intends to execute a process of, for example, incrementing by one a transmission failure counter of the transmission failure counting part. As described above, when the collision presence or absence detection part 101 detects collision presence or absence information showing occurrence of collision, the collision presence or absence detection part 101 interrupts the multirate control part 102 to stop the process of counting the transmission failure counter. Therefore, in the case of receiving transmission loss information and also receiving collision presence or absence information showing occurrence of collision, the multirate control part 102 stops the process of incrementing the transmission failure counter of the transmission failure counting part and does not count. On the other hand, in the case of receiving transmission loss information and also collision presence or absence information showing occurrence of no collision, the multirate control part 102 executes the process of, for example, incrementing by one the transmission failure counter of the transmission failure counting part.

Thus, the multirate control part 102 is configured to count the number of successes in transmission of a radio frame signal by the wireless module part 11. Moreover, the multirate control part 102 in this exemplary embodiment is configured to count the number of times that the wireless module part 11 fails in transmission of a radio frame signal and there is no occurrence of collision.

The transmission success counter threshold and the transmission failure counter are any numerical value such as four times. The transmission success counter threshold and the transmission failure counter threshold are compared with the numbers of counts by the transmission success counting part and the transmission failure counting part (the number of times that transmission of a radio frame signal has succeeded and the number of times that transmission has failed and collision has not occurred).

Specifically, after the abovementioned counting process, the multirate control part 102 determines whether or not the transmission failure counter counted by the transmission failure counting part is equal to or more than the transmission failure counter threshold. Then, in a case where the counted transmission failure counter is equal to or more than the transmission failure counter threshold, the multirate control part 102 changes a transmission rate used by the wireless module part 11 to a next lower rate (for example, a next rate on the right side in FIG. 32). In other words, in a case where the number of times that transmission has failed and the collision has not occurred becomes equal to or more than the transmission failure counter threshold, the multirate control part 102 executes control to change a transmission rate used by the wireless module part 11 to a next lower rate. On the other hand, in a case where the transmission failure counter counted by the transmission failure counting part is less than the transmission loss counter threshold, the multirate control part 102 determines whether or not the transmission success counter counted by the transmission success counting part is equal to or more than the transmission success counter threshold. Then, in a case where the counted transmission success counter is equal to or more than the transmission success counter threshold, the multirate control part 102 changes a transmission rate used by the wireless module part 11 to a next higher rate (for example, a next rate on the left shown in FIG. 32). In other words, in a case where the number of successes in transmission becomes equal to or more than the transmission success counter threshold, the multirate control part 302 executes control so as to change a transmission rate used by the wireless module part 11 to a next higher rate. Moreover, in a case where the transmission success counter counted by the transmission success counting part is less than the transmission success counter threshold, the multirate control part 102 determines not to change a rate.

Further, upon executing control to change the transmission rate of the wireless module part 11, the multirate control part 102 clears the transmission success counter counted by the transmission success counting part and the transmission failure counter counted by the transmission failure counting part. In other words, upon changing a transmission rate used by the wireless module part 11 to a next lower rate because the transmission failure counter is equal to or more than the transmission failure counter threshold, the multirate control part 102 then returns the values of the transmission success counter and the transmission failure counter to 0. On the other hand, upon changing a transmission rate used by the wireless module part 11 to a next higher rate because the transmission success counter is equal to or more than the transmission success counter threshold, the multirate control part 102 then returns the values of the transmission success counter and the transmission failure counter to 0. Thus, the multirate control part 102 is configured to, every time controlling a transmission rate used by the wireless module part 11, return the transmission failure counter and the transmission success counter to 0 and count again.

Thus, the multirate control part 102 in this exemplary embodiment controls a transmission rate at the time of transmission of a radio frame signal by the wireless module part 11, on the basis of transmission loss information received from the loss detection part 12 and collision presence or absence information received from the collision presence or absence detection part 101.

In this exemplary embodiment, as described above, the multirate control part 102 executes control to increase a transmission rate when transmission succeeds a given number of times and, on the other hand, executes control to decrease a transmission rate when the number of times of failure in transmission without collision reaches a given number of times. However, implementation of the present invention is not limited to the above case. The multirate control part 102 can apply various algorithms for controlling a transmission rate on the basis of transmission loss information and collision presence or absence information.

Further, in this exemplary embodiment, the transmission success counter threshold and the transmission failure counter threshold are four, for example. However, the transmission success counter threshold and the transmission failure counter threshold are not limited to the abovementioned one. The transmission success counter threshold and the transmission failure counter threshold may be equal to or less than three or equal to or more than five. Moreover, the transmission success counter threshold and the transmission failure counter threshold may be the same value or different values.

Further, in this exemplary embodiment, a component for detecting collision presence or absence information showing the presence or absence of collision is the frame detection part 13 and the collision presence or absence detection part 101. However, the configuration of the present invention is not limited to the above case as far as collision presence or absence information showing the presence or absence of collision can be detected. The present invention can have various components for detecting collision presence or absence information showing the presence or absence of collision instead of the frame detection part 13 and the collision presence or absence detection part 101.

That is the configuration of the wireless communication terminal 100 in this exemplary embodiment. Next, the operation of the wireless communication terminal 100 will be described.

Figure 33:
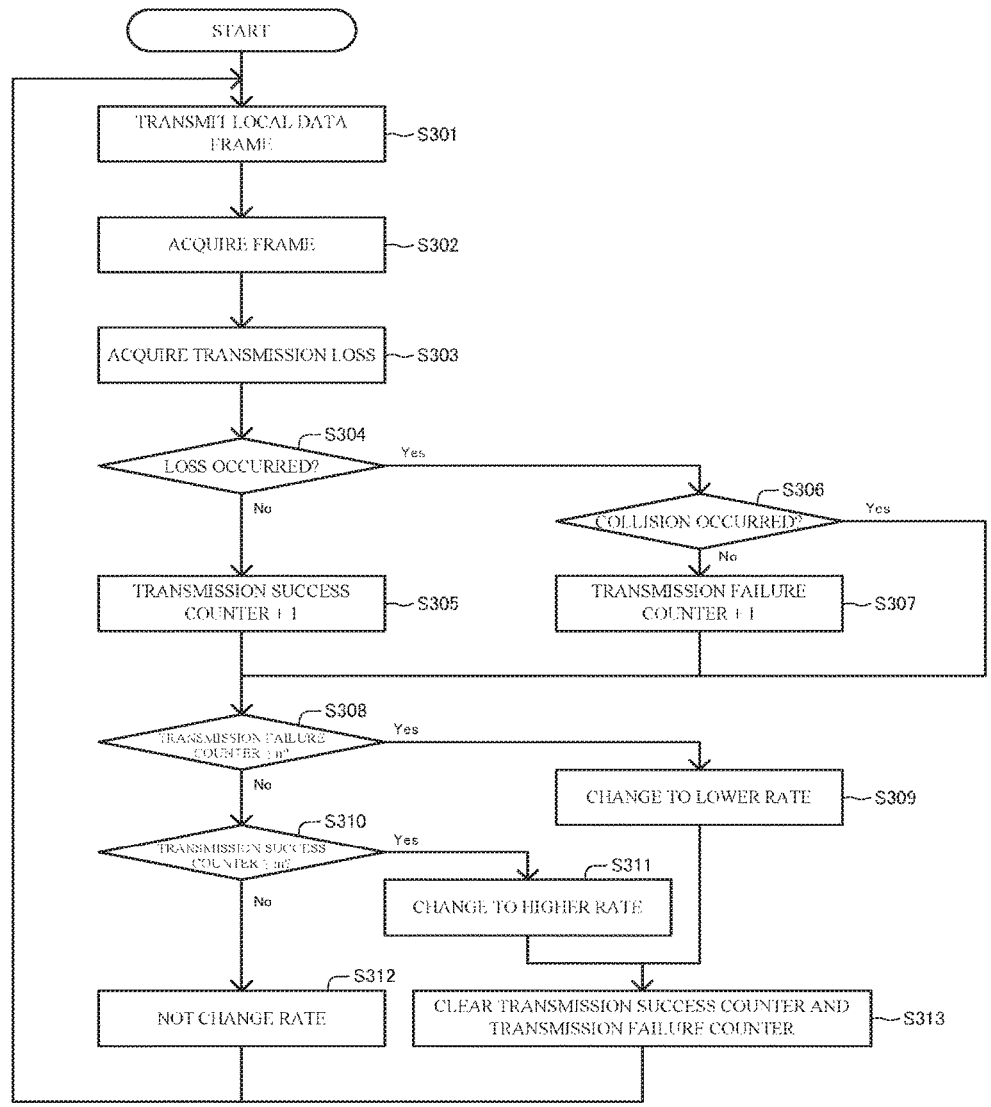
FIG. 33 is a flowchart for describing the operation of the wireless communication terminal according to the eighth exemplary embodiment of the present invention.

Referring to FIG. 33, first, the wireless module part 11 of the wireless communication terminal 100 transmits a radio frame signal (S301). Subsequently, the frame detection part 13 acquires the wireless frame signal transmitted by the wireless module part 11 (S302).

Thus, the frame detection part 13 acquires a radio frame signal transmitted by the wireless module part 11, whereby collision of radio frame signals is monitored. Specifically, referring to FIG. 34, upon acquiring a radio frame signal in the abovementioned operation, the frame detection part 13 transmits the acquired result to the collision presence or absence detection part 101. Subsequently, the collision presence or absence detection part 101 receives the result transmitted by the frame detection part 13 (S321). Then, the collision presence or absence detection part 101 analyzes the received result and detects collision presence or absence information (S322). For example, when determining from the received result that transmission packets overlap, the collision presence or absence detection part 101 determines that collision has occurred and detects collision presence or absence information representing occurrence of collision. Moreover, for example, when determining from the detection result from the frame detection part 13 that transmission packets (radio frame signals) do not overlap, the collision presence or absence detection part 101 determines that collision has not occurred and detects collision presence or absence information representing occurrence of no collision. When detecting collision presence or absence information representing occurrence of collision (S323: Yes), the collision presence or absence detection part 101 transmits the collision presence or absence information representing occurrence of collision to the multirate control part 102, thereby interrupting to stop the process of counting the transmission failure counter (S325). On the other hand, when detecting collision presence or absence information representing occurrence of no collision (S323: No), the collision presence or absence detection part 101 transmits the collision presence or absence information representing occurrence of no collision to the multirate control part 102 (S324). In other words, when detecting collision presence or absence information representing occurrence of no collision (S323: No), the collision presence or absence detection part 101 does not interrupt to stop the process of counting the transmission failure counter. In such operation, the wireless communication terminal 100 monitors collision of radio frame signals by using the frame detection part 13 and the collision presence or absence detection part 101.

Further, as shown in FIG. 33, the loss detection part 12 monitors the wireless module part 11 and thereby acquires transmission loss information representing that the radio frame signal transmitted by the wireless module part 11 has not reached a transmission destination (S303). Then, the loss detection part 12 transmits the acquired transmission loss information to the multirate control part 102.

Subsequently, the multirate control part 102 determines whether or not transmission loss has occurred on the basis of the transmission loss information received from the loss detection part 12 (S304). In a case where transmission loss has not occurred (S304: No), the multirate control part 102 increments by one the transmission success counter of the transmission success counting part (S305). On the other hand, in a case where transmission loss has occurred (S304: Yes), the multirate control part 102 intends to increment by one the transmission failure counter of the transmission failure counting part. As mentioned above, when the collision presence or absence detection part 101 detects collision detection information representing occurrence of collision, the collision presence or absence detection part 101 interrupts the multirate control part 102 so as to stop the process of counting the transmission failure counter based on the transmission loss information (S325 of FIG. 34). Therefore, in a case where transmission loss has occurred and collision has occurred (S306: Yes), the multirate control part 102 stops the process of counting the transmission failure counter. On the other hand, in a case where transmission loss has occurred and collision has not occurred (S306: No), the multirate control part 102 increments by one the transmission failure counter of the transmission failure counting part (S307).

By the operation as described above, the multirate control part 102 determines to count the transmission success counter, count the transmission failure counter, or count neither of them, on the basis of transmission loss information and collision presence or absence information.

After that, by comparing the transmission failure counter counted by the transmission failure counting part with the transmission failure counter threshold (n), the multirate control part 102 determines whether or not the transmission failure counter is equal to or more than the transmission failure counter threshold (S308). Then, in a case where the transmission failure counter is equal to or more than the transmission failure counter threshold (S308: Yes), the multirate control part 102 changes the transmission rate used by the wireless module part 11 to a next lower rate (S309). After that, the multirate control part 102 clears the transmission success counter and the transmission failure counter (S313). On the other hand, in a case where the transmission failure counter is less than the transmission failure counter threshold (S308: No), the multirate control part 102 determines whether or not the transmission success counter counted by the transmission success counting part is equal to or more than the transmission success counter threshold (S310). Then, in a case where the transmission success counter counted by the transmission success counting part is equal to or more than the transmission success counter threshold (S310: Yes), the multirate control part 102 changes the transmission rate used by the wireless module part 11 to a next higher rate (S311). After that, the multirate control part 102 clears the transmission success counter and the transmission failure counter (S313). On the other hand, in a case where the transmission success counter counted by the transmission success counting part is less than the transmission success counter threshold (S310: No), the multirate control part 102 determines not to change the rate (S312).

The operation as described above is repeatedly performed every time the wireless module part 11 transmits a radio frame signal.

Now, relating to the wireless communication terminal 100 according to this exemplary embodiment, a wireless communication terminal which does not have a function of detecting collision presence or absence information representing the presence or absence of collision will be described. In a case where a wireless communication terminal does not have a function of detecting collision presence or absence information, when transmission loss occurs, the wireless communication terminal cannot judge whether or not the transmission loss is caused by collision. Therefore, when transmission loss occurs, the wireless communication terminal described above uniformly counts the transmission failure counter without considering the presence or absence of collision. As a result, the wireless communication terminal as described above uniformly executes a process of decreasing a transmission rate regardless of the presence or absence of collision.

However, in a case where transmission loss has occurred due to collision, it is impossible to solve a problem of simultaneous transmission with another wireless communication terminal even if a transmission rate is decreased. In other words, decrease of a transmission rate does not lead to solution of transmission loss. Moreover, in a case where a transmission rate is decreased when transmission loss has occurred due to collision, one transmission time gets longer due to decrease of the transmission rate, so that there is a fear that a probability of occurrence of a collision again rather increases. Thus, execution of multirate control at the time of occurrence of transmission loss due to collision does not lead to resolution of the transmission loss and may decrease the efficiency of control. In other words, the wireless communication terminal as described above, which does not have the function of detecting collision presence or absence information representing the presence or absence of collision, may execute redundant control and may be hard to secure communication quality.

On the other hand, the wireless communication terminal 100 in this exemplary embodiment has the loss detection part 12 that detects transmission loss information, the frame detection part 13, the collision presence or absence detection part 101 that detects collision presence or absence information on the basis of the result of detection by the frame detection part 13, and the multirate control part 102. Such a configuration enables the multirate control part 102 to control a transmission rate on the basis of transmission loss information detected by the loss detection part 12 and collision presence or absence information detected by the collision presence or absence detection part 101. In other words, the multirate control part 102 in this exemplary embodiment can execute control so as not to decrease a transmission rate when it is considered that transmission loss has occurred due to occurrence of collision. As a result, redundant control can be decreased, and it is considered that control efficiency can be increased. Moreover, it is considered that a communication quality can be secured by accurate control without redundant control.

Further, the wireless communication terminal 100 in this exemplary embodiment can be realized by only adding the frame detection part 13 and the collision presence or absence detection part 101 to the wireless communication terminal relating to the wireless communication terminal 100 in this exemplary embodiment, and it is not necessarily required to arrange the multirate control part 102. Therefore, implementation of the wireless communication terminal 100 in this exemplary embodiment is thought to be easy.

Ninth Exemplary Embodiment

Next, a ninth exemplary embodiment of the present invention will be described referring to the drawings. A wireless communication terminal 110 in the ninth exemplary embodiment is configured to detect collision presence or absence information representing the presence or absence of collision and collision status information representing a collision status (a collision pattern). As described later, the wireless communication terminal 110 in this exemplary embodiment controls a transmission rate at the time of transmission of a radio frame signal by the wireless module part 11 on the basis of transmission loss information, collision presence or absence information, and collision status information.

Referring to FIG. 35, the wireless communication terminal 110 in this exemplary embodiment has the wireless module part 11, the loss detection part 12, the frame detection part 13, the collision presence or absence detection part 101, a collision cause detection part 111 (a portion of the collision information detection part), and a multirate control part 112. The configurations of the wireless module part 11, the loss detection part 12, the frame detection part 13 and the collision presence or absence detection part 101 are the same as those described in the above exemplary embodiments. Therefore, a description thereof will be omitted. Moreover, the collision cause detection part 111 and the multirate control part 112 have a CPU and a storage device, which are not shown in the drawings, and realize functions to be described later by execution of a program stored in the storage device by the CPU.

The collision cause detection part 111 has a function of, from a detection result detected by the frame detection part 13, detecting collision status information representing a collision status, which is a pattern of collision between a radio frame signal and another radio frame signal. Moreover, the collision cause detection part 111 detects the cause of collision of a radio frame signal colliding in accordance with a collision status. In other words, the collision cause detection part 111 in this exemplary embodiment detects collision status information including information representing a collision cause.

Specifically, the collision cause detection part 111 acquires a detection result detected by the frame detection part 13, from the frame detection part 13. Moreover, the collision cause detection part 111 acquires collision presence or absence information from the collision presence or absence detection part 101. Then, in the case of determining that collision has occurred on the basis of the collision presence or absence information acquired from the collision presence or absence detection part 101, the collision cause detection part 111 analyzes the detection result acquired from the frame detection part 13 and detects a collision status, namely, a collision pattern. Then, the collision cause detection part 111 detects a collision cause corresponding to the collision status. The collision cause detection part 111 in this exemplary embodiment is configured to detect a collision cause for every collided transmission frame.

As described in the above exemplary embodiments, a collision pattern, which is a detection result detected by the frame detection part 13, is as shown in FIG. 5, for example. Thus, the collision cause detection part 111 detects a collision cause by determining which collision pattern the detection result detected by the frame detection part 13 is. For example, in a case where a collision pattern detected by the frame detection part 13 is any of the patterns (A) to (I) shown in FIG. 5, the collision cause detection part 111 detects coincidence of backoff times as a collision cause. On the other hand, in a case where a collision pattern detected by the frame detection part 13 is either the pattern (J) or (K) shown in FIG. 5, the collision cause detection part 111 detects the hidden terminal problem as a collision cause. In other words, when determining that collision has occurred due to simultaneous transmission of a radio frame signal from the wireless module part 11 and a radio frame signal transmitted by another wireless communication terminal, the collision cause detection part 111 detects coincidence of backoff times as the cause of the collision. On the other hand, when determining that collision has occurred due to transmission of a radio frame signal by another wireless communication terminal during transmission of a radio frame signal by the wireless module part 11, the collision cause detection part 111 detects the hidden terminal problem as the cause of the collision. Moreover, when determining that collision has occurred due to transmission of a radio frame signal by the wireless module part 11 during transmission of a radio frame signal by another wireless communication terminal, the collision cause detection part 111 detects the hidden terminal problem as the cause of the collision.

Thus, the collision cause detection part 111 in this exemplary embodiment detects coincidence of backoff times as the cause of collision when the collision has occurred because of simultaneously start of transmission by the wireless module part 11 and another wireless communication terminal. Moreover, the collision cause detection part 111 detects the hidden terminal problem as the cause of collision when the collision has occurred because of transmission of another radio frame signal during transmission of a wireless frame signal. After that, the collision cause detection part 111 transmits collision status information including information representing the detected collision cause, to the multirate control part 112.

The collision cause detection part 111 in this exemplary embodiment detects coincidence of backoff times and the hidden terminal problem as a collision cause. However, as shown in the other exemplary embodiments, the hidden terminal problem can be further divided into the hidden terminal problem 1 and the hidden terminal problem 2 (because the hidden terminal problem 3 refers to a state that the hidden terminal problem 1 and the hidden terminal problem 2 occur a lot, it will not be determined in this exemplary embodiment). Therefore, the collision cause detection part 111 may be configured to detect coincidence of backoff times, the hidden terminal problem 1, and the hidden terminal problem 2 as collision causes.

The multirate control part 112 has the same configuration as the multirate control part 102 described in the eighth exemplary embodiment. Moreover, the multirate control part 112 in this exemplary embodiment is configured to acquire collision status information from the collision cause detection part 111. With such a configuration, the multirate control part 112 controls a transmission rate used at the time of transmission of a radio frame signal by the wireless module part 11, on the basis of transmission loss information, collision presence or absence information, and collision status information acquired from the collision cause detection part 111.

Further, the multirate control part 112 in this exemplary embodiment has a hidden terminal problem collision counting part, which is not shown in the drawings, in addition to the configuration shown in the eighth exemplary embodiment. Moreover, in addition to a transmission success counter threshold and a transmission failure counter threshold, a hidden terminal problem collision counter threshold (K) is stored in a storage device of the multirate control part 112.

The hidden terminal problem collision counting part has a function of, when the multirate control part 112 receives information that the cause of a collision is the hidden terminal problem, counting the number of times that a collision cause is the hidden terminal problem under control by the multirate control part 112. In other words, upon reception of collision status information that a collision cause is the hidden terminal problem, the multirate control part 112 executes a process of, for example, incrementing by one the hidden terminal problem collision counter of the hidden terminal problem collision counting part. On the other hand, in the case of receiving collision status information that coincidence of backoff times is a collision cause, the multirate control part 112 does not execute the process of counting the hidden terminal problem collision counter.

Thus, the multirate control part 112 counts the transmission success counter and the transmission failure counter and also counts the hidden terminal problem collision counter on the basis of transmission loss information, collision presence or absence information, and collision status information. Specifically, when given an interrupt to stop the process by the collision presence or absence detection part 101, the multirate control part 112 in this exemplary embodiment determines whether or not a collision cause is the hidden terminal problem on the basis of collision status information. Then, in a case where the collision cause is the hidden terminal problem, the multirate control part 112 counts the hidden terminal problem collision counter of the hidden terminal problem collision counting part. In other words, upon receiving transmission loss information, receiving collision presence or absence information representing occurrence of collision, and receiving collision status information representing that a collision cause is the hidden terminal problem, the multirate control part 112 executes the process of counting the hidden terminal problem collision counter.

Further, the hidden terminal problem collision counter threshold is any numerical value, for example, four times. The hidden terminal problem collision counter threshold is compared with the counted number of the hidden terminal problem collision counting part.

Specifically, after the counting process described above, the multirate control part 112 determines whether or not the hidden terminal problem collision counter counted by the hidden terminal problem collision counting part is equal to or more than the hidden terminal problem collision counter threshold. Then, in a case where the counted hidden terminal problem collision counter is equal to or more than the hidden terminal problem collision counter threshold, the multirate control part 112 changes a transmission rate used by the wireless module part 11 to a next higher rate. In other words, in a case where transmission has failed, collision has occurred, and the number of times that the cause of collision is the hidden terminal problem is equal to or more than the hidden terminal problem collision counter threshold, the multirate control part 112 executes control to change a transmission rate used by the wireless module part 11 to a next higher rate. On the other hand, in a case where the hidden terminal problem collision counter is less than the hidden terminal problem collision counter threshold, the multirate control part 112 determines whether or not the transmission failure counter counted by the transmission failure counting part is equal to or more than the transmission failure counter threshold. After that, the multirate control part 112 executes the same process as the process described in the eighth exemplary embodiment.

Further, upon executing control to change a transmission rate of the wireless module part 11, the multirate control part 112 clears all of the transmission success counter, the transmission failure counter and the hidden terminal problem collision counter to zero. In other words, upon executing control to change a transmission rate of the wireless module part 11, the multirate control part 112 in this exemplary embodiment returns all the counts to zero.

Thus, the multirate control part 112 in this exemplary embodiment controls a transmission rate at the time of transmission of a radio frame signal by the wireless module part 11, on the basis of transmission loss information, collision presence or absence information, and collision status information received from the collision cause detection part 111.

As described before, the collision cause detection part 111 can be configured to detect, as a collision cause, coincidence of backoff times, the hidden terminal problem 1, and the hidden terminal problem 2. Therefore, the multirate control part 112 may be configured to execute a process separately for the hidden terminal problem 1 and the hidden terminal problem 2. For example, the multirate control part 112 can have a hidden terminal problem 1 collision counting part and a hidden terminal problem 2 collision counting part. Such a configuration enables the multirate control part 112 to control a transmission rate on the basis of a hidden terminal problem 1 collision counter counted by the hidden terminal problem 1 collision counting part and on the basis of a hidden terminal problem 2 collision counter counted by the hidden terminal problem 2 counting part, respectively.

Further, the hidden terminal problem collision counter threshold may be the same value as the transmission success counter threshold and the transmission failure counter threshold, or may be a different value. Moreover, in a case where the hidden terminal problem 1 collision counter threshold and the hidden terminal problem 2 collision counter threshold are used, the hidden terminal problem 1 collision counter threshold and the hidden terminal problem 2 collision counter threshold may be the same value or may be different values. Moreover, the multirate control part 112 may be configured to count the number of times that a collision cause is coincidence of backoff times, instead of counting the number of times that a collision cause is the hidden terminal problem.

That is the configuration of the wireless communication terminal 110 in this exemplary embodiment. Next, the operation of the wireless communication terminal 110 will be described.

Figure 36:
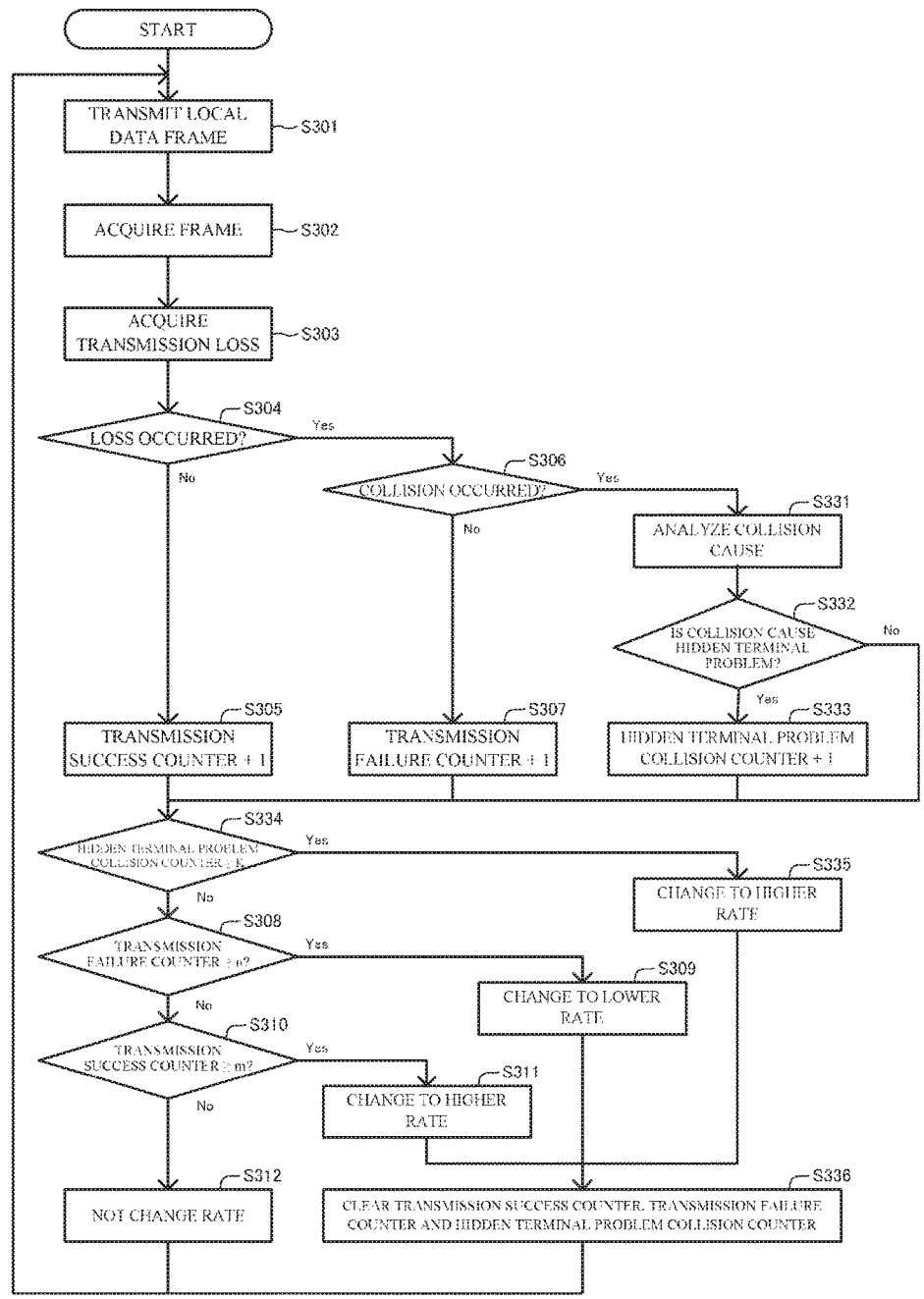
FIG. 36 is a flowchart for describing the operation of the wireless communication terminal according to the ninth exemplary embodiment of the present invention.

Referring to FIG. 36, until the multirate control part 112 determines the presence or absence of occurrence of collision, the operation of the wireless communication terminal 110 is the same as the operation of the wireless communication terminal 100 shown in the eighth exemplary embodiment. Moreover, in a case where transmission loss has occurred and collision has not occurred (S306: No), the multirate control part 112 increments by one the transmission failure counter of the transmission failure counting part (S307) as in the eighth exemplary embodiment.

On the other hand, in a case where transmission loss has occurred and collision has occurred (S306: Yes), the multirate control part 112 intends to increment the transmission failure counter by one, but is interrupted so as to stop the increment process. In this case, the multirate control part 112 in this exemplary embodiment analyzes a collision cause on the basis of collision status information (S331). Then, in a case where the collision cause is the hidden terminal problem (S332: Yes), the multirate control part 112 increments by one the hidden terminal problem collision counter of the hidden terminal problem collision counting part (S333). On the other hand, in a case where the collision cause is not the hidden terminal problem (for example, in a case where the collision cause is coincidence of backoff times) (S332: No), the multirate control part 112 does not count anything.

By the operation as described above, the multirate control part 112 determines, on the basis of transmission loss information, collision presence or absence information, and collision status information, whether or not to increment the transmission success counter, increment the transmission failure counter, increment the hidden terminal problem collision counter or increment none of them.

After that, the multirate control part 112 compares the hidden terminal problem collision counter with the hidden terminal problem collision counter threshold (K) and determines whether or not the hidden terminal problem collision counter is equal to or more than the hidden terminal problem collision counter threshold (S334). Then, in a case where the hidden terminal problem collision counter is equal to or more than the hidden terminal problem collision counter threshold (S334: Yes), the multirate control part 112 changes a transmission rate used by the wireless module part 11 to a next higher rate (S335). After that, the multirate control part 112 clears the transmission success counter, the transmission failure counter, and the hidden terminal problem collision counter (S336). On the other hand, in a case where the hidden terminal problem collision counter is less than the hidden terminal problem collision counter threshold (S334: No), the multirate control part 112 determines whether or not the transmission failure counter is equal to or more than the transmission failure counter threshold (S308). Because the subsequent operation is the same as the operation of the wireless communication terminal 100 described in the eighth exemplary embodiment, a description thereof will be omitted.

The operation as described above is executed every time the wireless module part 11 transmits a radio frame signal.

Thus, the wireless communication terminal 110 in this exemplary embodiment has the collision cause detection part 111 and the multirate control part 112. Such a configuration enables the wireless communication terminal 110 to control a transmission rate in consideration of collision status information.

In a case where the cause of collision is coincidence of backoff times, the collision occurs depending on the backoff times. Therefore, in a case where the cause of collision is coincidence of backoff times, it is considered that a probability of occurrence of collision does not change particularly even if a transmission rate is changed and a time for transmitting one frame is changed. On the other hand, in a case where the cause of collision is the hidden terminal problem, the collision occurs at random without depending on the backoff times. Therefore, it is considered that decrease of a time to transmit one frame increases a probability that communication of one frame can be normally completed during a period that another wireless communication terminal to become an interference source is not communicating.

Thus, the wireless communication terminal 110 in this exemplary embodiment has the collision cause detection part 11 and the multirate control part 112, thereby making it possible to increase a transmission rate when a collision cause is the hidden terminal problem. As a result, it is possible to decrease the time to transmit one frame and it is possible to decrease a probability of occurrence of transmission loss due to occurrence of collision. Moreover, the configuration as described above can keep the wireless communication terminal 110 from controlling a transmission rate in a case where a collision cause is not the hidden terminal problem (in a case where a collision cause is coincidence of backoff times). As a result, it becomes possible to avoid controlling a transmission rate in a case where there is no specific change in a probability of occurrence of collision. In other words, the configuration as described above allows the wireless communication terminal 110 in this exemplary embodiment to secure a high communication quality without executing redundant control.

Tenth Exemplary Embodiment

Next, a tenth exemplary embodiment of the present invention will be described referring to the drawings. In the tenth exemplary embodiment, a wireless communication terminal 120 which controls a transmission rate in consideration of a traffic amount. Herein, a traffic amount refers to the amount of signals and data transmitted and received on a channel, or a use rate per unit time.

The wireless communication terminal 120 in this exemplary embodiment has the same configuration as the wireless communication terminal 110 in the ninth exemplary embodiment. Therefore, a detailed description of each component will be omitted.

The wireless communication terminal 120 in this exemplary embodiment is configured to be able to acquire a traffic amount, in addition to the configuration of the wireless communication terminal 110. Acquisition of a traffic amount can be realized by, for example, using the wireless module part 11. Specifically, acquisition of a traffic amount can be realized by, for example, utilizing carrier sensing by the wireless module part 11 to monitor the degree of channel congestion. Also, acquisition of a traffic amount can be realized by, for example, utilizing the frame detection part 13 to monitor signal power. Thus, acquisition of a traffic amount can be realized by using various configurations.

A storage device of the multirate control part 112 in this exemplary embodiment stores a traffic amount threshold (TH) in addition to the transmission success counter threshold, the transmission failure counter threshold, and the hidden terminal problem collision counter threshold. The traffic amount threshold is any value and represents that, for example, a channel use rate in one second is 50%. The traffic amount threshold is compared by the multirate control part 112 with an acquired traffic amount.

Specifically, in a case where the hidden terminal problem collision counter exceeds the hidden terminal problem collision counter threshold, the multirate control part 112 in this exemplary embodiment determines whether or not an acquired traffic amount of its surroundings is equal to or more than the traffic amount threshold. Then, in a case where the traffic amount is equal to or more than the traffic amount threshold, the multirate control part 112 changes a transmission rate used by the wireless module part 11 to a next higher rate. On the other hand, in a case where the traffic amount is less than the traffic amount threshold, the multirate control part 112 does not change the transmission rate, and determines whether or not the transmission failure counter counted by the transmission failure counting part is equal to or more than the transmission failure counter threshold. In other words, in a case where the number of times that collision has been caused by the hidden terminal problem is equal to or more than the hidden terminal problem collision threshold and a traffic amount of its surroundings is not equal to or more than the traffic amount threshold, the multirate control part 112 in this exemplary embodiment executes control so as not to increase the transmission rate. Control other than the abovementioned control is the same as that already described.

Thus, the multirate control part 112 in this exemplary embodiment is configured to control a transmission rate at the time of transmission of a radio frame signal by the wireless module part 11 on the basis of transmission loss information, collision presence or absence information, collision status information and a traffic amount.

Meanwhile, the wireless communication terminal 120 may acquire a traffic amount by using a configuration other than that illustrated above. Moreover, the traffic amount threshold may be a numerical value other than 50%. Moreover, although traffic includes traffic by transmission by the local wireless communication terminal and traffic by transmission by another wireless communication terminal therearound, the wireless communication terminal 120 may be configured to monitor only one of the traffics, or may be configured to monitor both of the traffics.

Figure 37:
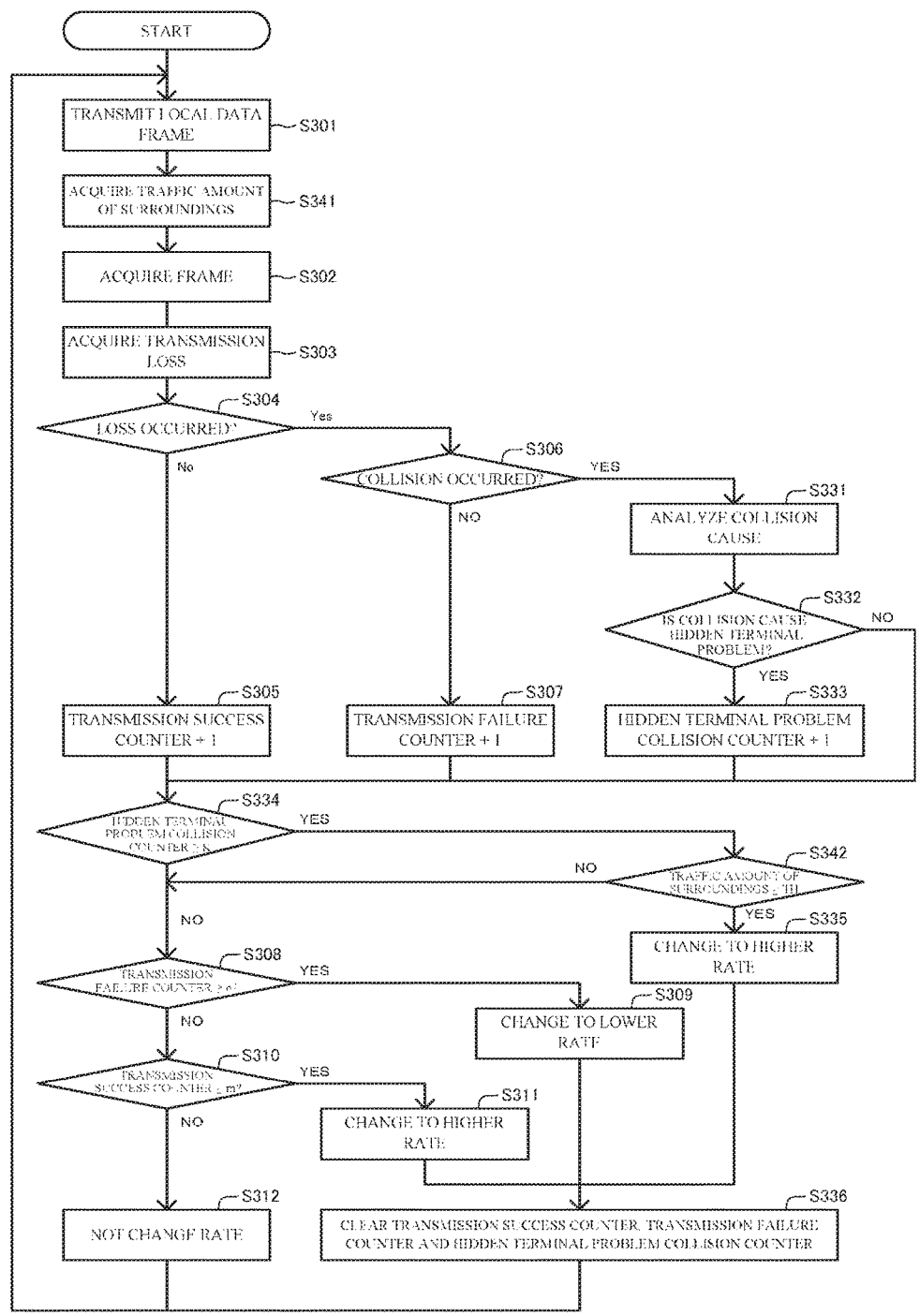
FIG. 37 is a flowchart for describing the operation of a wireless communication terminal according to a tenth exemplary embodiment of the present invention.

FIG. 37 shows an example of the operation of the wireless communication terminal 120 in this exemplary embodiment. Referring to FIG. 37, when the wireless module part 11 transmits a radio frame signal (S301), the wireless communication terminal 120 acquires a traffic amount of its surroundings (S341). Then, the wireless communication terminal 120 transmits the acquired traffic amount to the multirate control part 112.

Further, in a case where the counted hidden terminal problem collision counter is equal to or more than the hidden terminal problem collision counter threshold (S334: Yes), the multirate control part 112 of the wireless communication terminal 120 in this exemplary embodiment determines whether or not the traffic amount acquired in the abovementioned operation is equal to or more than the traffic amount threshold (S342). Then, in a case where the traffic amount is equal to or more than the traffic amount threshold (S342: Yes), the multirate control part 112 changes a transmission rate used by the wireless module part 11 to a next higher rate (S335). After that, the multirate control part 112 clears all the counters to zero (S336). On the other hand, in a case where the traffic amount is less than the traffic amount threshold (S342: No), the multirate control part 112 does not change the rate, and determines whether or not the transmission failure counter is equal to or more than the transmission failure counter threshold (S308). The subsequent operation is the same as that already described.

Thus, the wireless communication terminal 120 in this exemplary embodiment is configured to acquire a traffic amount. Such a configuration enables the wireless communication terminal 120 to control a transmission rate in consideration of a traffic amount.

As mentioned above, a traffic amount refers to the amount of signals and data transmitted and received on a channel, or a use rate per unit time. Therefore, it is considered that the less a traffic amount is, the harder collision is to occur even if one transmission time is long. In other words, even if collision occurs due to the hidden terminal problem, it is expected that retransmission succeeds with a high probability without increase of a transmission rate in an environment that a channel is not congested with traffic. On the other hand, in an environment that a channel is congested with traffic, increase of a transmission rate can be considered to be desirable for increase of a probability of success in retransmission.

Then, configured to acquire a traffic amount, the wireless communication terminal 120 in this exemplary embodiment can execute control not to change a transmission rate in a case where the cause of collision is the hidden terminal problem and the traffic amount is less than the traffic amount threshold. Moreover, with the configuration as described above, the wireless communication terminal 120 can change a transmission rate to a next higher rate in a case where the cause of collision is the hidden terminal problem and the traffic amount is equal to or more than the traffic amount threshold. As a result, the wireless communication terminal 120 does not change the transmission rate when a probability of success in retransmission is high without increase of the transmission rate and, on the other hand, the wireless communication terminal 120 can execute control to change the transmission rate when retransmission may fail without increase of the transmission rate. In other words, with the configuration as described above, the wireless communication terminal 120 can secure a communication quality while reducing redundant multirate control.

Eleventh Exemplary Embodiment

Next, an eleventh exemplary embodiment will be described referring to the drawings. In the eleventh exemplary embodiment, a wireless communication terminal 130 which detects collision presence or absence information representing the presence or absence of collision and controls retransmission control on the basis of the detected collision presence or absence information will be described. Herein, retransmission control refers to control which is, when transmission has failed, executed by the wireless module part 11 to transmit again to send the same data again.

Figure 38:
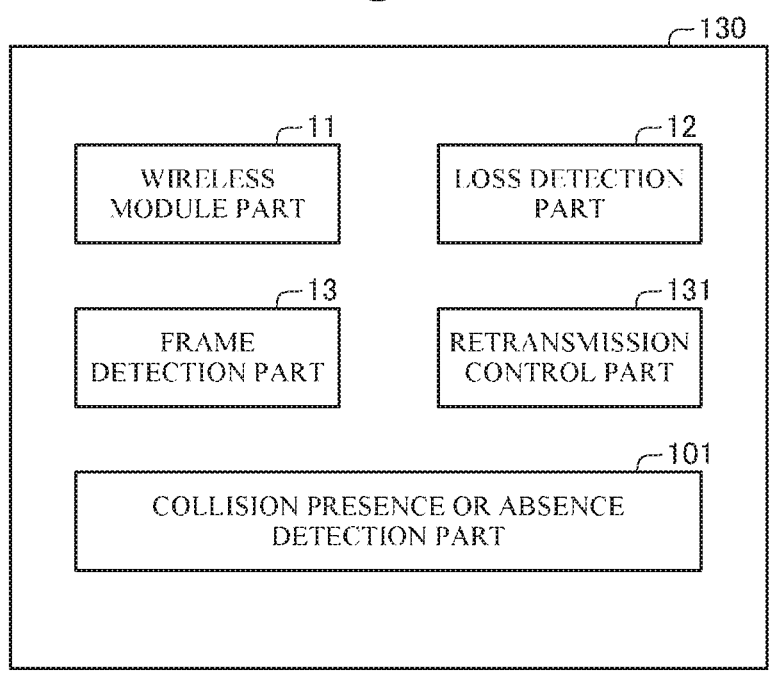
FIG. 38 is a block diagram showing an example of the configuration of a wireless communication terminal according to an eleventh exemplary embodiment of the present invention.

Referring to FIG. 38, the wireless communication terminal 130 in this exemplary embodiment has the wireless module part 11, the loss detection part 12, the frame detection part 13, the collision presence or absence detection part 101, and a retransmission control part 131 (the transmission control part). The configurations of the wireless module part 11, the loss detection part 12, the frame detection part 13 and the collision presence or absence detection part 101 are the same configurations as described in the above exemplary embodiments. Therefore, a detailed description of each of the abovementioned configurations will be omitted. Moreover, the retransmission control part 131 has a CPU and a storage device, which are not shown in the drawings, and realizes functions to be described later by the CPU's execution of a program stored in the storage device.

The wireless module part 11 in this exemplary embodiment has a function of executing the retransmission control under control by the retransmission control part 131 when transmission of a radio frame signal by the wireless module part 11 fails. In other words, in the case of failing in transmission of a radio frame signal, the wireless module part 11 in this exemplary embodiment transmits the same radio frame signal as one it has failed in transmission, by a predetermined maximum number of trials of retransmission until occurrence of transmission loss is not detected any more.

As already described, the collision presence or absence detection part 101 acquires collision presence or absence information and transmits the acquired collision presence or absence information to the retransmission control part 131. In transmitting collision presence or absence information to the retransmission control part 131, the collision presence or absence detection part 101 in this exemplary embodiment performs only transmission of collision presence or absence information without making an interrupt to stop a given process.

The retransmission control part 131 has a function of controlling the retransmission control executed by the wireless module part 11 on the basis of transmission loss information and collision presence or absence information. Moreover, the retransmission control part 131 has a function of determining the maximum number of trials of retransmission, and a function of increasing the range of a backoff time at the time of retransmission. Moreover, the retransmission control part 131 has a storage device such as a memory, which is not shown in the drawings.

The retransmission control part 131 in this exemplary embodiment determines the maximum number of trials of retransmission. The maximum number of trials of retransmission is any value, for example, four times. Then, the retransmission control part 131 stores the determined maximum number of trials of retransmission into the storage device of the retransmission control part 131. As described later, the retransmission control part 131 in this exemplary embodiment controls so that the retransmission control is executed within a range which does not exceed the determined maximum number of trials of retransmission. The maximum number of trials of retransmission may be a value other than four.

Further, the retransmission control part 131 controls the retransmission control executed by the wireless module part 11 on the basis of transmission loss information and collision presence or absence information. Specifically, the retransmission control part 131 receives transmission loss information from the loss detection part 12. Moreover, the retransmission control part 131 receives collision presence or absence information from the collision presence or absence detection part 101. Then, when receiving transmission loss information and collision presence or absence information representing occurrence of collision, the retransmission control part 131 controls the wireless module part 11 to execute the retransmission control within a range which does not exceed a predetermined maximum number of trials of retransmission. On the other hand, when succeeding in transmission, when receiving transmission loss information and receiving collision presence or absence information representing occurrence of no collision, or when executing retransmission a predetermined maximum number of trials of retransmission, the retransmission control part 131 executes control to end the retransmission control. Thus, on the basis of transmission loss information and collision presence or absence information, the retransmission control part 131 in this exemplary embodiment controls so that the retransmission control is executed only when transmission loss has occurred and collision has occurred.

Further, the retransmission control part 131 is configured to increase the range of a backoff time at the time of retransmission and decrease the probability of collision at the time of retransmission. Specifically, a parameter CW which determines a backoff time is an integer determined within a range between a minimum value $CW_{min}$ and a maximum value $CW_{max}$, and is calculated by the retransmission control part 131 so that the range of CW increases with each retransmission on the basis of the following equation. In other words, the retransmission control part 131 increases the parameter CW that determines a backoff time, in accordance with the number of retransmissions within a range which does not exceed the maximum value $CW_{max}$:

$$CW=(CW_{min}+1)\times 2^{\alpha}-1,$$

where $\alpha$ denotes the number of retransmissions and is a value equal to or more than zero. Moreover, $CW_{min}$ and $CW_{max}$ are values which are uniquely determined for each of the IEEE802.11 specifications used by wireless communication terminals.

Thus, the retransmission control part 131 in this exemplary embodiment has a function of controlling the retransmission control executed by the wireless module part 11 on the basis of transmission loss information and collision presence or absence information.

That is the configuration of the wireless communication terminal 130 in this exemplary embodiment. Next, an example of the operation of the wireless communication terminal 130 in this exemplary embodiment will be described.

Figure 39:
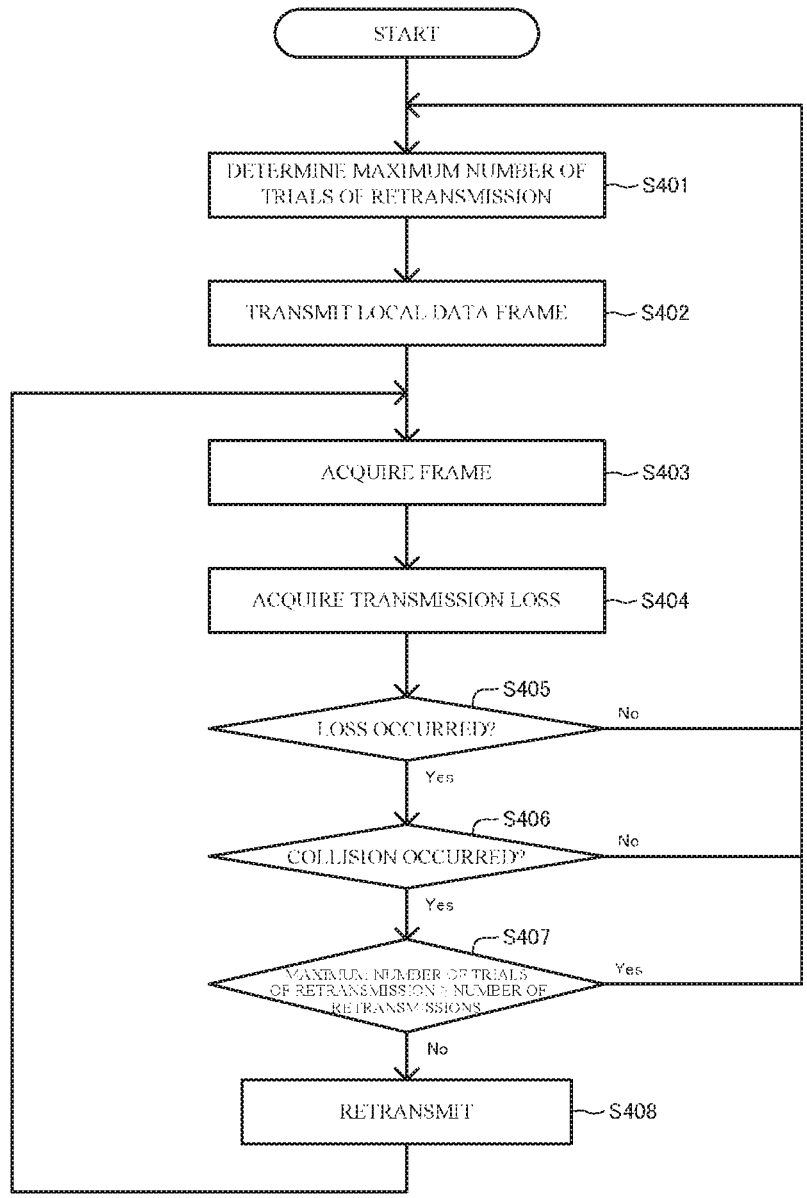
FIG. 39 is a flowchart for describing the operation of the wireless communication terminal according to the eleventh exemplary embodiment of the present invention.

Referring to FIG. 39, first, the retransmission control part 131 determines a maximum number of trials of retransmission (S401). Subsequently, the wireless module part 11 transmits a radio frame signal (S402). Then, the frame detection part 13 acquires the radio frame signal transmitted by the wireless module part 11 (S403).

Thus, the frame detection part 13 acquires the radio frame signal transmitted by the wireless module part 11, whereby collision of radio frame signals is monitored. Because the operation at the time of monitoring collision is the same as described already, a description thereof will be omitted.

Further, the loss detection part 12 acquires transmission loss information (S404). Then, the loss detection part 12 transmits the acquired transmission loss information to the retransmission control part 131.

Subsequently, the retransmission control part 131 determines whether or not transmission loss has occurred on the basis of the transmission loss information received from the loss detection part 12 (S405). Then, in a case where transmission loss has not occurred (S405: No), the retransmission control part 131 determines the retransmission control is not needed and ends the subsequent processes. In other words, in the abovementioned case, the retransmission control part 131 determines a maximum number of trials of retransmission again and then waits for transmission of a radio frame signal by the wireless module part 11. On the other hand, in a case where transmission loss has occurred (in the case of having received transmission loss information) (S405: Yes), the retransmission control part 131 determines whether or not collision has occurred on the basis of collision presence or absence information (S406). Then, in a case where collision has not occurred (S406: No), the retransmission control part 131 determines the retransmission control is not needed and ends the subsequent processes. On the other hand, in a case where collision has occurred (S406: Yes), the retransmission control part 131 determines whether or not the number of retransmissions exceeds the maximum number of trials of retransmission (S407). Then, in the case of having already performed retransmission by the maximum number of trials of retransmission (S407: Yes), the retransmission control part 131 ends the subsequent processes. On the other hand, in a case where the number of retransmissions is less than the maximum number of trials of retransmission (S407: No), the retransmission control part 131 controls the wireless module part 11 to execute the retransmission control (S408). Moreover, the retransmission control part 131 counts the number of retransmissions. After that, the frame detection part 13 acquires a radio frame signal again, and the loss detection part 12 acquires transmission loss information. After that, the retransmission control part 131 repeats the same operation as the operation described above.

By operating in the abovementioned manner, the retransmission control part 131 controls the retransmission control executed by the wireless module part 11 on the basis of transmission loss information and collision presence or absence information. Then, the retransmission control part 131 performs the abovementioned operation every time the wireless module part 11 intends to transmit a radio frame signal.

Thus, the wireless communication terminal 130 in this exemplary embodiment has the loss detection part 12, the frame detection part 13, the collision presence or absence detection part 101, and the retransmission control part 131. Such a configuration enables the retransmission control part 131 to control the retransmission control on the basis of transmission loss information and collision presence or absence information.

In a case where collision has not occurred when transmission loss has occurred, it is thought that transmission loss due to attenuation has occurred. Therefore, even if retransmission is performed in this case, failure in transmission due to attenuation again is thought to be highly probable. On the other hand, in a case where transmission loss has been caused by collision, success in transmission by performing the retransmission control is thought to be probable.

Thus, the wireless communication terminal 130 in this exemplary embodiment has the frame detection part 13 and the collision presence or absence detection part 101, thereby being able to execute control not to execute the retransmission control in a case where transmission loss has occurred and collision has not occurred. Moreover, the wireless communication part 130 has the configuration as described above, thereby being able to execute control to execute the retransmission control in a case where transmission loss has occurred and collision has occurred. As a result, it is possible to execute control not to execute the retransmission control in a case where failure in transmission due to attenuation again is highly probable, and it is possible to execute control to perform retransmission in a case where success by performing retransmission is probable. In other words, it is possible to secure a communication quality while reducing useless retransmission.

Twelfth Exemplary Embodiment

Next, a twelfth exemplary embodiment of the present invention will be described referring to the drawings. In the twelfth exemplary embodiment, a wireless communication terminal 140 which detects collision presence or absence information representing the presence or absence of collision and collision status information representing a collision status and controls the retransmission control on the basis of the detected collision presence or absence information and collision status information will be described.

Figure 40:
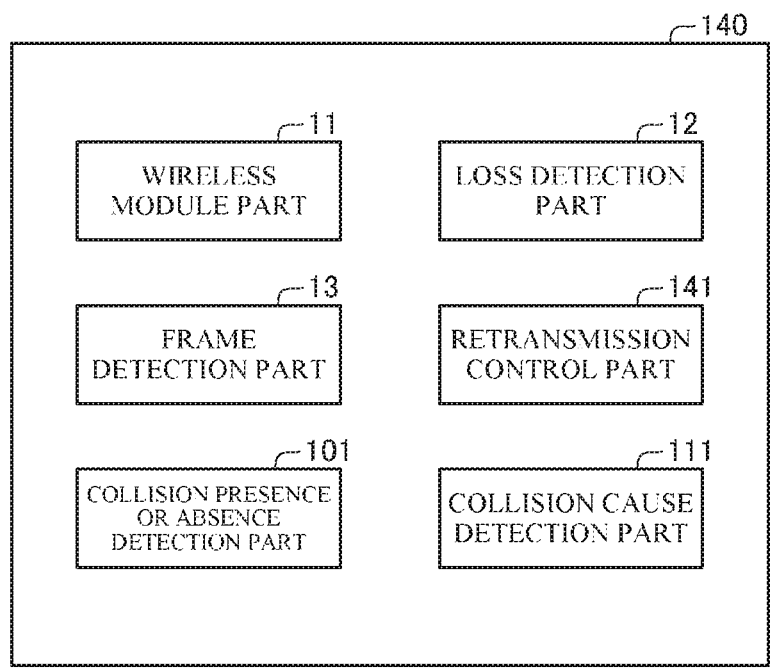
FIG. 40 is a block diagram showing an example of the configuration of a wireless communication terminal according to a twelfth exemplary embodiment of the present invention.

Referring to FIG. 40, the wireless communication terminal 140 in this exemplary embodiment has the wireless module part 11, the loss detection part 12, the frame detection part 13, the collision presence or absence detection part 101, the collision cause detection part 111, and a retransmission control part 141. The configurations of the wireless module part 11, the loss detection part 12, the frame detection part 13 and the collision presence or absence detection part 101 are the same as described in the above exemplary embodiments. Moreover, the configuration of the collision cause detection part 111 is the same as described in the ninth exemplary embodiment. Therefore, a description of each of the configurations will be omitted. The retransmission control part 141 has a CPU and a storage device, which are not shown in the drawings, and realizes functions to be described later by the CPU's execution of a program stored in the storage device.

The retransmission control part 141 has the same function as the retransmission control part 131 described in the eleventh exemplary embodiment. In other words, the retransmission control part 141 has the function of controlling the retransmission control executed by the wireless module part 11, the function of determining a maximum number of trials of retransmission, the function of increasing the range of a backoff time at the time of retransmission, and so on. Moreover, the retransmission control part 141 in this exemplary embodiment is configured to consider collision status information at the time of controlling the retransmission control.

The retransmission control part 141 receives transmission loss information and collision presence or absence information, and also receives collision status information from the collision cause detection part 111. Then, in a case where transmission has occurred and collision has occurred, the retransmission control part 141 in this exemplary embodiment controls the retransmission control in consideration of a collision cause represented by the collision status information. Specifically, the retransmission control part 141 is configured not to execute the retransmission control in a case where a collision cause is the hidden terminal problem. Therefore, the retransmission control part 141 executes control to execute the retransmission control in a case where transmission loss has occurred, collision has occurred and a collision cause is not the hidden terminal problem (for example, a collision cause is coincidence of backoff times).

Next, an example of the operation of the wireless communication terminal 140 in this exemplary embodiment will be described.

Figure 41:
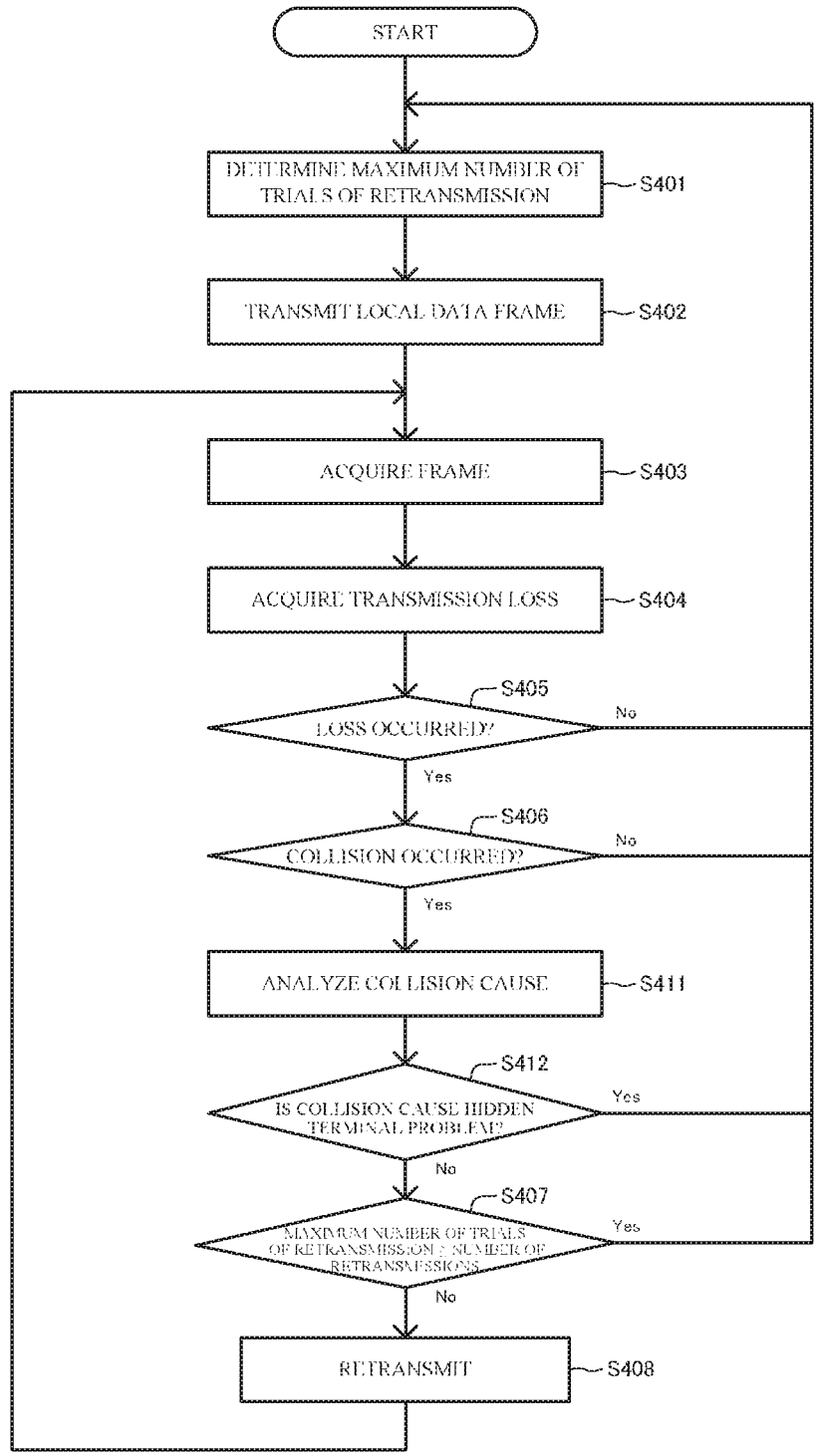
FIG. 41 is a flowchart for describing the operation of the wireless communication terminal according to the twelfth exemplary embodiment of the present invention.

Referring to FIG. 41, first, the retransmission control part 141 determines a maximum number of trials of retransmission (S401). Subsequently, the wireless module part 11 transmits a radio frame signal (S402). Then, the frame detection part 13 acquires the radio frame signal transmitted by the wireless module part 11 (S403). Moreover, the loss detection part 12 acquires transmission loss information (S404). After that, the transmission loss information and collision presence or absence information are transmitted to the retransmission control part 141.

Further, the collision cause detection part 111 detects a collision cause and transmits collision status information to the retransmission control part 141. In such operation, transmission loss information, collision presence or absence information and collision status information are transmitted to the retransmission control part 141.

Subsequently, the retransmission control part 141 determines whether or not transmission loss has occurred, on the basis of the transmission loss information received from the loss detection part 12 (S405). Then, in a case where transmission loss has not occurred (S405: No), the retransmission control part 141 determines the retransmission control is not needed, and ends the subsequent processes. On the other hand, in a case where transmission loss has occurred (S405: Yes), the retransmission control part 141 determines whether or not collision has occurred, on the basis of the collision presence or absence information (S406). Then, in a case where collision has not occurred (S406: No), the retransmission control part 141 determines the retransmission control is not needed, and ends the subsequent processes. On the other hand, in a case where collision has occurred (S406: Yes), the retransmission control part 141 analyzes a collision cause on the basis of the collision status information (S411). Then, in a case where the collision cause is the hidden terminal problem (S412: Yes), the retransmission control part 141 determines the retransmission control is not needed, and ends the subsequent processes. On the other hand, in a case where the collision cause is not the hidden terminal problem (in a case where the collision cause is coincidence of backoff times) (S412: No), the retransmission control part 141 determines whether or not the number of retransmissions exceeds the maximum number of trials of retransmission (S407). Because the subsequent processes are the same as already described, a description thereof will be omitted.

Thus, the wireless communication terminal 140 in this exemplary embodiment has the collision cause detection part 111 and the retransmission control part 141. Such a configuration enables the wireless communication terminal 140 to control the retransmission control in consideration of collision status information.

As described in the eleventh exemplary embodiment, the retransmission control part 141 is configured to increase the range of a backoff time when performing retransmission and decrease a collision probability at the time of retransmission. Therefore, in a case where the cause of collision is coincidence of backoff times, a probability of success in transmission at the time of retransmission is thought to be higher. On the other hand, in a case where the cause of collision is the hidden terminal problem, a probability of occurrence of collision does not depend on a backoff time, it is thought that even if retransmission is performed, a probability of collision again remains unchanged and the retransmission becomes useless.

Thus, the wireless communication terminal 140 in this exemplary embodiment has the collision cause detection part 111, thereby being able to execute control to execute the retransmission control in a case where a collision cause is coincidence of backoff times, in which a probability of success in transmission is increased by retransmission. Moreover, with the above configuration, the wireless communication terminal 140 can execute control not to execute the retransmission control in a case where a collision cause is the hidden terminal problem, in which the probability of collision does not change and transmission may become useless. As a result, it is possible to execute control to execute the retransmission control only in a case where a probability of success in transmission is increased by retransmission. In other words, it is possible to secure a higher communication quality without executing redundant control.

Thirteenth Exemplary Embodiment

Next, a thirteenth exemplary embodiment of the present invention will be described referring to the drawings. In the thirteenth exemplary embodiment, a wireless communication terminal 150 which controls the retransmission control in consideration of a traffic amount will be described.

The wireless communication terminal 150 in this exemplary embodiment has the same configurations as the wireless communication terminal 140 in the twelfth exemplary embodiment. Therefore, a detailed description of each of the configurations will be omitted.

Further, the wireless communication terminal 150 in this exemplary embodiment is configured to be able to acquire a traffic amount in the same manner as the wireless communication terminal 120 described in the tenth exemplary embodiment. Acquisition of a traffic amount can be realized by, for example, utilizing the wireless module part 11. Specifically, for example, by utilizing carrier sensing by the wireless module part 11 and thereby monitoring the degree of channel congestion, it is possible to realize acquisition of a traffic amount. Moreover, for example, by using the frame detection part 13 and thereby monitoring signal power, it is also possible to realize acquisition of a traffic amount. The wireless communication terminal 150 may be configured to acquire a traffic amount by a method other than the abovementioned methods.

The storage device of the retransmission control part 141 in this exemplary embodiment is configured to store a traffic amount threshold. Because the traffic amount threshold is the same as already described in the tenth exemplary embodiment, a detailed description thereof will be omitted.

In a case where a collision cause is the hidden terminal problem, the retransmission control part 141 in this exemplary embodiment determines whether or not the acquired traffic amount of its surroundings is equal to or more than the traffic amount threshold. Then, in a case where the traffic amount is equal to or more than the traffic amount threshold, the retransmission control part 141 determines the retransmission control is not needed, and ends the subsequent processes. On the other hand, in a case where the traffic amount is less than the traffic amount threshold, the retransmission control part 141 determines whether or not retransmission has already been performed by the maximum number of trials of retransmission. After that, the retransmission control part 141 controls the wireless module part 11 to execute the retransmission control in accordance with the number of retransmissions. Thus, the retransmission control part 141 in this exemplary embodiment is configured to, in a case where a collision cause is the hidden terminal problem and the traffic amount is less than the traffic amount threshold, execute control to execute the retransmission control within a range that the number of retransmissions does not exceed the maximum number of trials of retransmission.

As described above, the retransmission control part 141 in this exemplary embodiment is configured to control the retransmission control on the basis of transmission loss information, collision presence or absence information, collision status information and a traffic amount.

Figure 42:
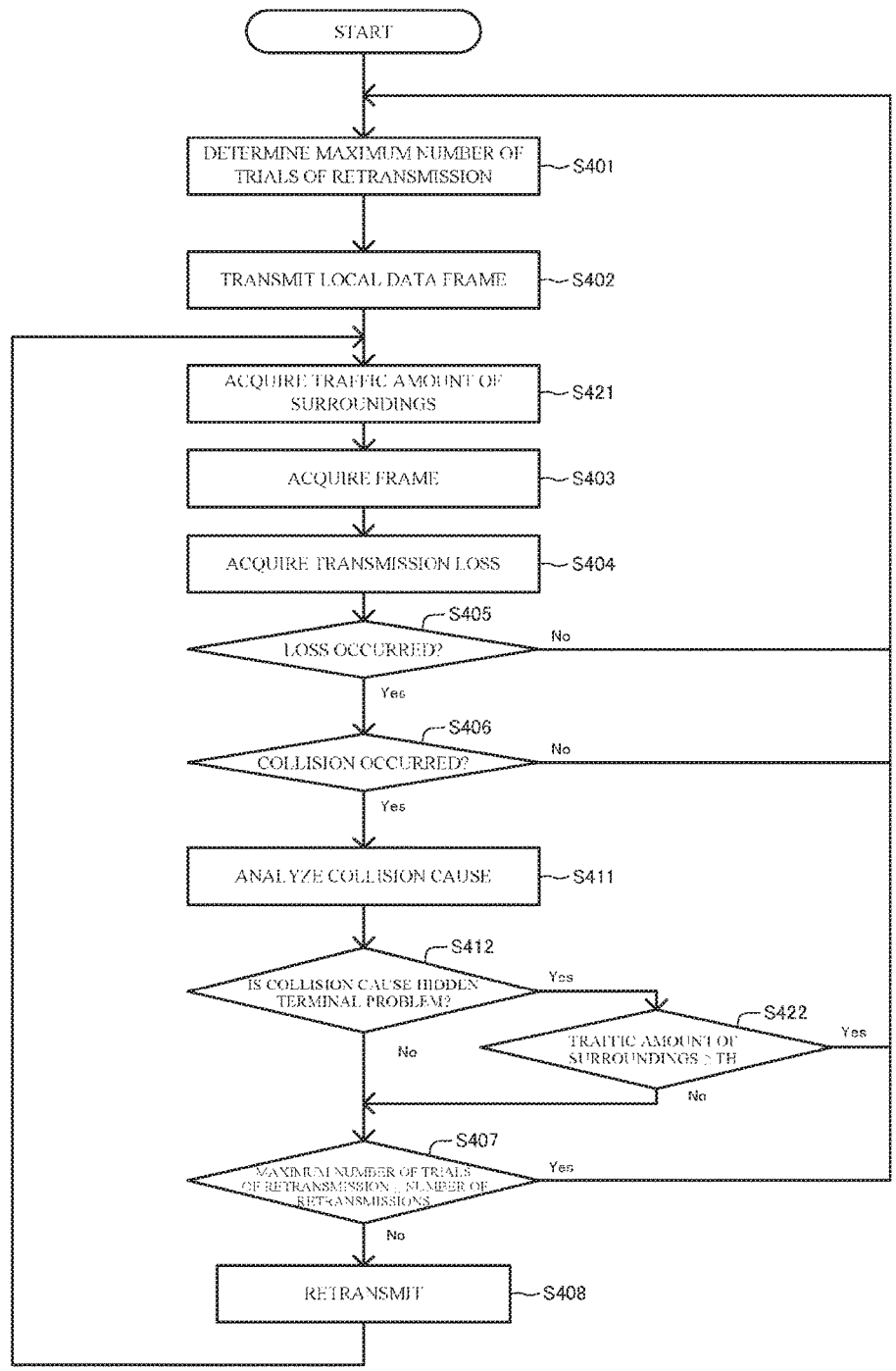
FIG. 42 is a flowchart for describing the operation of a wireless communication terminal according to a thirteenth exemplary embodiment of the present invention.

FIG. 42 shows an example of the operation of the wireless communication terminal 150 in this exemplary embodiment. Referring to FIG. 42, at the time of transmission of a radio frame signal by the wireless module part 11 (S402), the wireless communication terminal 120 acquires a traffic amount of its surroundings (S421). Then, the wireless communication terminal 120 transmits the acquired traffic amount to the retransmission control part 141.

Further, in a case where a collision cause is the hidden terminal problem, the retransmission control part 141 in this exemplary embodiment determines whether or not the traffic amount acquired in the abovementioned operation is equal to or more than a traffic amount threshold (S422). Then, in a case where the traffic amount is equal to or more than the traffic amount threshold (S422: Yes), the retransmission control part 141 determines the retransmission control is not needed, and ends the subsequent processes. On the other hand, in a case where the traffic amount is less than the traffic amount threshold (S422: No), the retransmission control part 141 determines whether or not the number of retransmissions is more than the maximum number of trials of retransmission (S407). Because the subsequent processes are the same as already described, a description thereof will be omitted.

Thus, the wireless communication terminal 150 in this exemplary embodiment is configured to acquire the traffic amount. Such a configuration enables the wireless communication terminal 150 to control the retransmission control in consideration of the traffic amount.

Now, in a case where the cause of collision is the hidden terminal problem and congestion with traffic is present, it is thought to be highly probable that collision occurs again even if retransmission is performed. On the other hand, in a case where collision has been caused by the hidden terminal problem and congestion with traffic is not present, it is thought to be probable that collision does not occur even if retransmission is performed and retransmission succeeds.

Configured to acquire a traffic amount, the wireless communication terminal 150 in this exemplary embodiment can execute control to execute the retransmission control within a range which does not exceed the maximum number of trials of retransmission in a case where collision has been caused by the hidden terminal problem and the traffic amount is less than the traffic amount threshold. Moreover, with the abovementioned configuration, the wireless communication terminal 150 can execute control not to execute the retransmission control in a case where collision has been caused by the hidden terminal problem and the traffic amount is equal to or more than the traffic amount threshold. As a result, in a case where a probability of success in transmission has not been increased by retransmission but a probability of success in transmission is determined to be increased by performing retransmission, it is possible to execute control to execute the retransmission control. In other words, with the configuration as described above, the wireless communication terminal 150 can secure a communication quality while reducing redundant control.

Fourteenth Exemplary Embodiment

Next, a fourteenth exemplary embodiment of the present invention will be described referring to the drawings. In the fourteenth exemplary embodiment, a wireless communication terminal 160 which detects collision presence or absence information representing the presence or absence of collision and executes multirate retry control on the basis of the detected collision presence or absence information will be described. Herein, multirate retry refers to an algorithm which is combination of the multirate control and the retransmission control. In other words, under multirate retry control, when retransmission fails by the maximum number of trials of retransmission, the transmission rate is decreased and retransmission is tried in a more communicable condition. Moreover, when retransmission fails by the maximum number of trials of retransmission in the condition that the transmission rate is decreased, the transmission rate is decreased again and retransmission is tried. The multirate retry is an algorithm of repeating such operation to perform retransmission and rate control.

Figures 43, 44:
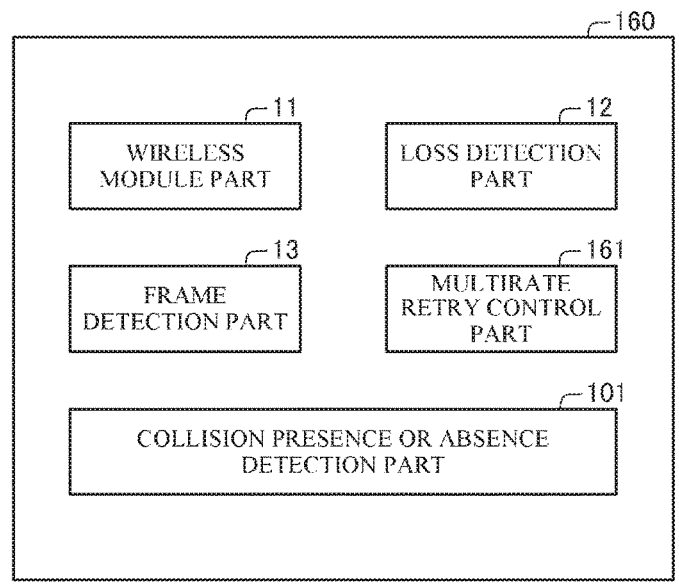
FIG. 43 is a block diagram showing an example of the configuration of a wireless communication terminal according to a fourteenth exemplary embodiment of the present invention.
FIG. 44 is a table showing an example of an algorithm for a transmission rate used by a wireless module part shown in FIG. 43.

Referring to FIG. 43, the wireless communication terminal 160 in this exemplary embodiment has the wireless module part 11, the loss detection part 12, the frame detection part 13, the collision presence or absence detection part 101, and a multirate retry control part 161 (the transmission control part). The wireless module part 11, the loss detection part 12, the frame detection part 13 and the collision presence or absence detection part 101 have the same configurations as the configurations described in the above exemplary embodiments. Therefore, a detailed description of each of the abovementioned configurations will be omitted below. Moreover, the multirate retry control part 161 has a CPU and a storage device, which are not shown in the drawings, and realizes functions to be described later by the CPU's execution of a program stored in the storage device.

The wireless module part 11 is configured to transmit a radio frame signal at one of a plurality of transmission rates. Moreover, the wireless module part 11 is configured to execute the retransmission control under control by the multirate retry control part 161 when transmission of a radio frame signal by the wireless module part 11 fails. With such a configuration, the wireless module part 11 in this exemplary embodiment performs retransmission while decreasing the transmission rate until retransmission succeeds.

FIG. 44 shows an example of an algorithm of multirate retry. As described later, the wireless module part 11 in this exemplary embodiment transmits (retransmits) a radio frame signal at one of the transmission rates shown in FIG. 44 under control by the multirate retry control part 161. Specifically, in the case of having failed in retransmission by a maximum number of trials of retransmission previously associated with each transmission rate, the wireless module part 11 in this exemplary embodiment tries retransmission at a next lower transmission rate. For example, in a case where the wireless module part 11 has failed in retransmission three times at a transmission rate of 48 Mbps shown in FIG. 44, the wireless module part 11 is controlled by the multirate retry control part 161 to perform next retransmission at a transmission rate of 36 Mbps. Then, in a case where the wireless module part 11 fails in retransmission three times at the transmission rate of 36 Mbps, the wireless module part 11 is controlled by the multirate retry control part 161 to perform next retransmission at a transmission rate of 24 Mbps.

The multirate retry control part 161 has a function of controlling multirate retry executed by the wireless module part 11 on the basis of transmission loss information and collision presence or absence information. Moreover, the multirate retry control part 161 has a function of determining a transmission rate to be used and a maximum number of trials of retransmission at each rate, a function of increasing the range of a backoff time at the time of retransmission, and so on. Further, the multirate retry control part 161 has a storage device such as a memory, which is not shown in the drawings.

The multirate retry control part 161 in this exemplary embodiment determines a transmission rate to be used at the time of retransmission and a maximum number of trials of retransmission at each rate. A transmission rate is a value such as 54 Mbps, 24 Mbps, and 1 Mbps. A maximum number of trials of retransmission is any value, for example, four. The multirate retry control part 161 stores the transmission rate and maximum number of trials of retransmission determined thereby into the storage device of the multirate retry control part 161. As described later, when retransmission fails by the determined maximum number of trials of retransmission, the multirate retry control part 161 in this exemplary embodiment executes control to change the transmission rate to a next lower transmission rate and then perform retransmission again. The transmission rate determined by the multirate retry control part 161 may be a value other than those shown above. Also, the maximum number of trials of retransmission determined by the multirate retry control part 161 may be a value other than four. Moreover, the maximum number of trails of retransmission may vary according to the transmission rate.

Further, as described above, the multirate retry control part 161 controls multirate retry executed by the wireless module part 11 on the basis of transmission loss information and collision presence or absence information. Specifically, the multirate retry control part 161 receives transmission loss information from the loss detection part 12. Also, the multirate retry control part 161 receives collision presence or absence information from the collision presence or absence detection part 101. In a case where the multirate retry control part 161 has received transmission loss information and also collision presence or absence information representing occurrence of collision and retransmission has not been performed by a predetermined maximum number of times of retransmission, the multirate retry control part 161 controls the wireless module part 11 to execute the retransmission control. In a case where retransmission has already been performed by the maximum number of trials of retransmission at a currently used transmission rate, the multirate retry control part 161 controls the wireless module part 11 to change the transmission rate to a next transmission rate (a next lower transmission rate) and then execute the retransmission control again. On the other hand, in a case where transmission has succeeded, or in a case where the transmission rate cannot be changed any more, the multirate retry control part 161 ends the process and does not control the retransmission control.

Thus, the multirate retry control part 161 in this exemplary embodiment is configured to control multirate retry on the basis of transmission loss information and collision presence or absence information.

Figure 45:
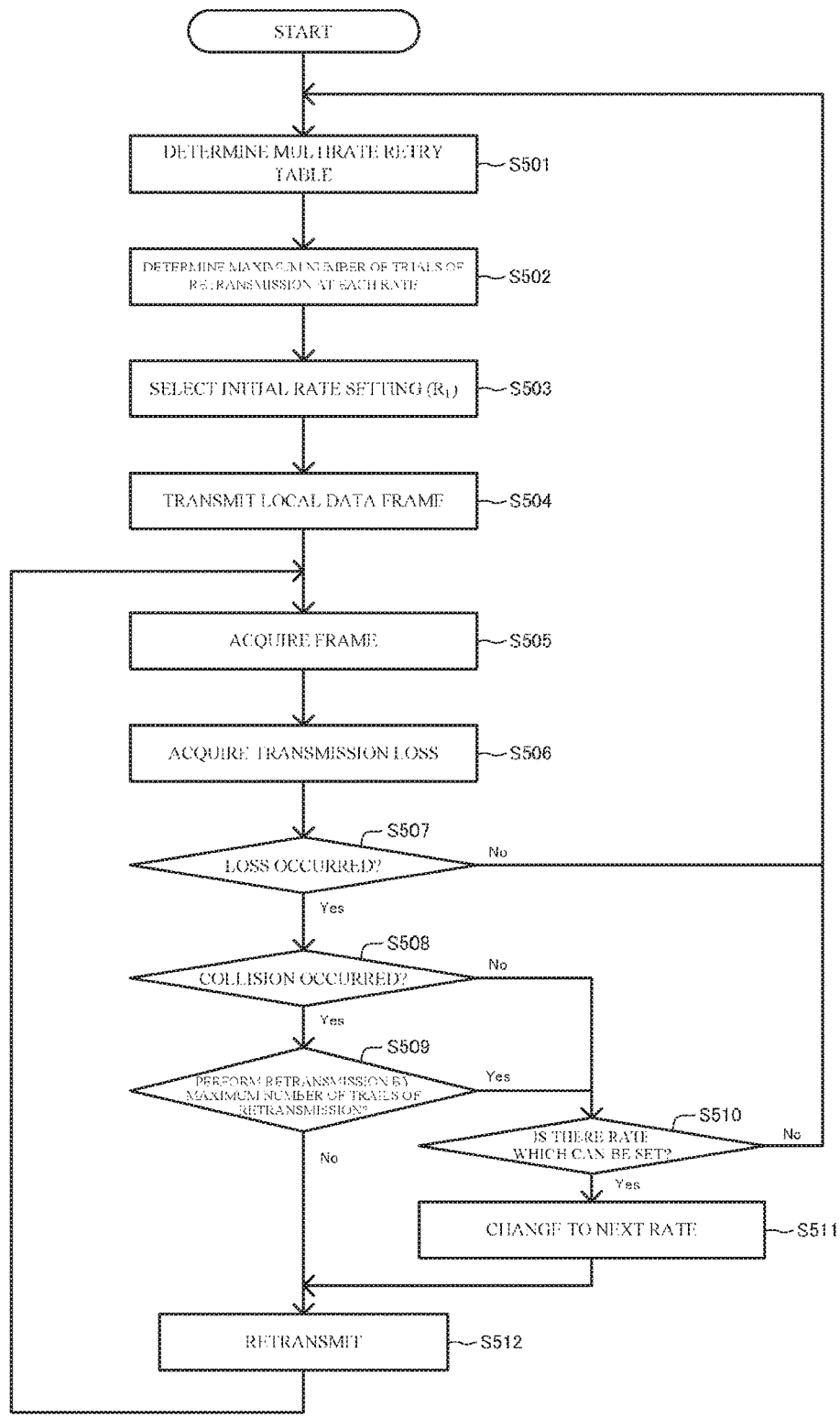
FIG. 45 is a flowchart for describing the operation of the wireless communication terminal according to the fourteenth exemplary embodiment of the present invention.

FIG. 45 shows an example of the operation of the wireless communication terminal 160 in this exemplary embodiment. Referring to FIG. 45, the multirate retry control part 161 of the wireless communication terminal 160 first determines a multirate retry table, which is a collection of transmission rates to be used in retransmission (S501). Moreover, the multirate retry control part 161 determines a maximum number of trials of retransmission at each rate (S502). Subsequently, on the basis of the multirate retry table, the multirate retry control part 161 sets a transmission rate for first transmission of a radio frame signal by the wireless module part 11 (S503). Specifically, the multirate retry control part 161 sets the largest transmission rate on the multirate retry table (for example, $R_1$ shown in FIG. 44) as a transmission rate for first transmission of a radio frame signal. After that, the wireless module part 11 transmits a radio frame signal (S504).

Subsequently, the frame detection part 13 acquires the radio frame signal transmitted by the wireless module part 11 (S505). Thus, the wireless transmission terminal 160 monitors collision of radio frame signals. Because the operation of monitoring collision is the same as already described, a description thereof will be omitted.

Further, the loss detection part 12 acquires transmission loss information (S506). Then, the loss detection part 12 transmits the transmission loss information acquired thereby to the multirate retry control part 161.

Subsequently, on the basis of the transmission loss information received from the loss detection part 12, the multirate retry control part 161 determines whether or not transmission loss has occurred (S507). In a case where transmission loss has not occurred (S507: No), the multirate retry control part 161 determines control is not needed, and ends the subsequent processes. On the other hand, in a case where transmission loss has occurred (in the case of having received the transmission loss information) (S507: Yes), the multirate retry control part 161 determines whether or not collision has occurred, on the basis of collision presence or absence information (S508). In a case where collision has not occurred (S508: No), the multirate retry control part 161 checks whether or not there is a next rate which can be set (S510). In a case where there is a rate which can be set (S510: Yes), the multirate retry control part 161 controls the wireless module part 11 to change the transmission rate to the next rate (a next lower rate) (S511) and then execute the retransmission control (S512). On the other hand, in a case where there is no rate that can be set, the multirate retry control part 161 stops the subsequent processes. In a case where collision has occurred (S508: Yes), the multirate retry control part 161 determines whether or not retransmission has already been performed by the maximum number of trials of retransmission (S509). In a case where retransmission has not been performed by the maximum number of trials of retransmission (S509: No), the multirate retry control part 161 controls the wireless module part 11 to execute the retransmission control at the current transmission rate (S512). On the other hand, in a case where retransmission has been performed by the maximum number of trails of retransmission (S509: Yes), the multirate retry control part 161 checks whether or not there is a next rate which can be set (S510). In a case where there is a rate which can be set (S510: Yes), the multirate retry control part 161 controls the wireless module part 11 to change the transmission rate to the next rate (S511) and then execute the retransmission control (S512). On the other hand, in a case where there is no rate that can be set, the multirate retry control part 161 stops the subsequent processes. Moreover, in the case of having controlled the wireless module part 11 to execute the retransmission control (S512), the multirate retry control part 161 again acquires a radio frame signal through the frame detection part 13 and acquires transmission loss information through the loss detection part 12. After that, the multirate retry control part 161 repeatedly performs the same operation as the operation described above.

By operating in the above manner, the multirate retry control part 161 controls multirate retry on the basis of transmission loss information and collision presence or absence information.

Thus, the wireless communication terminal 130 in this exemplary embodiment has the loss detection part 12, the frame detection part 13, the collision presence or absence detection part 101, and the multirate retry control part 161. Such a configuration enables the multirate retry control part 161 to control multirate retry on the basis of transmission loss information and collision presence or absence information.

In a case where transmission loss has occurred and collision has occurred, there is a possibility that transmission succeeds by performing retransmission, and change of the transmission rate in this case is thought to be redundant. On the other hand, in a case where transmission loss has occurred and collision has not occurred, it is thought that transmission loss due to attenuation has occurred. Therefore, even if retransmission is merely performed in this case, the possibility of failure in transmission again due to attenuation is thought to be high. The wireless communication terminal 160 in this exemplary embodiment has the frame detection part 13 and the collision presence or absence detection part 101, whereby in a case where transmission loss has occurred and collision has not occurred, the wireless communication terminal 160 can control (decrease) the transmission rate without waiting for retransmission by the maximum number of trials of retransmission. As a result, the transmission rate can be decreased when occurrence of transmission loss results from attenuation, and a possibility of occurrence of transmission loss resulting from attenuation can be reduced. In other words, it is possible to secure a communication quality while reducing useless retransmission.

Meanwhile, as described before, in a case where occurrence of transmission loss results from collision, decrease of the transmission rate cannot solve the problem of simultaneous transmission with another wireless communication terminal. Moreover, when the transmission rate is decreased in a case where occurrence of transmission loss results from collision, a single transmission period becomes longer because of decrease of the transmission rate, so that there is a fear of rather increasing a probability of occurrence of collision again. Therefore, control to change the transmission rate when occurrence of collision results in occurrence of transmission loss is thought to be redundant control.

Figure 46:
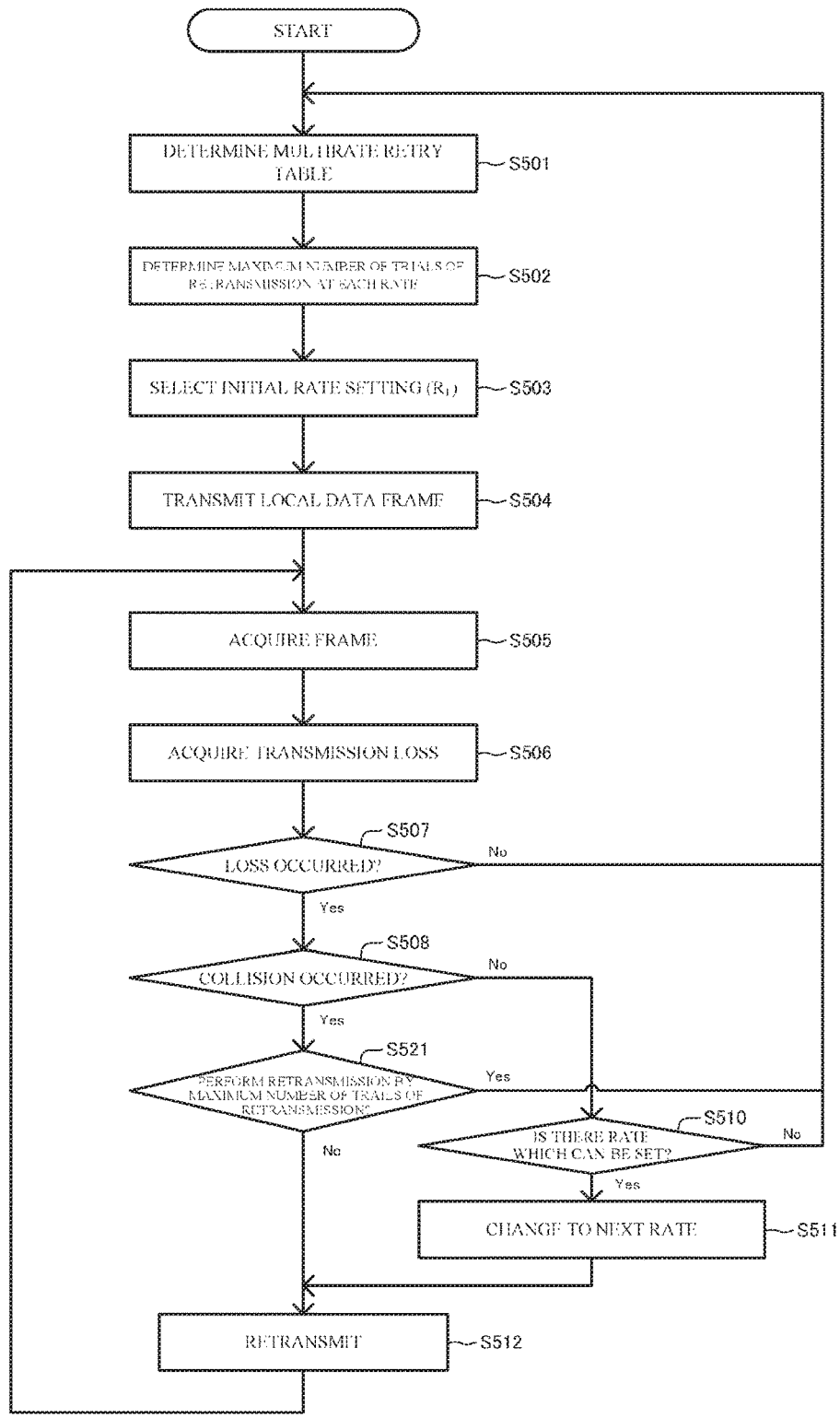
FIG. 46 is a flowchart showing an example of the operation of the wireless communication terminal according to the fourteenth exemplary embodiment of the present invention.

Then, as shown in FIG. 46, in a case where collision has occurred (S508: Yes) and retransmission has been performed by the maximum number of trials of retransmission (S521: Yes), it is thought to end the process without performing retransmission after change of the transmission rate. Configuring the multirate retry control part 161 to execute the process as described above can avoid change of the transmission rate accompanying occurrence of collision and can make control efficiency higher.

Besides, under conventional multirate retry control, it seems that a transmission rate used for transmission of a radio frame signal after succeeding in retransmission always starts from $R_1$ shown in FIG. 44 (always starts from the same transmission rate). This is because it cannot be known whether the cause of failure in transmission is attenuation or collision of frames.

However, in this exemplary embodiment, as described above, redundant rate control is reduced by detection of collision. Therefore, it is possible to set an optimum transmission rate. Then, as shown in FIG. 47, the wireless communication terminal 160 in this exemplary embodiment can be configured to use a transmission rate selected at the time of completion of retransmission as an initial transmission rate for transmission of a radio frame signal next time. With the configuration as described above, at the time of next transmission of a radio frame signal after ending retransmission, it is possible to start transmission by using a better transmission rate used at the time of successful transmission. As a result, it is possible to reduce a possibility of occurrence of transmission loss at the time of next transmission.

Fifteenth Exemplary Embodiment

Next, a fifteenth exemplary embodiment of the present invention will be described referring to the drawings. In the fifteenth exemplary embodiment, a wireless communication terminal 170 which detects collision presence or absence information representing the presence or absence of collision and collision status information representing the status of collision and controls multirate retry on the basis of the detected collision presence or absence information and collision status information will be described.

Figure 48:
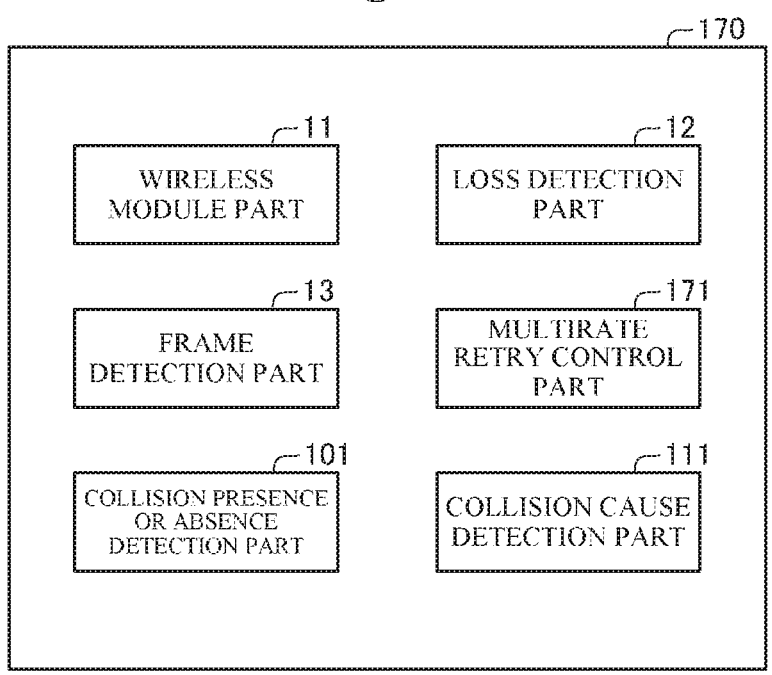
FIG. 48 is a block diagram showing an example of the configuration of a wireless communication terminal according to a fifteenth exemplary embodiment of the present invention.

Referring to FIG. 48, the wireless communication terminal 170 in this exemplary embodiment has the wireless module part 11, the loss detection part 12, the frame detection part 13, the collision presence or absence detection part 101, the collision cause detection part 111, and a multirate retry control part 171. The configurations of the wireless module part 11, the loss detection part 12, the frame detection part 13, the collision presence or absence detection part 101 and the collision cause detection part 111 are the same as described in the above exemplary embodiments. Therefore, a detailed description of each of the configurations will be omitted. The multirate retry control part 171 has a CPU and a storage device, which are not shown in the drawings, and realizes functions to be described later by the CPU's execution of a program stored in the storage device.

The multirate retry control part 171 has the same function as the multirate retry control part 161 described in the fourteenth exemplary embodiment. Moreover, the multirate retry control part 171 in this exemplary embodiment is configured to control multirate retry in consideration of collision status information.

Further, the multirate retry control part 171 has a hidden terminal problem collision counting part, and a storage device such as a memory which stores a hidden terminal problem collision counting part threshold. Because the hidden terminal problem collision counting part and the hidden terminal problem collision counting part threshold are the same as already described, a description thereof will be omitted.

The multirate retry control part 171 receives transmission loss information and collision presence or absence information, and also receives collision status information from the collision cause detection part 111. Then, in a case where transmission loss has occurred and collision has occurred, the multirate retry control part 171 in this exemplary embodiment controls the retransmission control in consideration of a collision cause represented by the collision status information. Specifically, in a case where transmission loss and collision have occurred, retransmission has not been performed by the maximum number of trials of retransmission and the collision cause is the hidden terminal problem, the multirate retry control part 171 executes a process of incrementing by one a hidden terminal problem collision counter. Then, after the incrementing process, the multirate retry control part 171 controls the wireless module part 11 to execute the retransmission control. On the other hand, in a case where transmission loss and collision have occurred, retransmission has not been performed by the maximum number of trials of retransmission and the collision cause is not the hidden terminal problem, the multirate retry control part 171 controls the wireless module part 11 to execute the retransmission control without executing the counting process.

Further, in a case where retransmission has been performed by the maximum number of trials of retransmission, the multirate retry control part 171 determines whether or not the hidden terminal problem collision counter counted by the hidden terminal problem collision counting part is equal to or more than the hidden terminal problem collision counter threshold. Then, in a case where the hidden terminal problem collision counter is equal to or more than the hidden terminal problem collision counter threshold, the multirate retry control part 171 checks whether or not there is a transmission rate which can be set, and executes control to change the transmission rate to a next higher transmission. After that, the multirate retry control part 171 clears the hidden terminal problem collision counter. On the other hand, in a case where the hidden terminal problem collision counter is less than the hidden terminal problem collision counter threshold, the multirate retry control part 171 executes control to change the rate to a next lower rate. Then, the multirate retry control part 171 clears the hidden terminal problem collision counter. On the other hand, in a case where the hidden terminal problem collision counter is less than the hidden terminal problem collision counter threshold, the multirate retry control part 171 executes control to change the rate to a next lower rate. Then, the multirate retry control part 171 clears the hidden terminal problem collision counter.

Thus, the multirate retry control part 171 in this exemplary embodiment is configured to, in the case of determining that transmission loss is frequently caused by the hidden terminal problem, control the retransmission control after changing the transmission to a next higher rate.

Next, an example of the operation of the wireless communication terminal 170 in this exemplary embodiment will be described.

Figure 49:
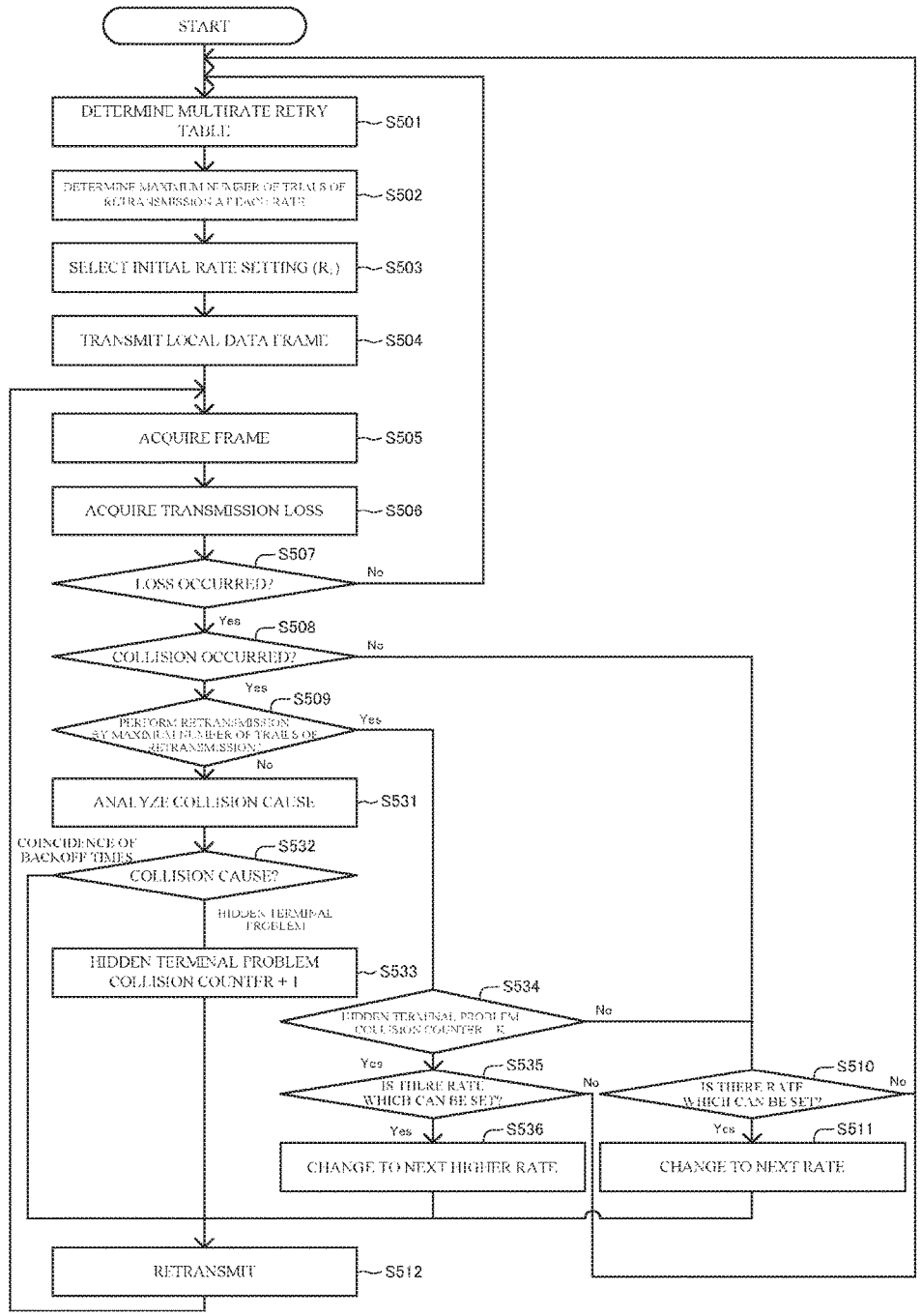
FIG. 49 is a flowchart for describing the operation of the wireless communication terminal according to the fifteenth exemplary embodiment of the present invention.

Referring to FIG. 49, until the multirate retry control part 171 determines whether or not retransmission has been performed by the maximum number of trials of retransmission (S509), the wireless communication terminal 170 performs the same operation as the wireless communication terminal 160 shown in the fourteenth exemplary embodiment. Therefore, a description thereof will be omitted.

In a case where retransmission has not been performed by the maximum number of trials of retransmission, the multirate retry control part 171 analyzes a collision cause on the basis of collision status information (S531). Then, in a case where the collision cause is the hidden terminal problem (S532: hidden terminal problem), the multirate retry control part 171 increments by one the hidden terminal problem collision counter (S533). After that, the multirate retry control part 171 controls the wireless module part 11 to execute the retransmission control (S512). On the other hand, in a case where the collision cause is not the hidden terminal problem (in a case where the collision cause is coincidence of backoff times) (S532: coincidence of backoff times), the multirate retry control part 171 controls the wireless module part 11 to execute the retransmission control without counting anything (S512). Thus, in a case where transmission loss and collision have occurred, retransmission has not been performed by the maximum number of trials of retransmission and the collision cause is the hidden terminal problem, the multirate retry control part 171 in this exemplary embodiment increments by one the hidden terminal problem collision counter counted by the hidden terminal problem collision counting part. Then, the multirate retry control part 171 controls the wireless module part 11 to execute the retransmission control. On the other hand, in a case where transmission loss and collision have occurred, retransmission has not been performed by the maximum number of trials of retransmission and the collision cause is not the hidden terminal problem, the multirate retry control part 171 controls the wireless module part 11 execute the retransmission control without counting anything.

Further, in a case where retransmission has been performed by the maximum number of trials of retransmission, the multirate retry control part 171 determines whether or not the hidden terminal problem collision counter is equal to or more than the hidden terminal problem collision counter threshold (S534). Then, in a case where the hidden terminal problem collision counter is equal to or more than the hidden terminal problem collision counter threshold, the multirate retry control part 171 determines whether or not there is a next rate (a next higher rate) which can be set (S535). In a case where there is a rate which can be set (S535: Yes), the multirate retry control part 171 controls the wireless module part 11 to change the transmission rate to a next higher rate (S536) and execute the retransmission control (S512). On the other hand, in a case where there is no rate that can be set (S535: No), the multirate retry control part 171 stops the subsequent processes. In a case where the hidden terminal problem collision counter is less than the hidden terminal problem collision counter threshold (S534: No), the multirate retry control part 171 determines whether or not there is a next rate (a next lower rate) which can be set (S510). Because the subsequent operation is the same as already described, a description thereof will be omitted.

Thus, the wireless communication terminal 170 in this exemplary embodiment has the collision cause detection part 111 and the multirate retry control part 171. Such a configuration enables the wireless communication terminal 170 to control multirate retry in consideration of collision status information.

As described before, in a case where the cause of collision is the hidden terminal problem, it is possible to increase a probability of success in transmission at the time of retransmission by performing retransmission after increasing a transmission rate. On the other hand, in a case where the cause of collision is coincidence of backoff times, it seems that a probability of occurrence of collision does not particularly change even if a transmission rate is changed and a time required to transmit a single frame is changed.

Thus, the wireless communication terminal 170 in this exemplary embodiment has the collision cause detection part 111 and the multirate retry control part 171, whereby the wireless communication terminal 170 can increase the transmission rate and thereafter execute the retransmission control in a case where collision is frequently caused by the hidden terminal problem. As a result, a time required to transmit a single frame can be shortened, and a probability of occurrence of transmission loss due to occurrence of collision can be decreased. In other words, the wireless communication terminal 170 in this exemplary embodiment has the configuration as described above, whereby the wireless communication terminal 170 can secure a high communication quality without executing redundant control.

Figure 50:
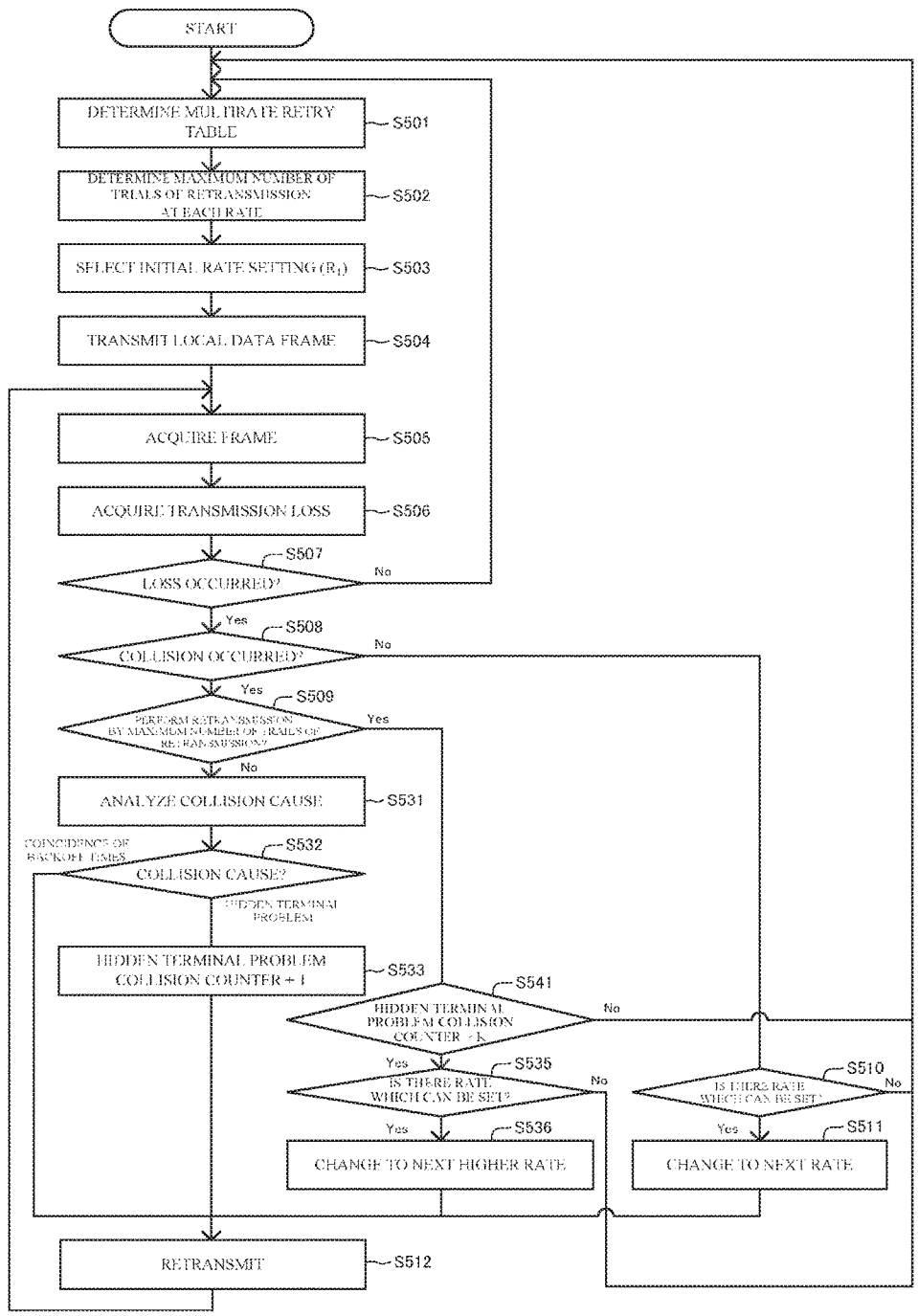
FIG. 50 is a flowchart showing an example of the operation of the wireless communication terminal according to the fifteenth exemplary embodiment of the present invention.

Meanwhile, as shown in FIG. 50, the multirate retry control part 171 may be configured to, in a case where retransmission has been performed by the maximum number of trials of retransmission and the hidden terminal problem collision counter is less than the hidden terminal problem collision counter threshold (S541: No), stop the subsequent processes.

Further, as described before, the collision cause detection part 111 can be configured to detect coincidence of backoff times, the hidden terminal problem 1 and the hidden terminal problem 2 as a collision cause. Moreover, in accordance with the configuration of the collision cause detection part 111 described above, the multirate retry control part 171 may be configured to execute the process separately with respect to the hidden terminal problem 1 and the hidden terminal problem 2.

Further, the wireless communication terminal 170 may be configured to use a transmission rate being selected at the time of completion of retransmission as an initial transmission rate at the time of transmission of a radio frame signal next time.

Sixteenth Exemplary Embodiment

Next, a sixteenth exemplary embodiment of the present invention will be described referring to the drawings. In the sixteenth exemplary embodiment, a wireless communication terminal 180 which controls the retransmission control in consideration of a traffic amount will be described.

The wireless communication terminal 180 in this exemplary embodiment has the same components as the wireless communication terminal 170 in the fifteenth exemplary embodiment. Therefore, a detailed description of each of the components will be omitted.

The wireless communication terminal 180 in this exemplary embodiment is configured to be able to acquire the traffic amount as the wireless communication terminal 120 and the wireless communication terminal 150. Moreover, the storage device of the multirate retry control part 171 in this exemplary embodiment is configured to store the traffic amount threshold. Because the configuration for acquiring the traffic amount and the traffic amount threshold are the same as already described, a detailed description thereof will be omitted.

The multirate retry control part 171 in this exemplary embodiment determines whether or not an acquired traffic amount of its surroundings is equal to or more than the traffic threshold at the time of incrementing by one the hidden terminal problem collision counter. Then, in a case where the traffic amount is equal to or more than the traffic amount threshold, the multirate retry control part 171 in this exemplary embodiment tries to execute the process for increasing the transmission rate. On the other hand, in a case where the traffic amount is less than the traffic amount threshold, the multirate retry control part 171 controls the retransmission control without executing the rate control.

Thus, the multirate retry control part 171 in this exemplary embodiment is configured to control multirate retry on the basis of transmission loss information, collision presence or absence information, collision status information, and a traffic amount.

Figure 51:
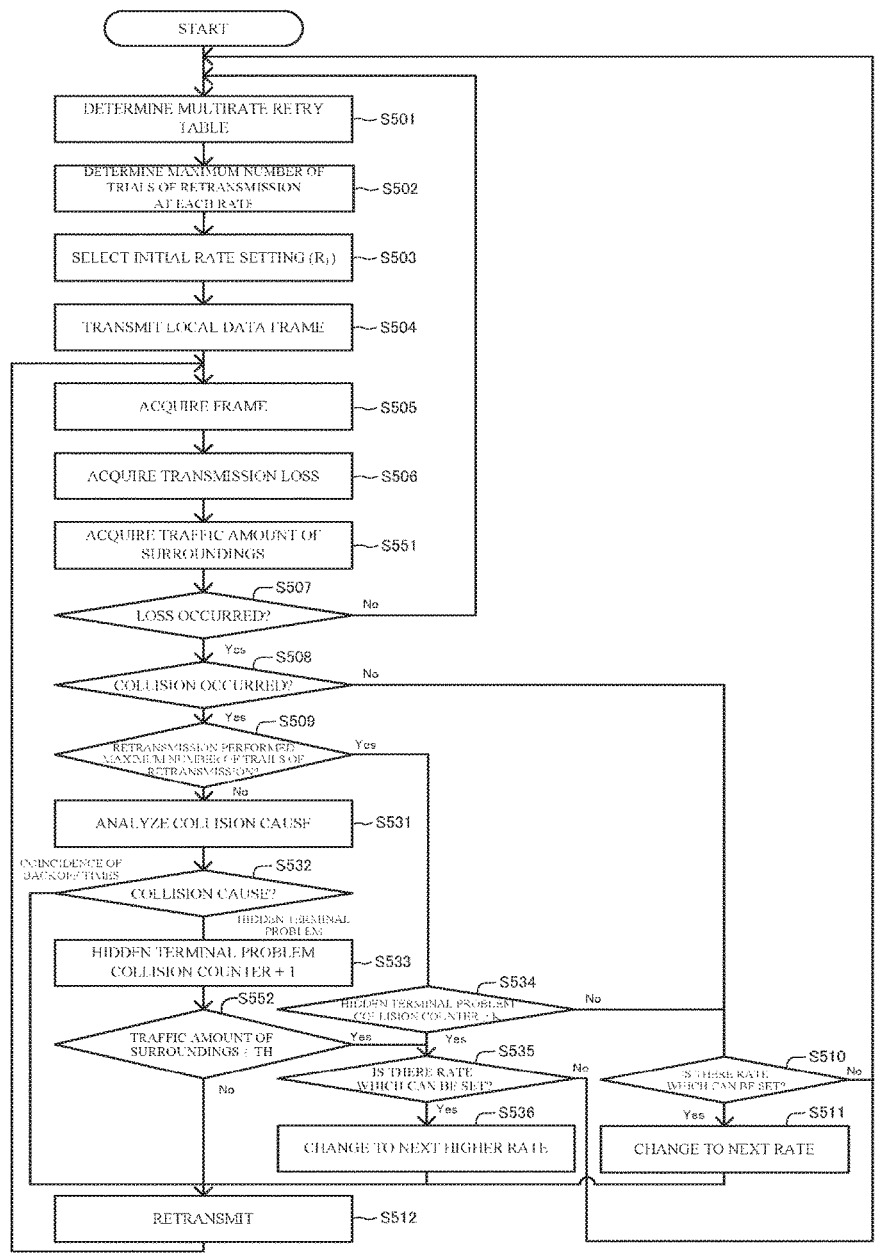
FIG. 51 is a flowchart for describing the operation of a wireless communication terminal according to a sixteenth exemplary embodiment of the present invention.

FIG. 51 shows an example of the operation of the wireless communication terminal 180 in this exemplary embodiment. Referring to FIG. 51, at the time of acquisition of a radio frame signal by the frame detection part 13 (S505) and acquisition of transmission loss information by the loss detection part 12 (S506), the wireless communication terminal 180 acquires a traffic amount of its surroundings (S551). Then, the acquired traffic amount is transmitted to the multirate retry control part 171. Herein, the time to acquire the traffic amount is not limited to the abovementioned case.

Further, when counting the hidden terminal problem collision counter (S533), the multirate retry control part 171 in this exemplary embodiment determines whether or not the traffic amount acquired in the abovementioned operation is equal to or more than a traffic amount threshold (S552). Then, in a case where the traffic amount is equal to or more than the traffic amount threshold (S552: Yes), the multirate retry control part 171 executes control to increase the transmission rate (S535, S536). On the other hand, in a case where the traffic amount is less than the traffic amount threshold (S552: No), the multirate retry control part 171 controls the retransmission control without changing the rate.

Thus, the wireless communication terminal 180 in this exemplary embodiment is configured to acquire a traffic amount. Such a configuration enables the wireless communication terminal 180 to control multirate retry in consideration of a traffic amount.

In a case where collision has been caused by the hidden terminal problem in an environment that the channel is congested with traffic, it is thought to be highly possible that collision occurs again even if retransmission is performed. On the other hand, in a case where collision has been caused by the hidden terminal problem in an environment that the channel is not congested with traffic, it is thought to be possible that collision does not occur when retransmission performed and retransmission succeeds.

Then, configured to acquire the traffic amount, the wireless communication terminal 180 in this exemplary embodiment can control the retransmission control at an unchanged transmission rate in a case where a collision cause is the hidden terminal problem and the traffic amount is less than the traffic amount threshold. With configuration to acquire a traffic amount as described above, in a case where a collision cause is the hidden terminal problem and the traffic amount is equal to or more than the traffic amount threshold, the wireless communication terminal 180 can increase the transmission rate and thereafter control the retransmission control. As a result, the transmission rate is unchanged in a case where a probability of success in retransmission is high even if the transmission rate is not increased, whereas control to change the transmission rate can be executed in a case where there is a possibility of failure in retransmission if the transmission rate is unchanged. In other words, The configuration as described above enables the wireless communication terminal 180 to secure a communication quality while reducing redundant control.

Seventeenth Exemplary Embodiment

Next, a seventeenth exemplary embodiment of the present invention will be described referring to the drawings. In the seventeenth exemplary embodiment, another example of classification of collision patterns at the time of occurrence of collision detected by the frame detection part 13 will be described.

In the exemplary embodiments described heretofore, as an example of classification of patterns detected by the frame detection part 13 at the time of occurrence of collision, it is possible to classify collision patterns into eleven kinds shown in FIG. 5. However, collision patterns detected by the frame detection part 13 can be classified into patterns other than eleven kinds.

Figure 52:
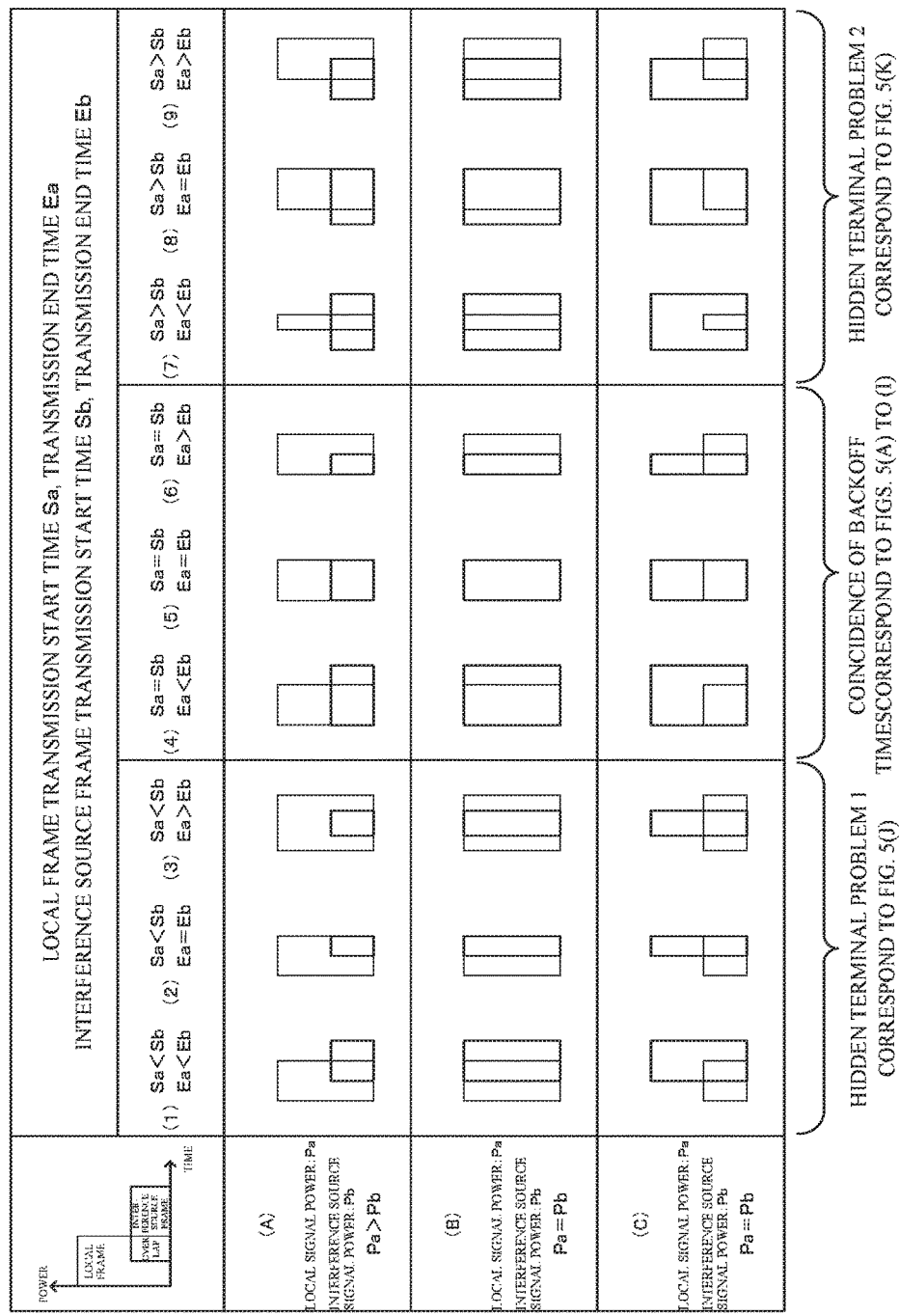
FIG. 52 is a diagram for describing an example of classification of collision patterns at the time of collision occurrence which are detected by a frame detection part 13 of a wireless communication terminal according to a seventeenth exemplary embodiment of the present invention.

For example, referring to FIG. 52, collision patterns detected by the frame detection part 13 can be classified into twenty-seven kinds. Specifically, as shown in FIG. 52, the collision pattern determined to be the collision terminal problem 1 shown in FIG. 5(J) can be classified into nine kinds in total on the basis of power, a transmission data amount, a transmission rate, and so on. Further, likewise, the collision pattern determined to be the collision terminal problem 2 shown in FIG. 5(K) can be classified into nine kinds in total on the basis of power, a transmission data amount, a transmission rate, and so on. Thus, the collision patterns of FIGS. 5 (J) and (K) can be classified into nine kinds, respectively, on the basis of power, a transmission data amount, a transmission rate, and so on. Therefore, in addition to the collision patterns (A) to (J) of FIG. 5, collision patterns detected by the frame detection part 13 can be classified into twenty-seven kinds of collision patterns.

As described above, collision patterns detected by the frame detection part 13 are not limited to eleven kinds. Collision patterns detected by the frame detection part 13 can be classified into twenty-seven kinds of collision patterns, for example. Moreover, as shown in the first exemplary embodiment, the eleven kinds of collision patterns can be classified into three major collision statuses. This is true to the case of classifying into twenty-seven kinds of collision patterns. Thus, collision patterns detected by the frame detection part 13 can be classified into eleven kinds, twenty-seven kinds, or three kinds, for example. Meanwhile, collision patterns detected by the frame detection part 13 may be classified into collision patterns of other than the abovementioned number of kinds.

Eighteenth Exemplary Embodiment

Next, an eighteenth exemplary embodiment of the present invention will be described referring to the drawings. In the eighteenth exemplary embodiment, a wireless communication terminal 190 which detects collision information representing the aspect of collision of radio frame signals and controls a transmission process on the basis of the detected collision information will be described. In this exemplary embodiment, the outline of the configuration of the wireless communication terminal 190 will be described.

Figure 53:
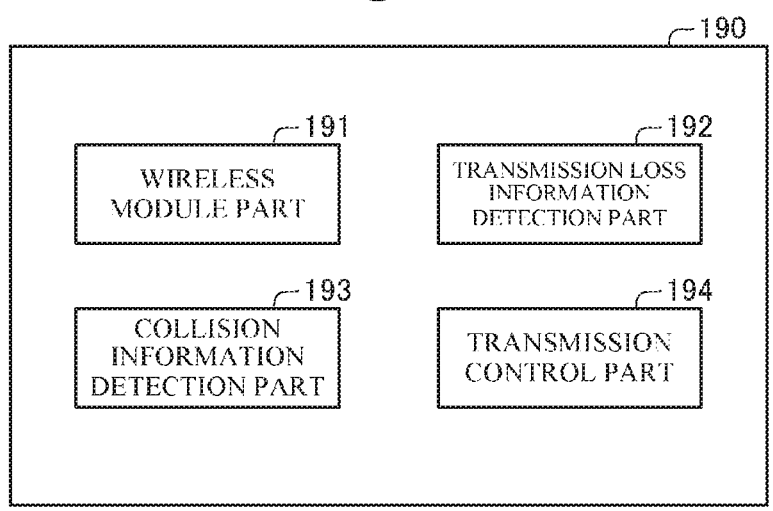
FIG. 53 is a schematic block diagram for describing the overview of the configuration of a wireless communication terminal according to an eighteenth exemplary embodiment of the present invention.

Referring to FIG. 53, the wireless communication terminal 190 has a wireless module part 191, a transmission loss detection part 192, a collision information detection part 193, and a transmission control part 194.

The wireless module part 191 has a function of transmitting a radio frame signal. The transmission loss detection part 192 has a function of detecting transmission loss information representing whether or not a radio frame signal transmitted by the wireless module part has reached a transmission destination. The collision information detection part 193 has a function of detecting collision information representing the aspect of collision between a radio frame signal transmitted by the wireless module part and another radio frame signal. The transmission control part 194 has a function of controlling a transmission process executed by the wireless module part 191 on the basis of transmission loss information and collision information.

Thus, the wireless communication terminal 190 in this exemplary embodiment has the wireless module part 191, the transmission loss information detection part 192, the collision information detection part 193, and the transmission control part 194. Such a configuration enables the wireless communication terminal 190 to control a transmission process executed by the wireless module part 191 on the basis of transmission loss information detected by the transmission loss information detection part 192 and collision information detected by the collision information detection part 193. As a result, the wireless communication terminal 190 can secure a communication quality while reducing redundant control which is not a process corresponding to the cause of decrease of a communication quality.

Further, the wireless communication terminal 190 described above can be realized by installation of a given program in the wireless communication terminal 190. Specifically, a program as another aspect of the present invention is a program for causing a wireless communication terminal to realize a wireless module part transmitting a radio frame signal, a transmission loss information detection part detecting transmission loss information representing whether or not a radio frame signal transmitted by the wireless module part has reached a transmission destination, a collision information detection part detecting collision information representing an aspect of collision between a radio frame signal transmitted by the wireless module part and another radio frame signal, and a transmission control part controlling a transmission process executed by the wireless module part on the basis of the transmission loss information and the collision information.

Further, a wireless communication method executed by operation of the wireless communication terminal 190 described above is a method including: detecting transmission loss information representing whether or not a transmitted radio frame signal has reached a transmission destination, and collision information representing an aspect of collision between the radio frame signal and another radio frame signal; and controlling a transmission process on the basis of the detected transmission loss information and collision information.

Because the program and the wireless communication method having the abovementioned configurations have the same action as the wireless communication terminal 190, the program and the wireless communication method can achieve the object of the present invention.

SUPPLEMENTARY NOTES

The whole or part of the exemplary embodiments disclosed above can be described as the following supplementary notes. Below, the overview of a wireless communication terminal and so on according to the present invention will be described. However, the present invention is not limited to the following configurations.

Supplementary Note 1

A wireless communication terminal comprising:
a wireless module part configured to transmit a radio frame signal;
a frame detection part configured to detect power of a space radio signal on a same channel as the radio frame signal transmitted by the wireless module part; and
a collision reduction control part configured to detect a given collision status on a basis of a detection result detected by the frame detection part, the collision reduction control part performing change of a parameter corresponding to the detected given collision status, the given collision status being of the radio frame signal transmitted by the wireless module part and another radio frame signal.

Supplementary Note 2

The wireless communication terminal according to Supplementary Note 1, wherein:
the collision reduction control part is configured to detect, as the collision status, a pattern of collision between the radio frame signal transmitted by the wireless module part and another radio frame signal.

Supplementary Note 3

The wireless communication terminal according to Supplementary Note 2, wherein:
the collision reduction control part is configured to detect a simultaneous-transmission collision occurrence status as the collision status and change a backoff time parameter, the simultaneous-transmission collision occurrence status being a status that collision has occurred because the radio frame signal from the wireless module part and another radio frame signal are simultaneously transmitted, the backoff time parameter being a parameter corresponding to the simultaneous-transmission collision occurrence status, the backoff time parameter being a transmission standby time selected at random.

Supplementary Note 4

The wireless communication terminal according to Supplementary Note 2 or 3, wherein:
the collision reduction control part is configured to detect a transmission-in-transmission collision occurrence status as the collision status and change a carrier sense parameter, the transmission-in-transmission collision occurrence status being a status that collision has occurred because another radio frame signal is transmitted during transmission of the radio frame signal, the carrier sense parameter being a parameter corresponding to the transmission-in-transmission collision occurrence status, the carrier sense parameter being used at a time of checking channel availability.

Supplementary Note 4-1

The wireless communication terminal according to Supplementary Note 4, wherein:
the collision reduction control part is configured to detect a transmission-before-transmission collision occurrence status as the collision status and change a transmission power parameter, the transmission-before-transmission collision occurrence status being a status that collision has occurred because another radio frame signal is transmitted during transmission of the radio frame signal by the wireless module part, the transmission power parameter being a parameter corresponding to the transmission-before-transmission collision occurrence status, the transmission power parameter being used when the wireless module part transmits the radio frame signal.

Supplementary Note 4-2

The wireless communication terminal according to Supplementary Note 4, wherein:
the collision reduction control part is configured to detect a transmission-after-transmission collision occurrence status as the collision status and change a carrier sensing range parameter, the transmission-after-transmission collision occurrence status being a status that collision has occurred because the radio frame signal from the wireless module part is transmitted during transmission of another radio frame signal, the carrier sensing range parameter being a parameter corresponding to the transmission-after-transmission collision occurrence status, the carrier sensing range parameter being a sensing range of carrier sensing.

Supplementary Note 4-3

The wireless communication terminal according to Supplementary Note 4, wherein:
the collision reduction control part is configured to detect a transmission-before-transmission collision occurrence status and a transmission-after-transmission collision occurrence status as the collision status and change a transmission power parameter and a carrier sensing range parameter, the transmission-before-transmission collision occurrence status being a status that collision has occurred because another radio frame signal is transmitted during transmission of the radio frame signal by the wireless module part, the transmission-after-transmission collision occurrence status being a status that collision has occurred because the radio frame signal from the wireless module part is transmitted during transmission of another radio frame signal, the transmission power parameter and the carrier sensing range parameter being parameters corresponding to the transmission-before-transmission collision occurrence status and transmission-after-transmission collision occurrence status, respectively.

Supplementary Note 5

The wireless communication terminal according to any of Supplementary Notes 1 to 4, comprising a loss detection part configured to detect whether or not the radio frame signal transmitted by the wireless module part has reached a transmission destination, the loss detection part detecting a transmission loss rate, the transmission loss rate being a probability that the radio frame signal has not reached the transmission destination,
wherein the collision reduction control part is configured to change the parameter in a case where the transmission loss rate detected by the loss detection part exceeds a transmission loss rate threshold, the transmission loss rate threshold being a given threshold determined in advance.

Supplementary Note 6

The wireless communication terminal according to any of Supplementary Notes 1 to 5, wherein:
the collision reduction control part is configured to calculate a collision rate on a basis of a number of wireless communications by the wireless module part and a number of detected collisions, and change a transmission power parameter in a case where the calculated collision rate is not more than a collision rate threshold, whereas determine that collision has occurred and performs change of a parameter corresponding to the given collision status in a case where the collision rate is more than the collision rate threshold, the collision rate threshold being a given threshold determined in advance, the transmission power parameter being a parameter used when the wireless module part transmits the radio frame signal.

Supplementary Note 6-1

The wireless communication terminal according to any of Supplementary Notes 1 to 6, comprising a channel shift part configured to shift a channel, wherein:
the collision reduction control part is configured to calculate a collision rate on a basis of a number of wireless communications by the wireless module part and a number of detected collisions, and estimate a number of other wireless communication terminals around itself on a basis of the calculated collision rate; and
the channel shift part is configured to determine to shift a channel on a basis of the number of the other wireless communication terminals estimated by the collision reduction control part and a predetermined transit threshold.

Supplementary Note 7

A wireless communication method comprising:
detecting power of a space radio signal on a same channel as a transmitted radio frame signal; and
detecting a given collision status of the radio frame signal and another radio frame signal on a basis of a detection result, and changing a parameter corresponding to the detected given collision status.

Supplementary Note 8

The wireless communication method according to Supplementary Note 7, comprising:
detecting the collision status on a basis of a pattern of collision between the radio frame signal transmitted by a wireless module part and another radio frame signal.

Supplementary Note 9

A computer program comprising instructions for causing a wireless communication terminal to realize:
a wireless module part configured to transmit a radio frame signal;
a frame detection part configured to detect power of a space radio signal on a same channel as the radio frame signal transmitted by the wireless module part; and
a collision reduction control part configured to detect a given collision status on a basis of a detection result detected by the frame detection part, the collision reduction control part changing a parameter corresponding to the detected given collision status, the given collision status being of the radio frame signal transmitted by the wireless module part and another radio frame signal.

Supplementary Note 10

The computer program according to Supplementary Note 9, wherein:
the collision reduction control part is configured to detect the collision status on a basis of a pattern of collision between the radio frame signal transmitted by the wireless module part and another radio frame signal.

Supplementary Note 11

A wireless communication terminal comprising:
a wireless module part configured to transmit a radio frame signal;
a frame detection part configured to detect power of a space radio signal on a same channel as the radio frame signal transmitted by the wireless module part; and
a collision reduction control part configured to detect collision between the radio frame signal transmitted by the wireless module part and another radio frame signal, on a basis of a detection result detected by the frame detection part, the collision reduction control part performing change of a parameter corresponding to the detected collision.

Supplementary Note 12

A wireless communication terminal comprising:
a wireless module part configured to transmit a radio frame signal;
a transmission loss information detection part configured to detect transmission loss information, the transmission loss information representing whether or not the radio frame signal transmitted by the wireless module part has reached a transmission destination;
a collision information detection part configured to detect collision information, the collision information representing an aspect of collision between the radio frame signal transmitted by the wireless module part and another radio frame signal; and
a transmission control part configured to control a transmission process executed by the wireless module part, on a basis of the transmission loss information and the collision information.

Supplementary Note 13

The wireless communication terminal according to Supplementary Note 12, wherein:
the collision information detection part is configured to detect the collision information including collision presence or absence information, the collision presence or absence information representing presence or absence of collision between the radio frame signal transmitted by the radio module part and another radio frame signal; and
the transmission control part is configured to control the transmission process executed by the wireless module part, on a basis of the transmission loss information and the collision information including the collision presence or absence information.

Supplementary Note 14

The wireless communication terminal according to Supplementary Note 13, wherein:
the wireless module part is configured to transmit the radio frame signal at one transmission rate of a plurality of transmission rates; and
the transmission control part is configured to control the transmission rate used when the wireless module part transmits the radio frame signal, on a basis of the transmission loss information and the collision information including the collision presence or absence information.

Supplementary Note 14-1

The wireless communication terminal according to Supplementary Note 14, wherein:
the transmission control part is configured to increment a transmission failure counter in a case where transmission of the radio frame signal by the wireless module part has failed and there is not collision between the radio frame signal and another radio frame signal, and change the transmission rate to a lower rate in a case where the transmission failure counter exceeds a given transmission failure threshold.

Supplementary Note 15

The wireless communication terminal according to Supplementary Note 13 or 14, wherein:
the wireless module part is configured to execute a retransmission process under control by the transmission control part, the retransmission process being transmitting a radio frame signal with same contents again; and
the transmission control part is configured to control the retransmission process executed by the wireless module part, on a basis of the transmission loss information and the collision information including the collision presence or absence information.

Supplementary Note 15-1

The wireless communication terminal according to Supplementary Note 15, wherein:
the transmission control part is configured to control the wireless module part to execute the retransmission process in a case where transmission of the radio frame signal by the wireless module part has failed and there is collision between the radio frame signal and another radio frame signal.

Supplementary Note 15-2

The wireless communication terminal according to any of Supplementary Notes 13 to 15-1, wherein:
the wireless module part is configured to execute a multirate retry process under control by the transmission control part, the multirate retry process being decreasing a transmission rate and executing the retransmission process again in a case where the retransmission process has failed a predetermined number of times; and
the transmission control part is configured to control the multirate retry process executed by the wireless module part, on a basis of the transmission loss information and the collision information including the collision presence or absence information.

Supplementary Note 16

The wireless communication terminal according to any of Supplementary Notes 12 to 15, wherein:
the collision information detection part is configured to detect the collision information including collision status information, the collision status information representing a collision status of the radio frame signal and another radio frame signal; and
the transmission control part is configured to control the transmission process executed by the wireless module part, on a basis of the transmission loss information and the collision information including the collision status information.

Supplementary Note 16-1

The wireless communication terminal according to Supplementary Note 16, wherein:
the wireless module part is configured to transmit the radio frame signal at one transmission rate of a plurality of transmission rates; and
the transmission control part is configured to change the transmission rate to a higher rate in a case where the collision has occurred and a collision status at a time of occurrence of the collision is a transmission-in-transmission collision occurrence status that collision has occurred because another radio frame signal is transmitted during transmission of the radio frame signal.

Supplementary Note 16-2

The wireless communication terminal according to Supplementary Note 16 or 16-1, wherein:
the transmission control part is configured to control the wireless module part to execute the retransmission process in a case where the collision has occurred and a collision status at a time of occurrence of the collision is not a transmission-in-transmission collision occurrence status that collision has occurred because another radio frame signal is transmitted during transmission of the radio frame signal.

Supplementary Note 17

The wireless communication terminal according to any of Supplementary Notes 12 to 16, wherein:
the transmission control part is configured to acquire a traffic amount and, in consideration of the acquired traffic amount, control the transmission process executed by the wireless module part, the traffic amount being an amount of data flowing on a channel.

Supplementary Note 18

The wireless communication terminal according to any of Supplementary Notes 12 to 17, wherein:
the collision information detection part is configured to detect the collision information including collision status information, the collision status information representing a collision status of the radio frame signal and another radio frame signal; and
the transmission control part is configured to control a parameter corresponding to the collision status on a basis of the transmission loss information and the collision information including the collision status information, the parameter being used when the wireless module part executes the transmission process.

Supplementary Note 19

The wireless communication terminal according to Supplementary Note 18, wherein:
the collision information detection part is configured to detect a simultaneous-transmission collision occurrence status as the collision status represented by the collision status information, the simultaneous-transmission collision occurrence status being a status that collision has occurred because the radio frame signal from the wireless module part and another radio frame signal are simultaneously transmitted; and
the transmission control part is configured to control a backoff time parameter, the backoff time parameter being a parameter having effect on the simultaneous-transmission collision occurrence status, the backoff time parameter being a transmission standby time selected at random.

Supplementary Note 20

The wireless communication terminal according to Supplementary Note 18 or 19, wherein:
the collision information detection part is configured to detect a transmission-in-transmission collision occurrence status as the collision status represented by the collision status information, the transmission-in-transmission collision occurrence status being a status that collision has occurred because another radio frame signal is transmitted during transmission of the radio frame signal; and
the transmission control part is configured to control a carrier sense parameter, the carrier sense parameter being a parameter having effect on the transmission-in-transmission collision occurrence status, the carrier sense parameter being used at a time of checking channel availability.

Supplementary Note 21

The wireless communication terminal according to any of Supplementary Notes 18 to 20, wherein:
the transmission loss information detection part is configured to calculate a transmission loss rate on a basis of the transmission loss information, the transmission loss rate being a probability that the radio frame signal has not reached a transmission destination; and
the transmission control part is configured to control a parameter corresponding to the collision status in a case where the transmission loss rate detected by the transmission loss information detection part exceeds a transmission loss rate threshold, the transmission loss rate threshold being a given threshold determined in advance.

Supplementary Note 22

The wireless communication terminal according to Supplementary Note 21, wherein:
the transmission control part is configured to calculate a collision rate on a basis of a number of wireless communications by the wireless module part and a number of collisions detected by the collision information detection part, and change a transmission power parameter in a case where the calculated collision rate is not more than a collision rate threshold, whereas determine that collision has occurred and control a parameter corresponding to the collision status in a case where the collision rate is more than the collision rate threshold, the collision rate threshold being a given threshold determined in advance, and the transmission power parameter being a parameter used when the wireless module part transmits the radio frame signal.

Supplementary Note 23

A wireless communication method comprising:
detecting transmission loss information and collision information, the transmission loss information representing whether or not a transmitted radio frame signal has reached a transmission destination, the collision information representing an aspect of collision between the radio frame signal and another radio frame signal; and controlling a transmission process on a basis of the detected transmission loss information and the detected collision information.

Supplementary Note 24

The wireless communication method according to Supplementary Note 23, comprising:
detecting the collision information including collision presence or absence information, the collision presence or absence information representing presence or absence of collision between the radio frame signal and another radio frame signal; and
controlling the transmission process on a basis of the detected transmission loss information and the detected collision information including the collision presence or absence information.

Supplementary Note 25

The wireless communication method according to Supplementary Note 23, comprising:
detecting the collision information including collision status information, the collision status information representing a collision status of the radio frame signal and another radio frame signal; and
controlling a parameter corresponding to the collision status on a basis of the detected transmission loss information and the detected collision information including the collision status information, the parameter being used when executing the transmission process.

Supplementary Note 26

A computer program comprising instructions for causing a wireless communication terminal to realize:
a wireless module part configured to transmit a radio frame signal;
a transmission loss information detection part configured to detect transmission loss information, the transmission loss information representing whether or not the radio frame signal transmitted by the wireless module part has reached a transmission destination;
a collision information detection part configured to detect collision information, the collision information representing an aspect of collision between the radio frame signal transmitted by the wireless module part and another radio frame signal; and
a transmission control part configured to control a transmission process executed by the wireless module part, on a basis of the transmission loss information and the collision information.

Supplementary Note 26-1

The computer program according to Supplementary Note 26, wherein:
the collision information detection part is configured to detect the collision information including collision presence or absence information, the collision presence or absence information representing presence or absence of collision between the radio frame signal transmitted by the radio module part and another radio frame signal; and
the transmission control part is configured to control the transmission process executed by the wireless module part, on a basis of the transmission loss information and the collision information including the collision presence or absence information.

Supplementary Note 26-2

The computer program according to Supplementary Note 26, wherein:
the collision information detection part is configured to detect the collision information including collision status information, the collision status information representing a collision status, the collision status being a collision pattern of the radio frame signal and another radio frame signal; and
the transmission control part is configured to control a parameter corresponding to the collision status on a basis of the transmission loss information and the collision information including the collision status information, the parameter being used when the wireless module part executes the transmission process.

The program described in the exemplary embodiments and supplementary notes is stored in a storage device or recorded on a computer-readable recording medium. For example, the recording medium is a portable medium such as a flexible disk, an optical disk, a magneto-optical disk and a semiconductor memory.

Although the present invention is described above on the basis of the exemplary embodiments, the present invention is not limited to the exemplary embodiments. The configurations and details of the present invention can be changed and modified in various manners that can be understood by one skilled in the art within the scope of the present invention.

The present invention is based upon and claims the benefit of priority from Japanese patent application No. 2014-026463, filed on Feb. 14, 2014, the disclosure of which is incorporated herein in its entirety by reference.

DESCRIPTION OF NUMERALS 1, 3, 4 wireless communication terminal
11 wireless module part
12 loss detection part
13 frame detection part
14 collision reduction control part
21 collision detection part
22 transmission-loss-rate and collision-rate threshold comparison part
23 collision cause analysis part
24 parameter adjustment part
25 parameter storage part
26 adjustment details storage part
34 collision reduction control part
37 backoff time coincidence probability storage part
45 channel shift determination part
5 transmission control part
7 wireless communication terminal
71 collision reduction control part
81 collision detection part
83 parameter adjustment part
84 parameter storage part
9 wireless communication terminal 91 wireless module part
92 frame detection part
93 collision reduction control part
100, 110, 129, 130, 140, 150, 160, 170, 180, 190 wireless communication terminal
101 collision presence or absence detection part
102, 112 multirate control part
111 collision cause detection part
131, 141 retransmission control part
161, 171 multirate retry control part
191 wireless module part
192 transmission loss information detection part
193 collision information detection part
194 transmission control part

The invention claimed is:

1. A wireless communication terminal comprising: a wireless module part implemented by an antenna, the wireless module part being configured to transmit a radio frame signal; a transmission loss information detection part implemented by a processor, the transmission loss information detection part being configured to detect transmission loss information, the transmission loss information representing whether or not the radio frame signal transmitted by the wireless module part has reached a transmission destination; a collision information detection part implemented by a processor, the collision information detection part being configured to detect collision information, the collision information representing an aspect of collision between the radio frame signal transmitted by the wireless module part and another radio frame signal; and a transmission control part implemented by a processor, the transmission control part being configured to control a transmission process executed by the wireless module part, on a basis of the transmission loss information and the collision information, wherein the collision information detection part is configured to detect the collision information including collision status information representing a collision status that is a collision pattern between the radio frame signal and another radio frame signal and varies depending on a collision cause that is a cause of occurrence of collision; and the transmission control part is configured to control a parameter corresponding to the collision cause, the parameter being used when the transmission process is executed, on a basis of the transmission loss information and the collision information including the collision status information.

2. The wireless communication terminal according to claim 1, wherein:
the collision information detection part is configured to detect the collision information including collision presence or absence information, the collision presence or absence information representing presence or absence of collision between the radio frame signal transmitted by the wireless module part and another radio frame signal; and
the transmission control part is configured to control the transmission process executed by the wireless module part, on a basis of the transmission loss information and the collision information including the collision presence or absence information.

3. The wireless communication terminal according to claim 2, wherein: the wireless module part is configured to transmit the radio frame signal at one transmission rate of a plurality of transmission rates; and the transmission control part is configured to control the transmission rate used when the wireless module part transmits the radio frame signal, on a basis of the transmission loss information and the collision information including the collision presence or absence information.

4. The wireless communication terminal according to claim 2, wherein: the transmission control part is configured to increment a transmission failure counter in a case where transmission of the radio frame signal by the wireless module part has failed and there is not collision between the radio frame signal and another radio frame signal, and change the transmission rate to a lower rate in a case where the transmission failure counter exceeds a given transmission failure threshold.

5. The wireless communication terminal according to claim 2, wherein: the wireless module part is configured to execute a retransmission process under control by the transmission control part, the retransmission process being transmitting a radio frame signal with same contents again; and the transmission control part is configured to control the retransmission process executed by the wireless module part, on a basis of the transmission loss information and the collision information including the collision presence or absence information.

6. The wireless communication terminal according to claim 5, wherein: the transmission control part is configured to control the wireless module part to execute the retransmission process in a case where transmission of the radio frame signal by the wireless module part has failed and there is collision between the radio frame signal and another radio frame signal.

7. The wireless communication terminal according to claim 2, wherein: the wireless module part is configured to execute a multirate retry process under control by the transmission control part, the multirate retry process being decreasing a transmission rate and executing the retransmission process again in a case where the retransmission process has failed a predetermined number of times; and the transmission control part is configured to control the multirate retry process executed by the wireless module part, on a basis of the transmission loss information and the collision information including the collision presence or absence information.

8. The wireless communication terminal according to claim 1, wherein: the collision information detection part is configured to detect the collision information including collision status information, the collision status information representing a collision status, the collision status being a collision pattern of the radio frame signal and another radio frame signal; and the transmission control part is configured to control the transmission process executed by the wireless module part, on a basis of the transmission loss information and the collision information including the collision status information.

9. The wireless communication terminal according to claim 8, wherein: the wireless module part is configured to transmit the radio frame signal at one transmission rate of a plurality of transmission rates; and the transmission control part is configured to change the transmission rate to a higher rate in a case where the collision has occurred and a collision status at a time of occurrence of the collision is a transmission-in-transmission collision occurrence status that collision has occurred because another radio frame signal is transmitted during transmission of the radio frame signal.

10. The wireless communication terminal according to claim 8, wherein: the transmission control part is configured to control the wireless module part to execute the retransmission process in a case where the collision has occurred and a collision status at a time of occurrence of the collision is not a transmission-in-transmission collision occurrence status that collision has occurred because another radio frame signal is transmitted during transmission of the radio frame signal.

11. The wireless communication terminal according to claim 1, wherein: the transmission control part is configured to acquire a traffic amount and, in consideration of the acquired traffic amount, control the transmission process executed by the wireless module part, the traffic amount being an amount of data flowing on a channel.

12. The wireless communication terminal according to claim 1, wherein: the collision information detection part is configured to detect a simultaneous-transmission collision occurrence status as the collision status represented by the collision status information, the simultaneous-transmission collision occurrence status being a status that collision has occurred because the radio frame signal from the wireless module part and another radio frame signal are simultaneously transmitted; and the transmission control part is configured to control a backoff time parameter, the backoff time parameter being a parameter having effect on the simultaneous-transmission collision occurrence status, the backoff time parameter being a transmission standby time selected at random.

13. The wireless communication terminal according to claim 1, wherein: the collision information detection part is configured to detect a transmission-in-transmission collision occurrence status as the collision status represented by the collision status information, the transmission-in-transmission collision occurrence status being a status that collision has occurred because another radio frame signal is transmitted during transmission of the radio frame signal; and the transmission control part is configured to control a carrier sense parameter, the carrier sense parameter being a parameter having effect on the transmission-in-transmission collision occurrence status, the carrier sense parameter being used at a time of checking channel availability.

14. The wireless communication terminal according to claim 1, wherein: the transmission loss information detection part is configured to calculate a transmission loss rate on a basis of the transmission loss information, the transmission loss rate being a probability that the radio frame signal has not reached a transmission destination; and the transmission control part is configured to control a parameter corresponding to the collision status in a case where the transmission loss rate detected by the transmission loss information detection part exceeds a transmission loss rate threshold, the transmission loss rate threshold being a given threshold determined in advance.

15. The wireless communication terminal according to claim 14, wherein: the transmission control part is configured to calculate a collision rate on a basis of a number of wireless communications by the wireless module part and a number of collisions detected by the collision information detection part, and change a transmission power parameter in a case where the calculated collision rate is not more than a collision rate threshold, whereas determine that collision has occurred and control a parameter corresponding to the collision status in a case where the collision rate is more than the collision rate threshold, the collision rate threshold being a given threshold determined in advance, and the transmission power parameter being a parameter used when the wireless module part transmits the radio frame signal.

16. A wireless communication method comprising:
detecting transmission loss information and collision information, the transmission loss information representing whether or not a transmitted radio frame signal has reached a transmission destination, the collision information representing an aspect of collision between the radio frame signal and another radio frame signal;
controlling a transmission process on a basis of the detected transmission loss information and the detected collision information;
detecting the collision information including collision status information, the collision status information representing a collision status that is a collision pattern between the radio frame signal and another radio frame signal and varies depending on a collision cause that is a cause of occurrence of collision; and
controlling a parameter corresponding to the collision status on a basis of the detected transmission loss information and the detected collision information including the collision status information, the parameter being used when executing the transmission process.

17. The wireless communication method according to claim 16, comprising: detecting the collision information including collision presence or absence information, the collision presence or absence information representing presence or absence of collision between the radio frame signal and another radio frame signal; and controlling the transmission process on a basis of the detected transmission loss information and the detected collision information including the collision presence or absence information.

18. A non-transitory computer-readable medium storing a program comprising instructions for causing a wireless communication terminal to: transmit a radio frame signal; detect transmission loss information, the transmission loss information representing whether or not the transmitted radio frame signal has reached a transmission destination; detect collision information, the collision information representing an aspect of collision between the transmitted radio frame signal and another radio frame signal; control a transmission process executed by the wireless module part, on a basis of the transmission loss information and the collision information, detect the collision information including collision status information representing a collision status that is a collision pattern between the radio frame signal and another radio frame signal and varies depending on a collision cause that is a cause of occurrence of collision; and control a parameter corresponding to the collision cause, the parameter being used when the transmission process is executed, on a basis of the transmission loss information and the collision information including the collision status information.

* * * * *